United States Patent
Kudou et al.

(10) Patent No.: US 7,179,555 B2
(45) Date of Patent: *Feb. 20, 2007

(54) FUEL CELL SYSTEM

(75) Inventors: Hiroyasu Kudou, Kariya (JP); Tomohiro Saito, Obu (JP); Toshiyuki Kawai, Toyohashi (JP); Kunio Okamoto, Okazaki (JP); Akimasa Osaki, Kariya (JP)

(73) Assignee: Denso Corporation, Kariya (JP)

( * ) Notice: Subject to any disclaimer, the term of this patent is extended or adjusted under 35 U.S.C. 154(b) by 404 days.

This patent is subject to a terminal disclaimer.

(21) Appl. No.: 10/353,373

(22) Filed: Jan. 29, 2003

(65) Prior Publication Data

US 2003/0165725 A1 Sep. 4, 2003

Related U.S. Application Data

(63) Continuation-in-part of application No. 10/207,355, filed on Jul. 29, 2002.

(30) Foreign Application Priority Data

| Aug. 10, 2001 | (JP) | ............................. 2001-244213 |
| Dec. 17, 2001 | (JP) | ............................. 2001-383667 |
| Jan. 30, 2002 | (JP) | ............................. 2002-21635 |
| Jun. 25, 2002 | (JP) | ............................. 2002-184948 |
| Sep. 27, 2002 | (JP) | ............................. 2002-283009 |
| Nov. 25, 2002 | (JP) | ............................. 2002-341079 |

(51) Int. Cl.
*H01M 8/04* (2006.01)
*H01M 2/18* (2006.01)
*H01M 8/24* (2006.01)

(52) U.S. Cl. .............................. 429/24; 429/26; 429/32; 429/34

(58) Field of Classification Search .................. 429/26, 429/34, 24, 32, 21
See application file for complete search history.

(56) References Cited

U.S. PATENT DOCUMENTS

| 6,277,511 | B1* | 8/2001 | Iwase et al. .................. 429/32 |
| 6,322,915 | B1 | 11/2001 | Collins et al. |
| 6,444,338 | B1 | 9/2002 | Araki et al. |
| 6,649,293 | B1* | 11/2003 | Jones .......................... 429/26 |
| 6,716,547 | B2* | 4/2004 | Whiton et al. ................ 429/26 |
| 2003/0031905 | A1* | 2/2003 | Saito et al. ................... 429/26 |
| 2003/0165725 | A1 | 9/2003 | Kudou et al. |

FOREIGN PATENT DOCUMENTS

| EP | 1006601 | 6/2000 |
| JP | 2000-294263 | 10/2000 |
| JP | 2001-229950 | 8/2001 |

* cited by examiner

*Primary Examiner*—Tracy Dove

(57) ABSTRACT

In a fuel cell system, a fuel cell includes plural stacked cells, a circulation passage for circulating a thermal medium to the fuel cell. The fuel cell has therein a plurality of thermal medium passages through which the thermal medium flows, and the thermal medium passages are provided such that the thermal medium from the circulation passage independently flows through the thermal medium passages. The thermal medium passages in the fuel cell have inlet portions from which the thermal medium is introduced, and outlet portions from which the thermal medium is discharged. In the fuel cell system, at least one-side portions among the inlet portions and the outlet portions are provided independently. Accordingly, a circulation area of the thermal medium in the fuel cell can be selectively changed, and a part of the fuel cell can be effectively heated to generate electrical power in this part.

24 Claims, 52 Drawing Sheets

FUEL CELL SYSTEM

CROSS-REFERENCE TO RELATED APPLICATION

This application is a CIP application of U.S. application Ser. No. 10/207,355, filed on Jul. 29, 2002. The present application is related to Japanese Patent Applications No. 2001-244213 filed on Aug. 10, 2001, No. 2001-383667 filed on Dec. 17, 2001, No. 2002-21635 filed on Jan. 30, 2002, No. 2002-184948 filed on Jun. 25, 2002, No. 2002-283009 filed on Sep. 27, 2002, and No. 2002-341079 filed on Nov. 25, 2002, the contents of which are hereby incorporated by reference.

BACKGROUND OF THE INVENTION

1. Field of the Invention

The present invention relates to a fuel cell system having a fuel cell that generates electric power by an electrochemical reaction between oxygen and hydrogen. The fuel cell system is suitably used for a movement body such as a vehicle, a ship and a portable generator.

2. Description of Related Art

In a fuel cell for generating electric power using a chemical reaction between hydrogen and air (oxygen), moisture (water) is generated in the fuel cell due to power generation. In a low temperature environment such as in winter, the water contained in the fuel cell is frozen. Therefore, operation of the fuel cell is not started, or output from the fuel cell is reduced. Accordingly, in a fuel cell for an electrical vehicle, a large heat source for heating all of the fuel cell is required to rapidly heat the fuel cell.

In JP-A-2000-294263, a fuel cell stack is divided into plural stack parts, and a first stack part of them is warmed up at first. Thereafter, a second stack part and the other stack parts are sequentially warmed up using a thermal loss and electric power due to the power generation from the first stack part. However, in this method, during the warm-up operation of the fuel cell, some stack parts generate electric power, and the other stack parts generate no electric power. Further, the number of stack parts generating electric power is increased, and all stack parts generate electric power until the warm-up is ended. Therefore, power-switching devices such as breakers are needed for switching a power supply source, because power-generation stack parts and non-generation stack parts are mixed. A vehicle fuel cell generally generates large electric power, and its generated current frequently reaches some hundreds amperes (A). Since the power switching device must ensure some hundreds A, its size is required to be enlarged. Further, fuel gas such as oxygen and hydrogen is needed to be supplied to each stack part generating electric power, and it is unnecessary to supply the fuel gas to each stack part where no electric power is generated. Accordingly, plural valves for switching the fuel-gas supplying states are also required, and the size of the vehicle fuel cell is further enlarged.

SUMMARY OF THE INVENTION

In view of the above problem, it is an object of the present invention to provide a fuel cell system having a fuel cell which can be rapidly heated using a small heating source in a low-temperature environment.

It is an another object of the present invention to reduce the size of the fuel cell system while the fuel cell can be rapidly warmed-up using the small heating source.

It is a further another object of the present invention to effectively heat a part area of the fuel cell with a simple structure.

According to the present invention, in a fuel cell system having a fuel cell for generating electric power using a fuel gas, the fuel cell has a plurality of stacked cells, and a part of each cell is collectively heated when the fuel cell is warmed up in a warm-up operation. Since a part of each cell of the fuel cell can generate electric power by collectively heating the part thereof, the other part of each cell of the fuel cell can be heated using self heat generation due to the power generation in the part of the fuel cell. Therefore, a temperature distribution between the cells can be made uniform, and heating quantity required for warming up the fuel cell can be made smaller in the warm-up operation, thereby rapidly heating the fuel cell using a small heating source even in a low temperature environment. Specifically, in the present invention, the fuel cell has therein a plurality of thermal medium passages that are provided independently such that a thermal medium independently flows through the thermal medium passages. Therefore, a part area of the fuel cell can be effectively rapidly heated by using a heating device having a small heat capacity to generate electrical power, and the other part thereof can be heated using the thermal medium and the generated electrical power in the one part as the heating sources. Accordingly, a part area of the fuel cell can be effectively heated with a simple structure of the independent thermal medium passages in the warm-up operation of the fuel cell.

Preferably, the thermal medium passages are provided in parallel to each other on surfaces of the cells in a direction approximately perpendicular to the stack direction of the cells to form plural lines, and the thermal medium passages of adjacent cells in the stack direction are provided to communicate with each other on each line. Accordingly, the thermal medium passage can be readily formed with a simple structure. Here, the thermal medium passages can be arranged adjacent to each other in the stack direction, on each line. In this case, the passage length of the thermal medium passage in the stack direction can be made shorter while a sufficient amount of the thermal medium can be circulated in the fuel cell.

Preferably, each of thermal medium passages has an inlet and an outlet at its two ends, respectively, the inlets of the thermal medium passages are connected to each other in the stack direction on each line, and the outlets of the thermal medium passages are connected to each other in the stack direction on each line. In this case, the inlets of the thermal medium passages are provided in common to communicate with a one inlet passage through which the thermal medium is introduced into the inlets of the thermal medium passages, and the outlets of the thermal medium passages are provided independently to be separated from each other at different lines. Alternatively, the outlets of the thermal medium passages are provided in common to communicate with a one outlet passage through which the thermal medium from the outlets of the thermal medium passages is discharged, and the inlets of the thermal medium passages are provided independently to be separated from each other at different lines. Accordingly, heat due to the electrical power in the partial area of the fuel cell can be readily transmitted through the common inlet or the common outlet, and the warm-up effect in the fuel cell can be further improved.

In the fuel cell system of the present invention, a temperature detection device is provided for detecting a temperature of the thermal medium flowing from an outlet of the fuel cell, and a controller controls the thermal medium circulation device based on the temperature of the thermal medium detected by the temperature detection device. When the controller determines that the temperature of the thermal medium detected by the temperature detection device is lower than a predetermined temperature, the controller outputs an operation signal to the thermal medium circulation device so as to circulate the thermal medium heated by the heating device into a part of the thermal medium passages. On the other hand, when the controller determines that the temperature of the thermal medium detected by the temperature detection device is increased higher than the predetermined temperature, the controller outputs an operation signal to the thermal medium circulation device so as to circulate the thermal medium heated by the heating device into the fuel cell from the part of the thermal medium passages to all the thermal medium passages in accordance with a temperature increase of the thermal medium. Accordingly, the warm-up operation of the fuel cell can be effectively controlled.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

The preferred embodiments of the present invention will be described hereinafter with reference to the appended drawings.

(First Embodiment)

Figure 1:
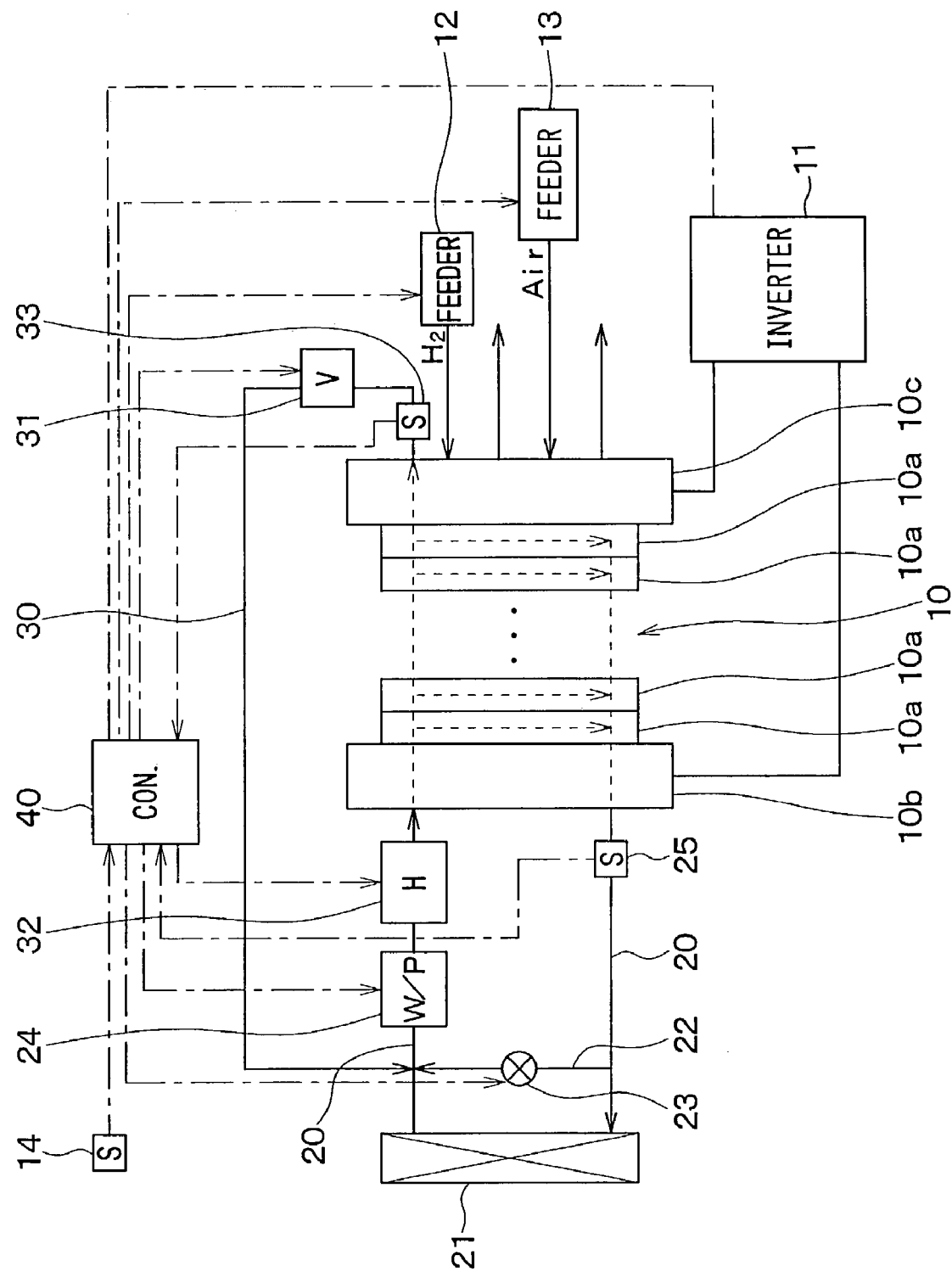
FIG. 1 is a schematic diagram showing an entire construction of a fuel cell system according to a first embodiment of the present invention.

In the first embodiment, a fuel cell system of the present invention is typically used for an electric vehicle (fuel-cell vehicle) driven by a fuel cell as a power source. As shown in FIG. 1, the fuel cell system according to the first embodiment includes a fuel cell 10, a hydrogen feeder 12, an air feeder 13, a heating-cooling system 20–33, a controller 40 and the like. The fuel cell (FC stack) 10 generates electric power using an electrochemical reaction between hydrogen and oxygen. Here, the hydrogen and the oxygen are used as a fuel gas in the fuel cell 10. In the first embodiment, a solid-polymer electrolyte fuel cell is used as the fuel cell 10, and the fuel cell 10 is constructed by plural cells 10a each of which is used as a unit cell. Each cell 10a is constructed by an electrolyte film sandwiched between a pair of electrodes. Hydrogen and air (oxygen) are supplied to the fuel cell 10. In the fuel cell 10, the following electrochemical reaction between hydrogen and air (oxygen) occurs, and electrical energy is generated.

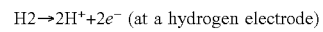

H2→2H$^+$+2$e^-$ (at a hydrogen electrode)

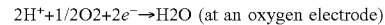

2H$^+$+1/2O2+2$e^-$→H2O (at an oxygen electrode)

The fuel cell 10 includes electrodes 10b, 10c from which electric power generated by the fuel cell 10 is output. The generated electric power is used as a load electrical power for driving a vehicle-running motor (not shown), or for charging a secondary battery (not shown) and the like.

Hydrogen as a fuel gas is supplied to the fuel cell 10 by the hydrogen feeder 11 (hydrogen supply device), and air including oxygen as a fuel gas is supplied to the fuel cell 10 by the air feeder 12 (air supply device). For example, the hydrogen feeder 11 can be constructed by a hydrogen generator or a hydrogen tank, and the air feeder 12 can be constructed by an air compressor or an adiabatic compressor. In this case, the hydrogen tank has therein a hydrogen storage material such as a hydrogen absorbing alloy for storing pure hydrogen. Non-reacted air, among air supplied to the fuel cell 10, that is, air non-consumed in the electrochemical reaction is discharged from the fuel cell 10 as exhaust gas. Non-reacted hydrogen, among the hydrogen supplied to the fuel cell 10, that is, hydrogen non-consumed in the electrochemical reaction is circulated to be used again.

Each electrolyte film in the fuel cell 10 is needed to have moisture (water) for the electrochemical reaction during power generation. Therefore, hydrogen and air are beforehand humidified by a humidifier (not shown) and the like, and the humidified hydrogen and the humidified air are supplied to the fuel cell 10, thereby humidifying the electrolyte films in the fuel cell 10. The fuel cell system further includes an outside air temperature sensor 14 for detecting an outside air temperature.

In the fuel cell 10, moisture (water) and heat are generated due to the electrochemical reaction between hydrogen and oxygen during power generation. The fuel cell 10 is required to be maintained at a predetermined temperature (e.g., about 80° C.) during power generation, for improving power generation efficiency. Therefore, in the fuel cell system, a cooling system 20–25 is provided for radiating heat generated in the fuel cell 10 to an outside of the fuel cell system using a thermal medium. In the first embodiment, anti-freezing cooling water, that is not frozen even in a low temperature condition, is used as the thermal medium. The cooling system includes a thermal medium circulation path 20 through which cooling water (thermal medium) is circulated into the fuel cell 10, and a radiator 21 as a heat exchanger for cooling the cooling water. The cooling water having passed through the fuel cell 10 flows into the radiator 21, and is heat-exchanged with outside air (atmospheric air) to be cooled by the outside air. The fuel cell 10 is constructed so that the cooling water is circulated into each cell 10*a* in the fuel cell 10.

Figure 2:
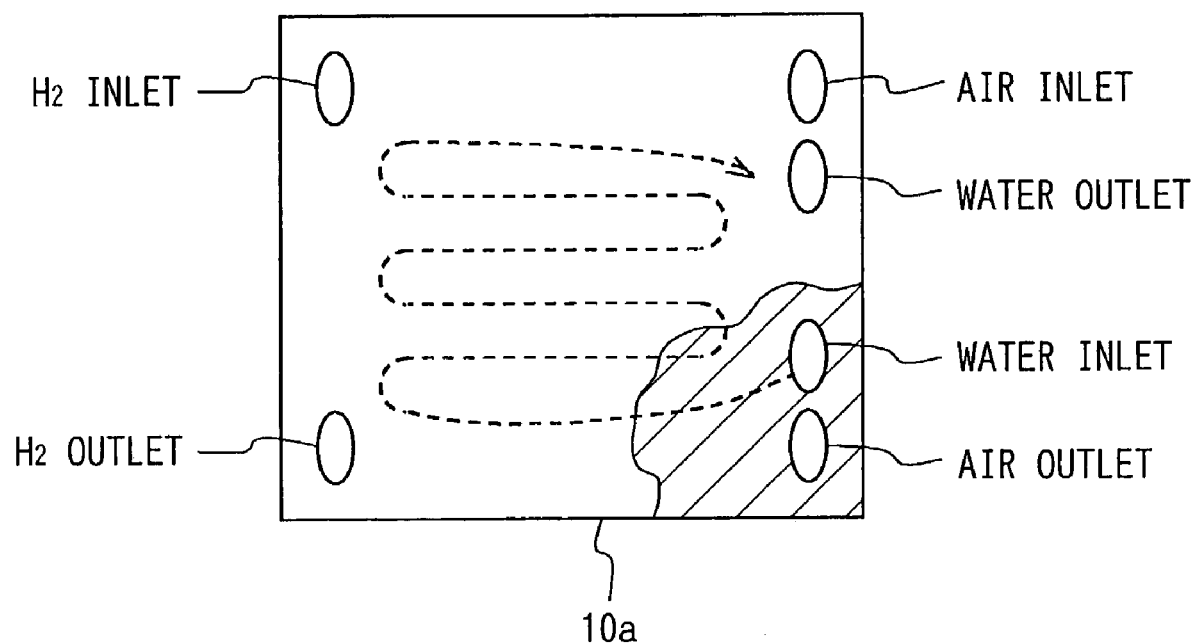
FIG. 2 is a schematic side view showing a cell of the fuel cell according to the first embodiment.

FIG. 2 is a side view of a cell 10*a* when being viewed from a supplying direction of hydrogen or oxygen. As shown in FIG. 2, a water inlet is provided in each cell 10*a* around an air outlet, and a water outlet is provided in each cell 10*a* around an air inlet. Cooling water flows into each cell 10*a*, and meanderingly flows therein as indicated by a broken line in FIG. 2. Thereafter, the cooling water flows out from each cell 10*a*. The cooling system further includes a radiator bypass path 22 through which cooling water bypasses the radiator 21, a temperature control valve 23 for adjusting an amount of cooling water flowing into the radiator 21, a water pump 24 (W/P) for circulating cooling water, and a temperature sensor 25 for detecting the temperature of cooling water having passed through the fuel cell 10. The fuel cell system further includes a heating system 30–33 for heating the fuel cell 10 to rapidly start the power-generation operation of the fuel cell 10 in a low temperature environment. The heating system 30–33 is integrated to the above cooling system 20–25, in the first embodiment.

The thermal medium circulation path 20 includes a bypass path 30 through which cooling water is circulated into a part of each cell 10*a* while bypassing the other part thereof. A control valve (flow-path controller) 31 for opening and closing the bypass path 30 is provided in the bypass path 30. A flow amount of cooling water flowing into the bypass path 30 can be adjusted by controlling an open degree of the control valve 31. Specifically, since a pressure loss in the bypass path 30 is set smaller than that in the fuel cell 10, a larger amount of cooling water flows into the bypass path 30 by increasing the open degree of the control valve 31. All the cooling water can be circulated into the bypass path 30 by entirely opening the control valve 31. On the contrary, a larger amount of cooling water can be circulated into all the fuel cell 10 by reducing the open degree of the control valve 31. Further, all the cooling water can be circulated into the fuel cell 10 by entirely closing the control valve 31.

Further, a heater (heating device) 32 for heating cooling water is provided in the thermal medium circulation path 20 at an upstream side of the fuel cell 10 in a water flow direction. An electric heater or a combustion heater can be used as the heater 32. When the heater 32 is provided around the water inlet of the fuel cell 10 as in the first embodiment, a thermal loss can be made small, and thermal efficiency for heating the fuel cell 10 can be improved. A temperature sensor 33 for detecting a temperature of cooling water having passed through the fuel cell 10 is provided in the bypass path 30 around a water outlet of the fuel cell 10. By detecting the temperature of cooling water having passed through the fuel cell 10 using the first temperature sensor 33, a temperature (fuel-cell partial temperature) Tfc of the fuel cell 10, in a part heated by cooling water, can be indirectly detected.

The fuel cell system further includes a controller 40 for controlling various devices. Sensor signals are input to the controller 40 from the outside temperature sensor 14, the temperature sensors 25, 33 and the like, and control signals are output from the controller 40 to the inverter 11, the hydrogen feeder 12, the air feeder 13, the temperature control valve 23, the water pump 24, the control valve 31, the heater 32 and the like.

Figure 3:
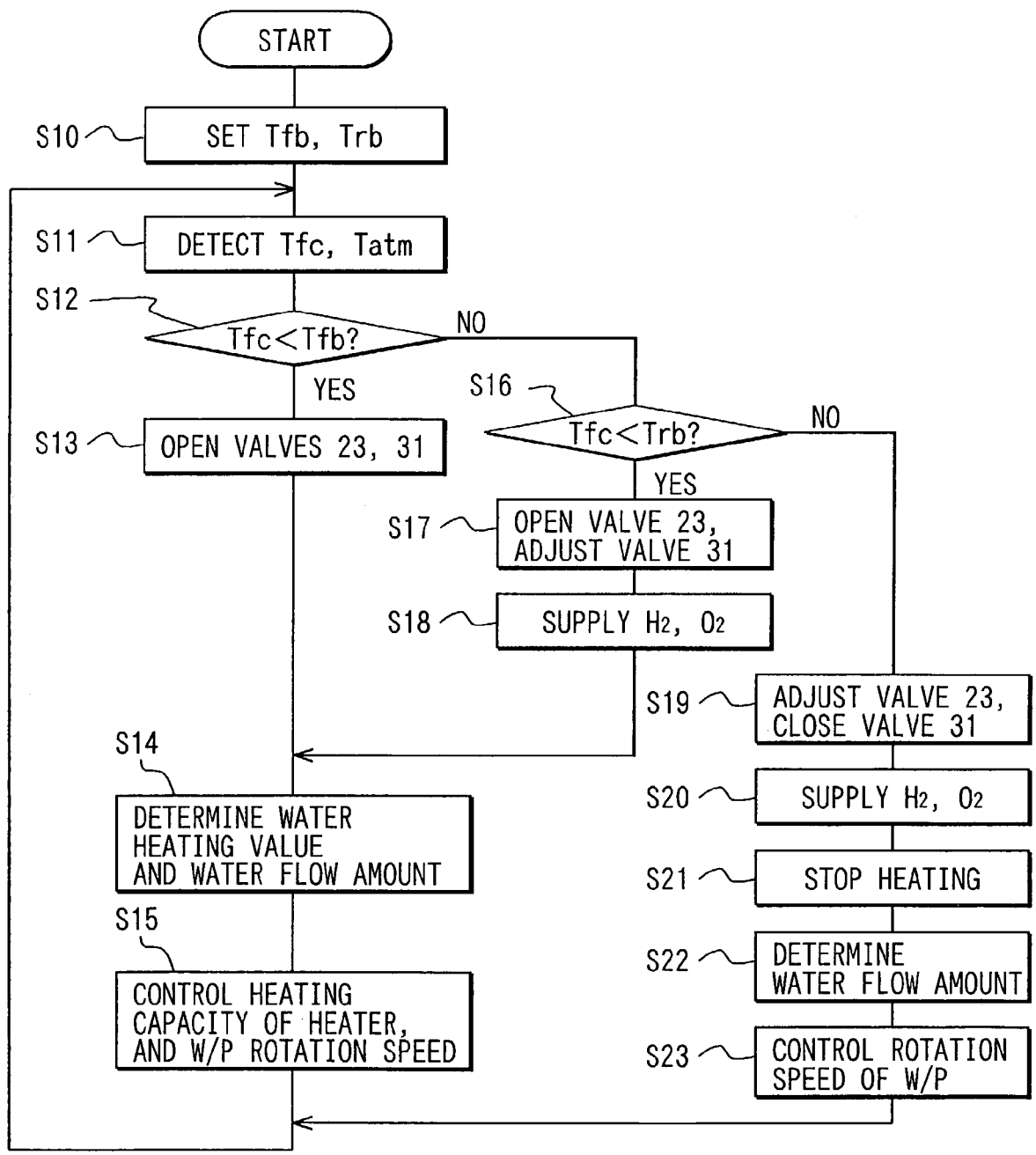
FIG. 3 is a flow diagram showing control operation of the fuel cell system according to the first embodiment.

Next, operation of the fuel cell system having the above-described structure, during starting operation (warm-up operation) of the fuel cell in a low temperature environment, will be described with reference to the flow diagram shown in FIG. 3. At step S10, a fuel-cell bypass temperature Tfb and a radiator bypass temperature Trb are set. The fuel-cell bypass temperature Tfb is a temperature (e.g., 0° C.) at which the fuel cell 10 can generate electric power. The radiator bypass temperature Trb is a temperature (e.g., 70° C.) at which cooling operation of the radiator 21 for cooling the cooling water (hot water) is started, that is, at which the warm-up operation of the fuel cell 10 is ended. At step S11, the fuel-cell partial temperature Tfc is detected by the temperature sensor 33, and the outside air temperature Tatm is detected by the outside air temperature sensor 14. Next, at step S12, it is determined whether or not the fuel-cell partial temperature Tfc is lower than the fuel-cell bypass temperature Tfb. When it is determined that the fuel-cell partial temperature Tfc is lower than the fuel-cell bypass temperature Tfb (i.e., Tfc<Tfb) at step S12, the fuel cell 10 cannot generate electric power. Therefore, partial warm-up operation of the fuel cell 10 is performed. In the partial warm-up operation, a part of each cell 10*a* of the fuel cell 10 is heated to a temperature where the fuel cell 10 can generate electric power in the following manner.

That is, at step S13, the temperature control valve 23 and the control valve 31 are fully opened. Next, at step S14, a water-heating value for heating the cooling water using the heater 32, and a flow amount of cooling water circulated by the water pump 24 are calculated based on the fuel-cell partial temperature Tfc, the outside air temperature Tatm and the like. Specifically, when the outside air temperature Tatm or the fuel-cell partial temperature Tfc is low, a large water-heating value (heating capacity) is required. Therefore, in this case, the water-heating value of the heater 32 is made larger, and the flow amount of cooling water is controlled to be smaller by the water pump 24. At step S15, the heating capacity of the heater 32 is controlled based on the water-heating value determined at step S14, and a rotation speed of the water pump 24 is controlled based on the flow amount of cooling water determined at step S14. Cooling water heated by the heater 32 is circulated into the fuel cell 10. At this time, since the control valve 31 is fully opened, cooling water is circulated into only a part of each cell 10*a* of the fuel cell 10.

Accordingly, cooling water can be circulated into only a part of a power generation surface in each cell 10*a* constructing the fuel cell 10. In the first embodiment, for example, cooling water is circulated into the fuel cell 10 only at an upper side of each cell 10*a* in FIG. 1, thereby collectively increasing the temperature of the fuel cell 10 only in the part where cooling water is circulated. Steps S13–S15 are repeated until the fuel-cell partial temperature Tfc becomes higher than the set fuel-cell bypass temperature Tfb.

When the fuel-cell partial temperature Tfc becomes higher than the fuel-cell bypass temperature Tfb at step S12, it is determined that the heated part of the fuel cell 10 can generate electric power. Therefore, the fuel cell 10 starts power generation at its part, and performs entire warm-up operation for increasing the temperature in all the fuel cell 10 using heat generation due to the power generation. The entire warm-up operation is performed until the fuel-cell partial temperature Tfc reaches to the radiator bypass temperature Trb at step S16.

At step S17, the temperature control valve 23 is set to be fully opened, and the open degree of the control valve 31 is controlled based on the fuel-cell partial temperature Tfc. Specifically, as the fuel-cell partial temperature Tfc becomes higher, the open degree of the flow-path control valve 31 is set smaller, thereby increasing the amount of cooling water circulated in all the fuel cell 10. At step S18, hydrogen supply is started from the hydrogen feeder 12 to the fuel cell 10, and air supply is started from the air feeder 13 to the fuel cell 10. Therefore, the fuel cell 10 starts power generation at the part whose temperature is increased at steps S13–S15, and generates heat at the part where the power generation is started. Then, the heating capacity of the heater 32 and the rotational speed of the water pump 24 are controlled at steps S14, S15, as described above.

At this time, since cooling water is circulated into all the fuel cell 10, heat due to the power generation is transferred to all the fuel cell 10 through cooling water circulated into the fuel cell 10. Therefore, warm-up operation can be effectively performed in all the fuel cell 10 using self heat generation due to the power generation in the fuel cell 10 at the part. Further, the temperature of the fuel cell 10 can be prevented from being excessively increased due to the self heat generation because the cooling water circulates into all the fuel cell 10.

On the other hand, when it is determined that the fuel-cell partial temperature Tfc is higher than the radiator bypass temperature Trb at step S16, it is determined that warm-up operation can be ended in all the fuel cell 10 and the power generation can be performed in all the fuel cell 10. In this case, normal operation control is performed at steps S19–S23.

At step S19, the flow-path control valve 31 is entirely closed, and the open degree of the temperature control valve 23 is controlled based on the fuel-cell partial temperature Tfc. Specifically, as the fuel-cell partial temperature Tfc becomes higher, the open degree of the temperature control valve 23 is set smaller, thereby increasing the amount of cooling water flowing into the radiator 21. Cooling water flows into all the fuel cell 10 by entirely closing the flow-path control valve 31. The, at step S20, hydrogen is supplied from the hydrogen feeder 12 to the fuel cell 10, and air is supplied from the air feeder 13 to the fuel cell 10. At step S21, heating operation using the heater 32 is stopped. At step S22, an amount of cooling water circulated into the thermal medium circulation path 20 is set based on the fuel-cell partial temperature Tfc. At step S23, the rotational speed of the water pump 24 (W/P) is controlled based on the amount of cooling water set at step S22. Accordingly, the fuel cell 10 can be maintained in a temperature range (e.g., approximately 70–80° C.) where its power generation efficiency is high.

Thus, according to the first embodiment, a minimum power-generation area can be ensured in each cell 10a constructing the fuel cell 10 by collectively heating the fuel cell 10 at the part. Therefore, power generation is readily started in each cell 10a in the minimum power-generation area, and warm-up operation can be ended in all the fuel cell 10 using self heat generation due to the power generation.

Since the warm-up operation of all the fuel cell 10 can be ended only by heating a part of each cell 10a of the fuel cell 10, a heating capacity of a heating device 32 can be set smaller. Therefore, the power-generation operation of the fuel cell 10 can be rapidly started in a low temperature environment using a small heat source, and stable output from the fuel cell 10 can be obtained.

Further, water is generated in the fuel cell 10 due to the electrochemical reaction, and is stored in each cell 10a around an air outlet as indicated by oblique hatching in FIG. 2. In the first embodiment, because heated water flows into each cell 10a from a position around the air outlet, the position around the air outlet can be preferentially heated by the heated water. Thus, it can effectively prevent water stored around the air outlet from being frozen in a low temperature environment.

Further, according to the first embodiment, since a part of each cell 10a can be uniformly warmed up, a temperature distribution in all the cells 10a can be made uniform, and the fuel cell 10 can generate electric power for a short time using a small heating capacity of the heater 32. For example, when electric power of 100W is generated by all the cells 10a at a temperature where cooling water is not frozen, for example, 0° C., electric power of approximate 10W can be generated by warming up 10% of each cell 10a to the temperature where cooling water is not frozen. When 10% of each cell 10a can be warmed up to the temperature, electric power of (10W×the number of cells 10a) can be generated. Accordingly, the power generation of the fuel cell 10 can be started by a small heating source, and the size of the fuel cell 10 can be reduced.

(Second Embodiment)

In the second embodiment, a thermal-medium switching device for switching a flow direction of the thermal medium (cooling water) is added to the fuel cell system in the first embodiment. The thermal-medium switching device switches a flow direction of cooling water circulated into the fuel cell 10 during the partial warm-up operation. In the second embodiment, the same portions as the above-described first embodiment are indicated by the same reference numerals, respectively, and description thereof is omitted.

Figure 4:
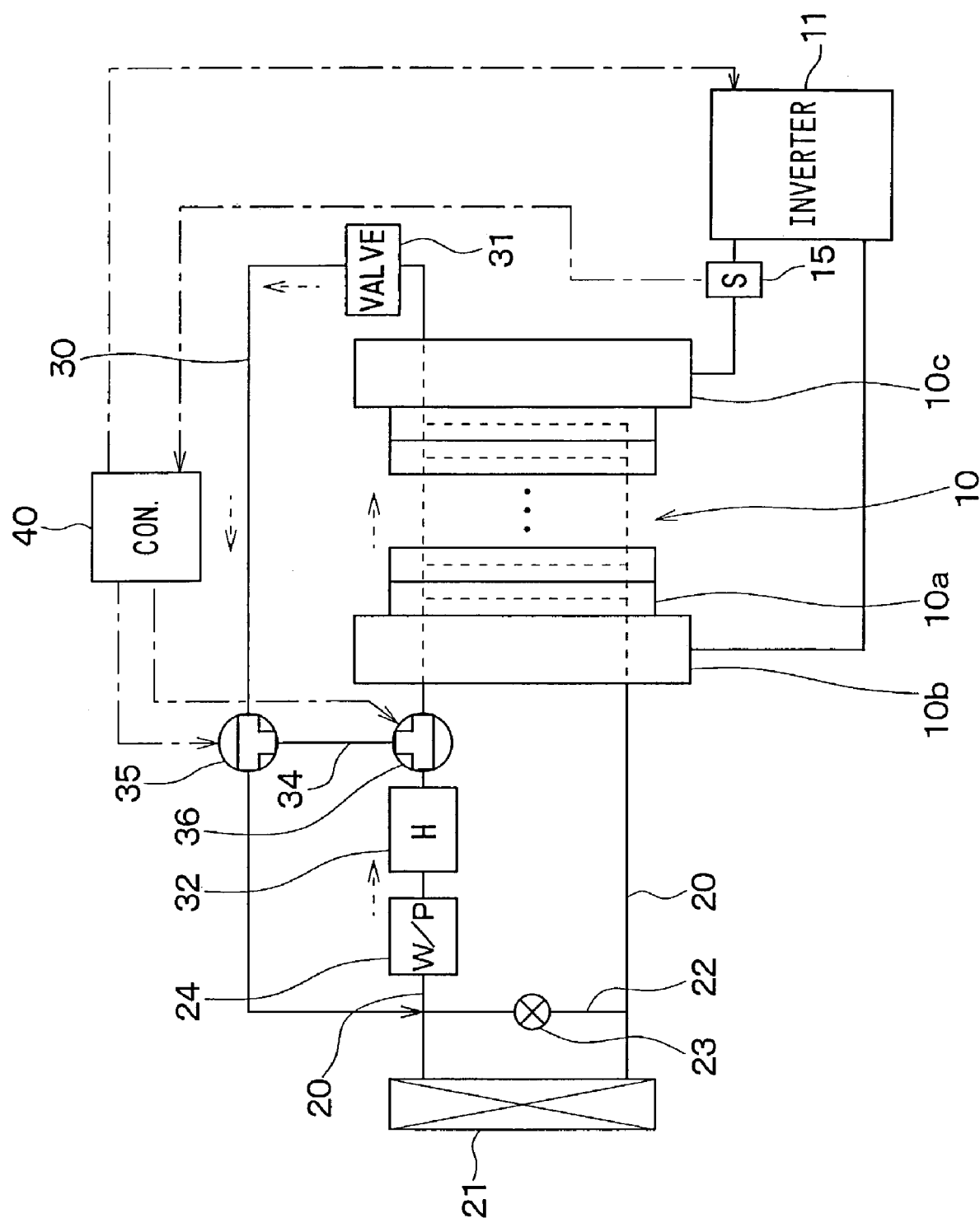
FIG. 4 is a schematic diagram showing a main construction of a fuel cell system according to a second embodiment of the present invention.

As shown in FIG. 4, in the second embodiment, a sub-bypass path 34 is provided to connect the cooling-water circulation path 20 (thermal-medium circulation path) and the bypass path 30. Further, flow switching valves 35, 36 are provided at a connection point between the cooling-water circulation path 20 and the sub-bypass path 34, and at a connection point between the bypass path 30 and the sub-bypass path 34. Two flow passages crossing with each other are provided within the sub-bypass path 34. Accordingly, in the second embodiment, the thermal-medium switching device is constructed by the sub-bypass path 34 and the flow switching valves 35, 36. Further, an electric power sensor 15 for detecting electric power output from the fuel cell 10 is provided in the fuel cell system according to the second embodiment.

Next, control operation for controlling a switching of the flow direction of cooling water during the partial warm-up operation in the fuel cell system will be now described. At first, the flow switching valves 35, 36 are closed so that no cooling water flows into the sub-bypass path 34. Therefore, cooling water heated by the heater 32 is circulated in a forward direction as indicated by broken-line arrows in FIG. 4. Thus, the cooling water heated by the heater 32 flows from a left side to a right side in the fuel cell 10 in FIG. 4. Accordingly, a part of the fuel cell 10 is collectively heated.

In this case, since cooling water passes through each of the stacked cells 10a in order, the cells 10a positioned at upstream water side in the fuel cell 10 are preferentially heated. That is, the cell 10a from which cooling water flows into the fuel cell 10 is firstly heated, but the cell 10a from which cooling water flows out from the fuel cell 10 is lastly heated. Therefore, a temperature distribution becomes non-uniform between cells 10a, thereby reducing electric power output from the fuel cell 10. In the second embodiment, when the fuel-cell partial temperature Tfc is equal to or higher than a predetermined temperature, a flow direction of cooling water is switched.

Figure 5:
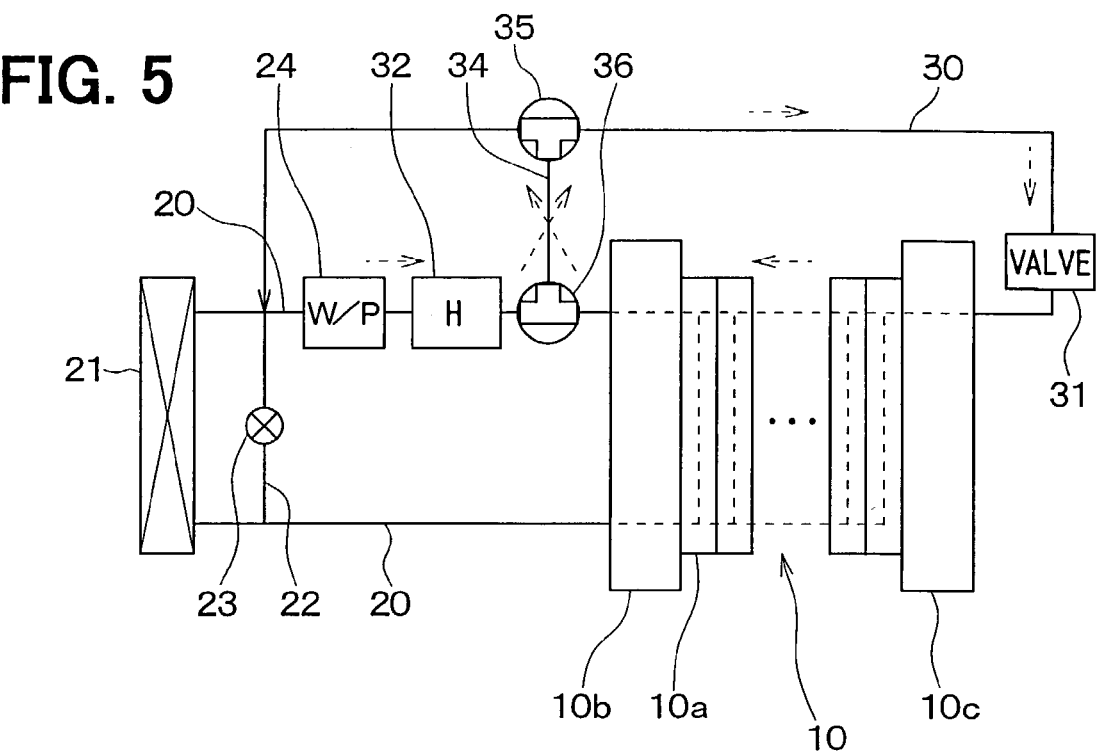
FIG. 5 is a schematic diagram showing a state where a flow direction of cooling water is switched from that shown in FIG. 4, according to the second embodiment.

FIG. 5 shows a flow direction of cooling water when the flow direction of the cooling water is switched from the state in FIG. 4. In this case, as shown in FIG. 5, the flow-path switching valves 35, 36 are opened, and cooling water flows through the two passages of the sub-bypass path 34, crossing with each other. Thus, cooling water flows in a backward direction, that is, flows from the right side to the left side in the fuel cell 10 in FIG. 5. Accordingly, the water inlet and the water outlet in the fuel cell 10 can be alternately switched to each other, so that the cells 10a can be uniformly heated during the partial warm-up operation. Thus, it can prevent electric power output from the fuel cell 10 from being reduced due to the ununiform temperature distribution between the cells 10a.

The flow direction of cooling water can be switched based on a reduction of electric power output from the fuel cell 10 without being limited to the fuel-cell partial temperature Tfc. When the ununiform temperature distribution is generated between the cells 10a, the electric power from the fuel cell 10 detected by the electric power sensor 15 is reduced. Specifically, when the electrical power from the fuel cell 10, detected by the electrical power sensor 15, is reduced to be lower than a predetermined electrical power, the flow direction of cooling water is switched in an opposite direction.

(Third Embodiment)

In the above-described second embodiment of the present invention, the thermal-medium switching device for switching the flow direction of the thermal medium (cooling water) is constructed by the flow-path switching valves 35, 36 and the sub-bypass path 34. However, in the third embodiment, a thermal-medium circulation device capable of switching a flow direction of the thermal medium is used as the thermal-medium switching device. Further, in the third embodiment, the same portions as the above-described embodiments are indicated by the same reference numerals, and description thereof is omitted.

Figure 6:
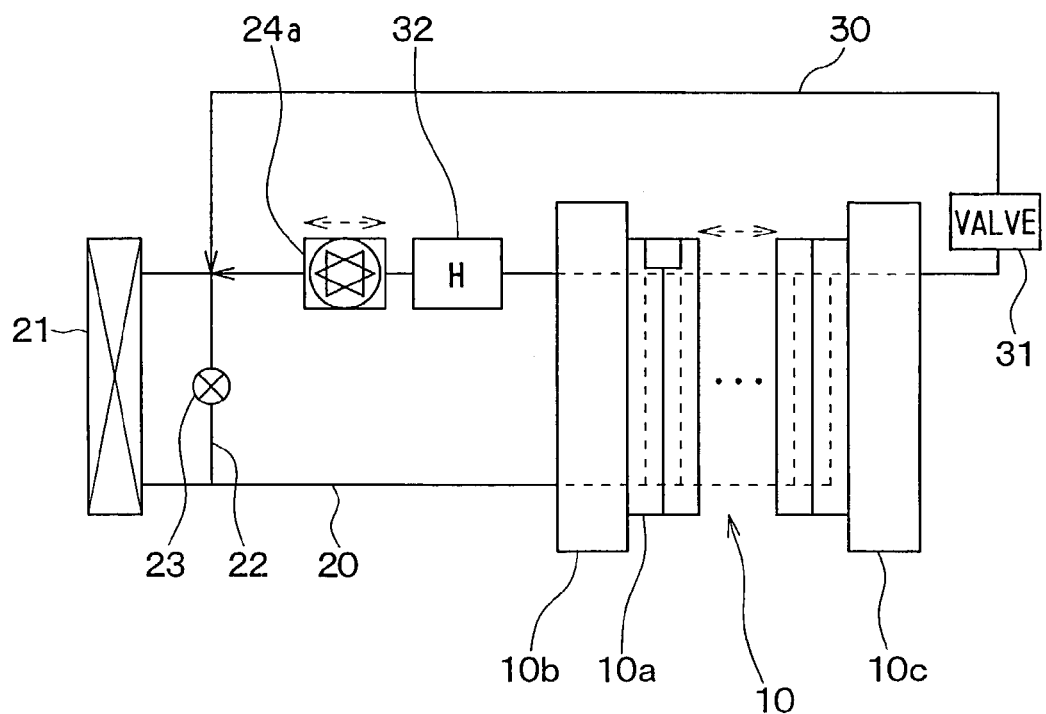
FIG. 6 is a schematic diagram showing a main construction of a fuel cell system according to a third embodiment of the present invention.

As shown in FIG. 6, a water pump 24a capable of switching a flow direction of cooling water is provided. The water pump 24a is constructed so that the water inlet side and the water outlet side of the fuel cell 10 can be alternately switched.

When the fuel-cell partial temperature Tfc becomes equal to or higher than a predetermined temperature, or when electric power generated from the fuel cell 10 becomes equal to or lower than a predetermined electric power, the flow direction of cooling water flowing through the fuel cell 10 is switched using the water pump 24a. Accordingly, similarly to the second embodiment, the heating parts in the cells 10a can be uniformly heated between the cells 10a during the partial warm-up operation, thereby preventing output electric power from being reduced due to the non-uniform temperature distribution in the cells 10a.

(Fourth Embodiment)

In the fourth embodiment of the present invention, an air-flow direction switching device (oxygen-flow direction switching device) capable of switching a flow direction of air supplied to the fuel cell 10 is further added in the structure of the above-described first embodiment. In the fourth embodiment, the same portions as the above-described first embodiment are indicated by the same reference numerals, and description thereof is omitted.

Figure 7:
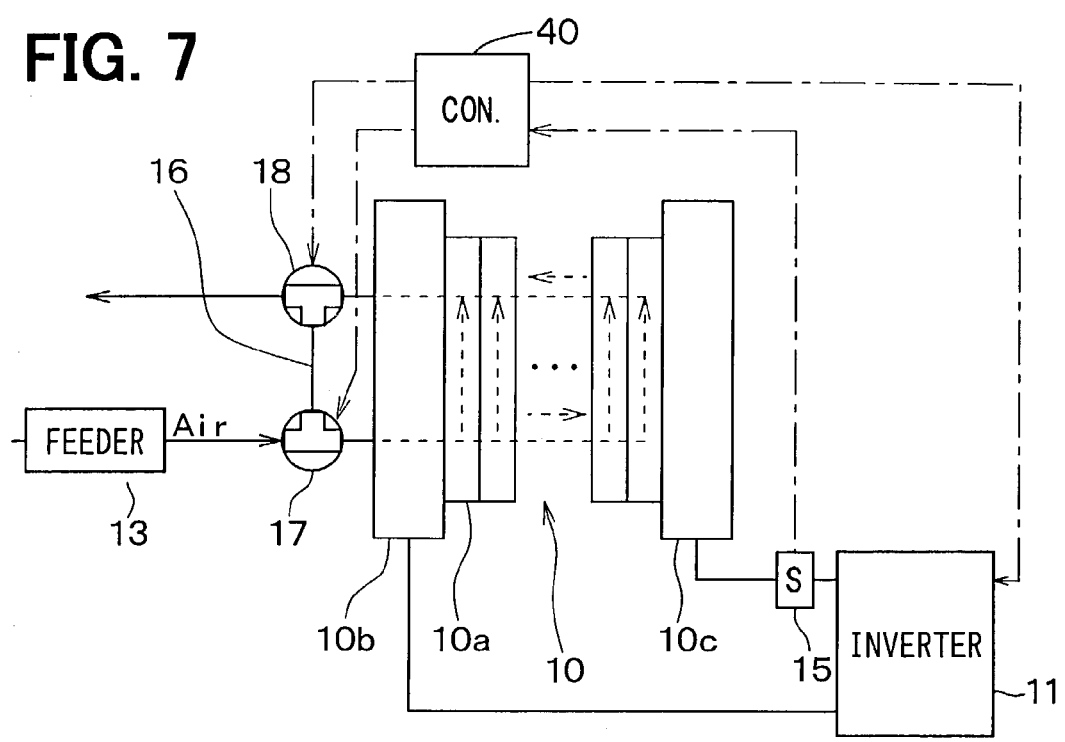
FIG. 7 is a schematic diagram showing a main construction of a fuel cell system according to a fourth embodiment of the present invention.

FIG. 7 shows a main part of a fuel cell system according to the fourth embodiment. As shown in FIG. 7, an air bypass path 16 is provided to connect an air supply path through which air is supplied to the fuel cell 10, and an air discharge path through which exhaust gas containing non-reacted oxygen from the fuel cell 10 is discharged. Flow-path switching valves 17, 18 are provided at a connection point between the air bypass path 16 and the air supply path, and at a connection point between the air bypass path 16 and the air discharge path, respectively. Here, the heating-cooling system 20–33 indicated in FIG. 1 is not shown in FIG. 7.

In the fourth embodiment, the air-flow direction switching device for switching the flow direction of air flowing through the fuel cell 10 is constructed by the air bypass path 16 and the flow-path switching valves 17, 18.

Next, control operation for controlling the switching of the air flow direction in the fuel cell system according to the fourth embodiment will be now described. At first, the flow-path switching valves 17, 18 are closed so that no air flows into the air bypass path 16. In this case, air supplied from the air feeder 13 flows in the fuel cell 10 as indicated by broken line arrows in FIG. 7. Within the fuel cell 10, the air flows in each cell 10a from a lower side to an upper side as shown in FIG. 7.

Figure 8:
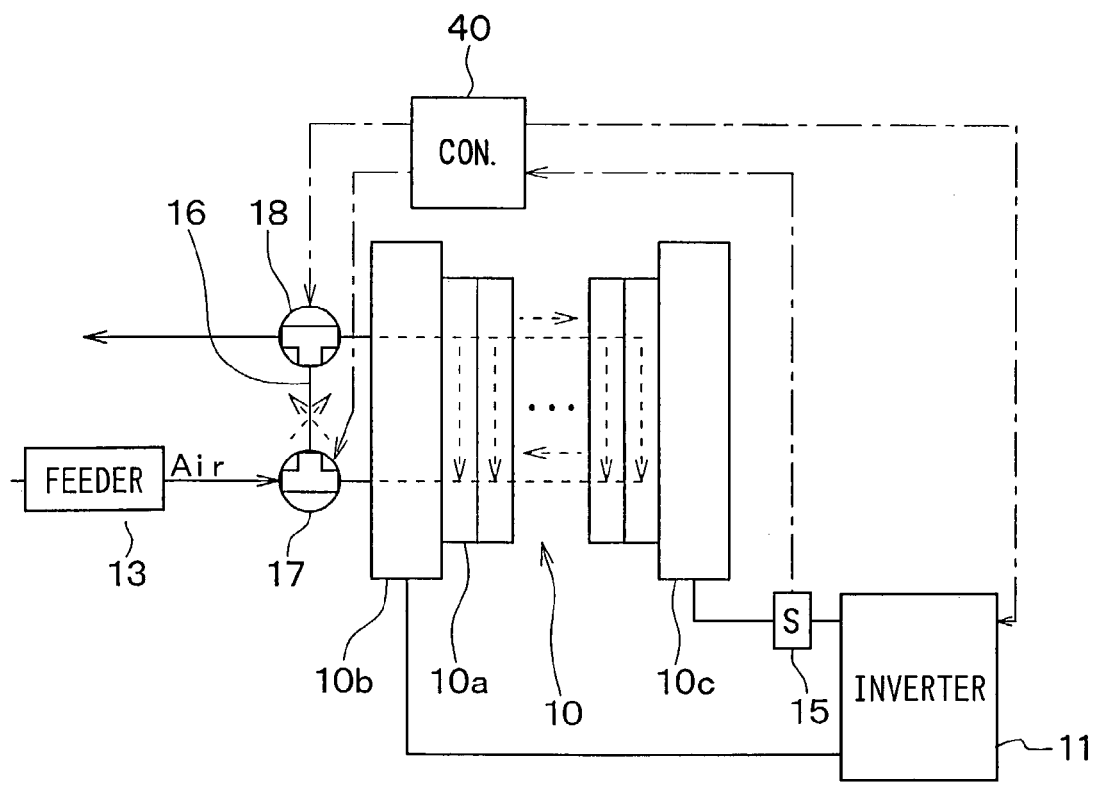
FIG. 8 is a schematic diagram showing a state where a flow direction of cooling water is switched from that shown in FIG. 7, according to the fourth embodiment.

Since an air compressor composed of an adiabatic compressor is used as the air feeder 13, the air supplied to the fuel cell 10 has a relatively high temperature. Therefore, each air-introduction side (lower side in FIG. 7) in the cells 10a of the fuel cell 10 is preferentially heated by the high-temperature air. Accordingly, ununiform temperature distribution is generated in each of the cells 10a, and the temperature of the cells 10a is sometimes excessively increased at the air introduction side. Therefore, in the fourth embodiment, when the fuel-cell partial temperature Tfc becomes higher than a predetermined temperature, the direction of air supplied to the fuel cell 10 is switched. As shown in FIG. 8, when the flow-path switching valves 17, 18 are opened, air flows into air passages of the air bypass path 16, crossed with each other. Therefore, the air inlet and the air outlet in each cell 10a are alternately switched to each other, thereby preventing the temperature in each cell 10 from being excessively increased at the air inlet side.

Further, in each cell 10a, the water generated by the electrochemical reaction is stored at the air outlet side, and is sometimes frozen in a low temperature environment. However, when the air inlet and the air outlet in each cell 10a are alternately switched to each other as in the fourth embodiment, high-temperature air flows into a portion where the generated water is stored, thereby preventing the generated water from being frozen in each cell 10a. Further, the fuel cell system may be constructed so that the air flow direction is switched based on reduction of electric power output from the fuel cell 10 without being limited to the fuel-cell partial temperature Tfc. Specifically, when the electric power, output from the fuel cell 10, detected by the electric power sensor 15 is reduced lower than a predetermined electric power, the air flow direction in each cell 10a is switched to an opposite direction.

Further, a hydrogen-flow direction switching device for switching a flow direction of hydrogen supplied to the fuel cell 10 can be constructed in the same manner as the air-flow direction switching device described above. In this case, the same effect as the air-flow direction switching device can be also obtained. For example, a part of water generated by the electrochemical reaction is distributed into an electrolyte film in each cell 10*a*, and is also stored around the hydrogen outlet. Similarly, hydrogen supplied to the fuel cell 10 has a relatively high temperature. Accordingly, by switching the supply direction of hydrogen to the fuel cell 10 in an opposite direction, it can prevent the water from being frozen around the hydrogen outlet side.

(Fifth Embodiment)

In the fifth embodiment, a heating device used in the warm-up operation of the fuel cell 10 is different from the heater 32 in the first embodiment. In the fifth embodiment, the same portions as the above-described fourth embodiment are indicated by the same reference numerals, and description thereof is omitted.

Figure 9:
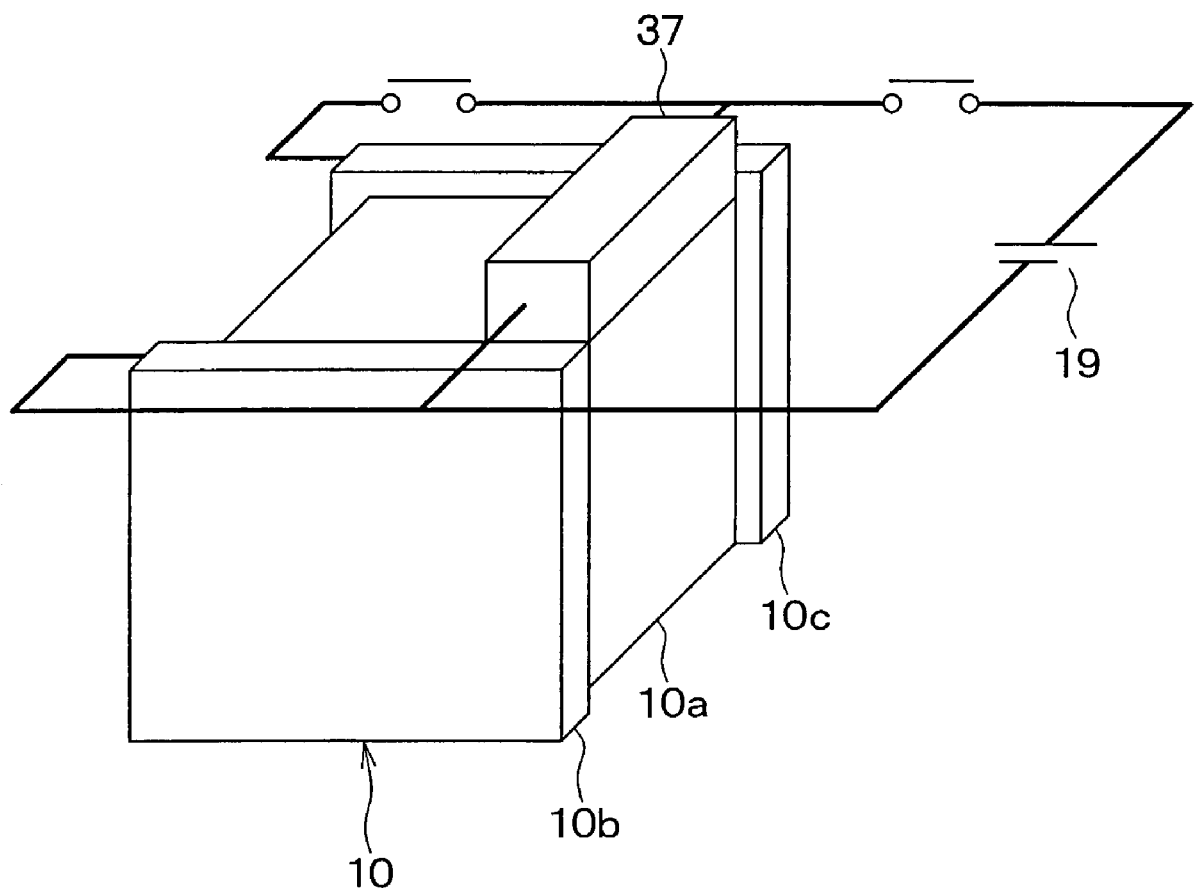
FIG. 9 is a perspective view showing a main construction of a fuel cell system according to a fifth embodiment of the present invention.

FIG. 9 is a perspective view showing a main portion of a fuel cell system according to the fifth embodiment. As shown in FIG. 9, in the fifth embodiment, the heating system 30–33 described in the first embodiment is not provided, but a heater 37 is provided. The heater 37 is disposed to directly heat a part of the fuel cell 10 during the warm-up operation of the fuel cell 10 without through the thermal medium (cooling water). An electric heater or a combustion heater can be used as the heater 37. For example, an electric heater is used as the heater 37, in the fifth embodiment. As shown in FIG. 9, the heater 37 is disposed to contact a part of each cell 10*a*. The heater 37 is operated using electric power from an auxiliary power source such as a secondary cell 19 or the electrical power generated by the fuel cell 10. Electric power can be applied to the heater 37 from the secondary cell 19 during the partial warm-up operation where the fuel cell 10 cannot generate electric power, and can be applied to the heater 37 from the fuel cell 10 during the entire warm-up operation where a part of the fuel cell 10 can generate electric power.

The above fuel cell system is operated in the following manner. At first, a part of each cell 1*a* in the fuel cell 10 is collectively heated by the heater 37 to perform the partial warm-up operation. At this time, no cooling water is circulated into the fuel cell 10. When the fuel-cell partial temperature Tfc becomes equal to or higher than a predetermined temperature, cooling water circulation is started, while hydrogen supply and air supply to the fuel cell 10 are started, thereby performing the entire warm-up operation. Thus, the entire warm-up operation of the fuel cell 10 can be performed using self heat generation of the fuel cell 10, due to power generation in the part of each cell 10*a* of the fuel cell 10. Accordingly, in the fifth embodiment, the same effect as in the first embodiment can be also obtained.

(Sixth Embodiment)

In the sixth embodiment, a location of the heating device used in the warm-up operation and a construction of the flow-path control unit are set different from those in the first embodiment. In the sixth embodiment, same portions as in the above-described first embodiment are indicated by the same reference numerals, and description thereof is omitted.

Figure 10:
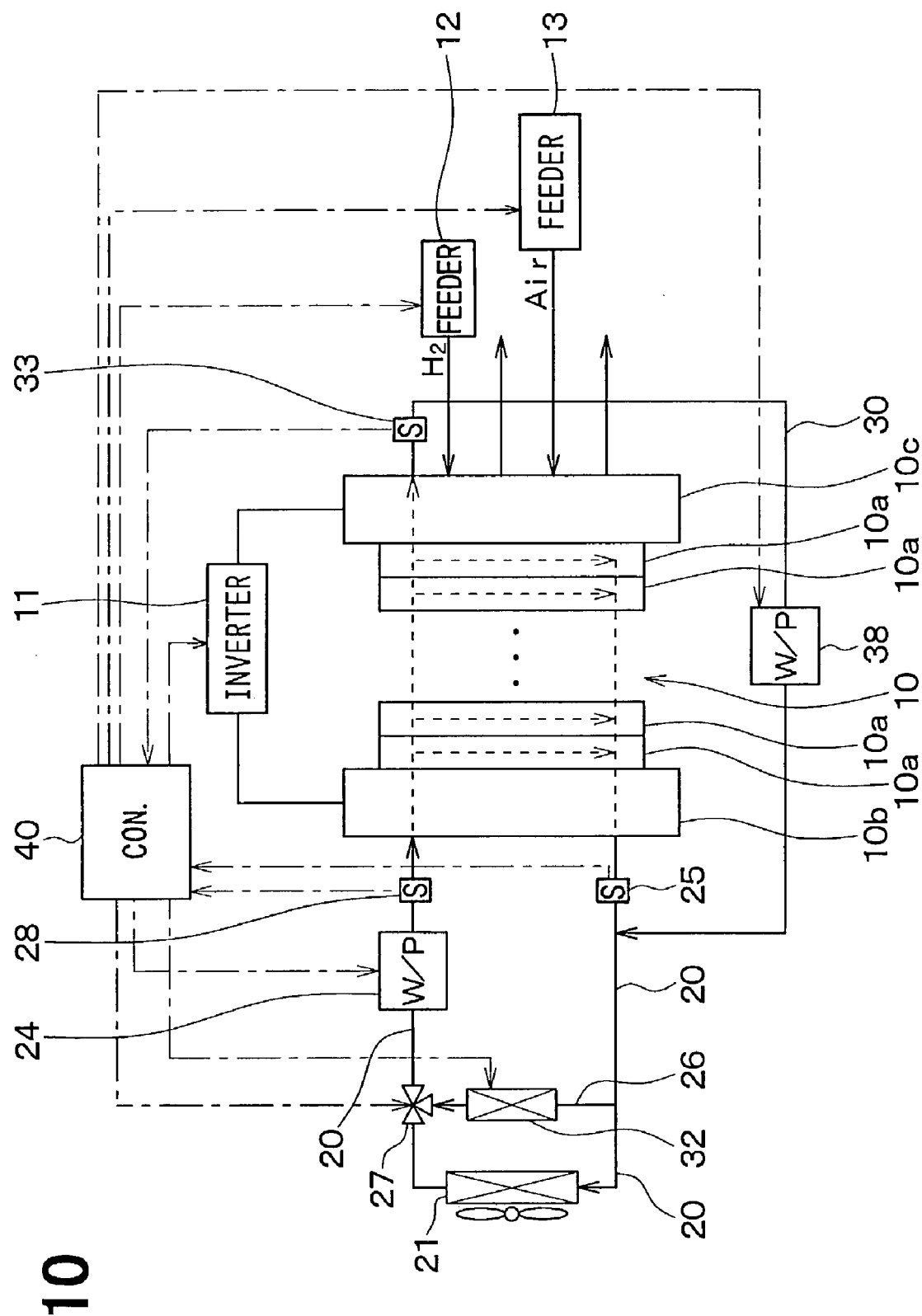
FIG. 10 is a schematic diagram showing an entire construction of a fuel cell system according to a sixth embodiment of the present invention.

In the first embodiment, the heater 32 used as a heating source is disposed directly around the fuel cell 10 to improve heat-transmitting efficiency to the fuel cell 10. However, in this case, because cooling water always passes through the heater 32 after the warm-up operation is ended, a pressure loss is generated in the thermal medium circulation path 20. Therefore, more electric power is consumed by the apparatus for circulating the thermal medium, thereby reducing operational efficiency of the fuel cell system. As shown in FIG. 10, in the sixth embodiment, a heating path 26, where the heater 32 is provided in the thermal medium circulation path 20, is provided in parallel with the radiator 21. A three-way valve 27 is provided in the thermal medium circulation path 20 at a join point between a side of the heater 32 and a side of the radiator 21. A flow of cooling water can be switched by the three-way valve 27 between the side of the radiator 21 and the side of the heater 32.

The first temperature sensor 33 is disposed in the bypass path 30 around the water outlet of the fuel cell 10, and the second temperature sensor 25 is disposed in the thermal medium circulation path 20 around the water outlet of the fuel cell 10. A third temperature sensor 28 is disposed in the thermal medium circulation path 20 around the water inlet of the fuel cell 10. The first temperature sensor 33 is disposed to indirectly detect the fuel-cell partial temperature Tfc, and the second temperature sensor 25 is disposed to indirectly detect a temperature (fuel-cell entire temperature) Tfco of all the fuel cell 10.

A bypass water pump (W/P) 38 is provided in the bypass path 30 as a thermal medium circulation device. A flow amount of cooling water circulated in the bypass path 30 can be adjusted by controlling a rotational speed of the bypass water pump 38. Since the bypass water pump 38 is only for simply circulating cooling water in the bypass path 30, the bypass water pump 38 can be constructed by a simple structure having a small capacity, with respect to the water pump 24 provided in the thermal medium circulation path 20. For example, a specification discharge amount (maximum discharge amount) of the bypass water pump 38 can be set equal to a minimum discharge amount of the water pump 24.

Figure 11:
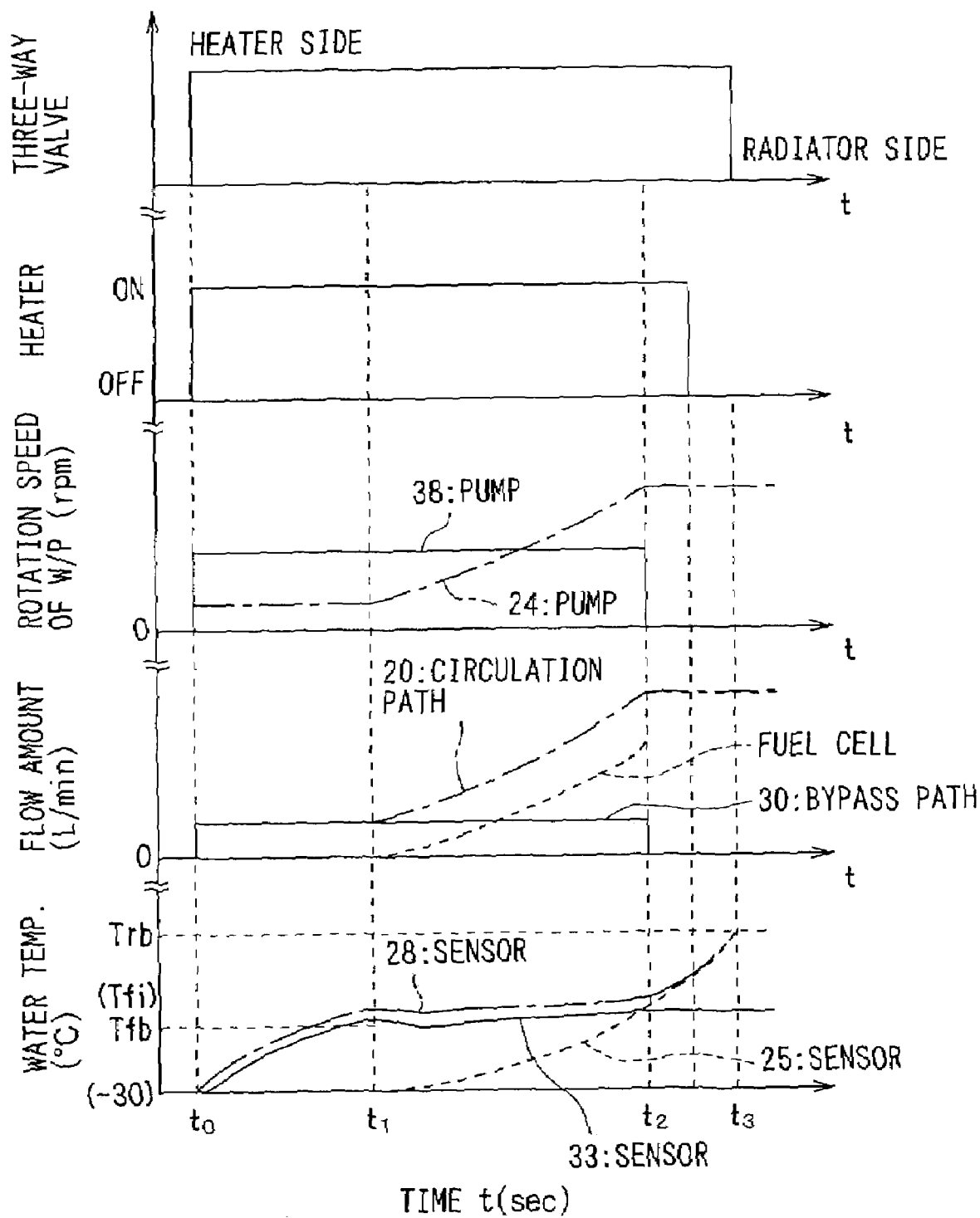
FIG. 11 is a timing diagram showing control operation of the fuel cell system shown in FIG. 10.

Next, operation in the fuel cell system according to the sixth embodiment will be now described. In FIG. 11, in a time period between time t0 and time t1, the temperature of a part of the fuel cell 10 is increased to the fuel-cell bypass temperature Tfb at which the fuel cell 10 can generate electric power. Further, in a time period between time t1 and time t2, the temperature of all the fuel cell 10 is increased to the fuel-cell bypass temperature Tfb. Further, in a time period between time t2 and time t3, the temperature of all the fuel cell 10 is increased to the radiator bypass temperature Trb at which the warm-up operation is ended.

At first, the three-way valve 27 is switched to a side of the heating path 26, and the heater 32 is turned on. At the same time, the water pumps 24, 38 are operated, and rotational speeds of water pumps 24, 38 are controlled so that a circulation amount of cooling water in the thermal medium circulation path 20 is made equal to that in the bypass path 30. Therefore, entire cooling water heated by the heater 32 flows into the bypass path 30, and only a part of each cell 10*a* of the fuel cell 10 is collectively heated. The part of the fuel cell 10 is collectively heated by circulating cooling water into the bypass path 30 until the fuel-cell partial temperature Tfc detected by the first temperature sensor 33 is increased to the fuel-cell bypass temperature Tfb. It is preferable to set the fuel-cell bypass temperature Tfb at a temperature where water generated in the fuel cell 10 is not frozen. For example, the fuel cell bypass temperature Tfb is set to be equal to or higher than 5° C.

When the fuel-cell partial temperature Tfc is increased to the fuel-cell bypass temperature Tfb, hydrogen supply and air (oxygen) supply to the fuel cell 10 are started, thereby starting power generation at the part of the fuel cell 10. Then, the rotational speed of the water pump 24 is controlled, thereby controlling an amount of cooling water flowing in the fuel cell 10. At this time, if the rotational speed of the bypass water pump 38 is kept constant so that an amount of cooling water flowing through the bypath path 30 is kept constant, an amount of cooling water flowing in all the fuel cell 10 can be controlled using a difference between a cooling-water amount flowing into the thermal medium circulation path 20 and a cooling-water amount flowing into the bypass path 30.

Then, the rotational speed of the water pump 24 is increased and an amount of cooling water circulating into the thermal medium circulation path 20 is increased so that the temperature of cooling water flowing into the fuel cell 10 detected by the third temperature sensor is directed to a predetermined temperature Tfi. The predetermined temperature Tfi can be set at a temperature where the moisture generated in the fuel cell 10 is not frozen as in the fuel-cell bypass temperature Tfb, for example, at 5° C. After starting power generation of the fuel cell 10, the predetermine temperature Tfi can be set at a lower temperature, for example, −5° C., because the fuel cell 10 is heated by the self heat generation due to the power generation. Therefore, a flow amount of cooling water can be increased while the same heating value is used for the cooling water, thereby transferring heat to a wider area in each cell 10a, and rapidly performing the warm-up operation in all the fuel cell 10.

When the fuel-cell entire temperature Tfco detected by the second temperature sensor 25 becomes higher than the fuel-cell partial temperature Tfc detected by the first temperature sensor 33, it is determined that all of the fuel cell 10 can generate electric power. Therefore, the bypass water pump 38 is stopped, and only the water pump 24 is driven, thereby circulating all cooling water into all the fuel cell 10, and increasing the temperature of all the fuel cell 10. Thereafter, the heater 32 is turned off. When the fuel-cell entire temperature Tfco is increased to the radiator bypass temperature Trb, the three-way valve 27 is switched so that cooling water flows into the radiator 21. Thus, the warm-up operation of the fuel cell 10 is ended, and a normal operation (normal power-generation operation) of the fuel cell 10 can be performed.

According to the sixth embodiment of the present invention, since the heater 32 as a heating device for heating the thermal medium (cooling water) is provided in parallel with the radiator 21, no thermal medium passes through the heater 32 in the normal operation. Accordingly, a pressure loss in the thermal medium circulation path 20 can be restricted to a minimum level in the normal operation, thereby preventing power consumption of accessories for circulating cooling water from being increased. Further, since the bypass water pump 38 as a thermal medium circulation device is provided in the bypass path 30, flow-amount control performance of the thermal medium can be improved. Further, since a general water pump can be used as the bypass water pump 38, a fuel cell system can be produced in lower cost.

(Seventh Embodiment)

In a fuel cell system of the seventh embodiment, a heating device using electric power generated by the fuel cell 10 is added to the fuel cell system described in the above sixth embodiment. In the seventh embodiment, the same portions as the sixth embodiment are indicated by the same reference numerals, and description thereof is omitted.

Figure 12:
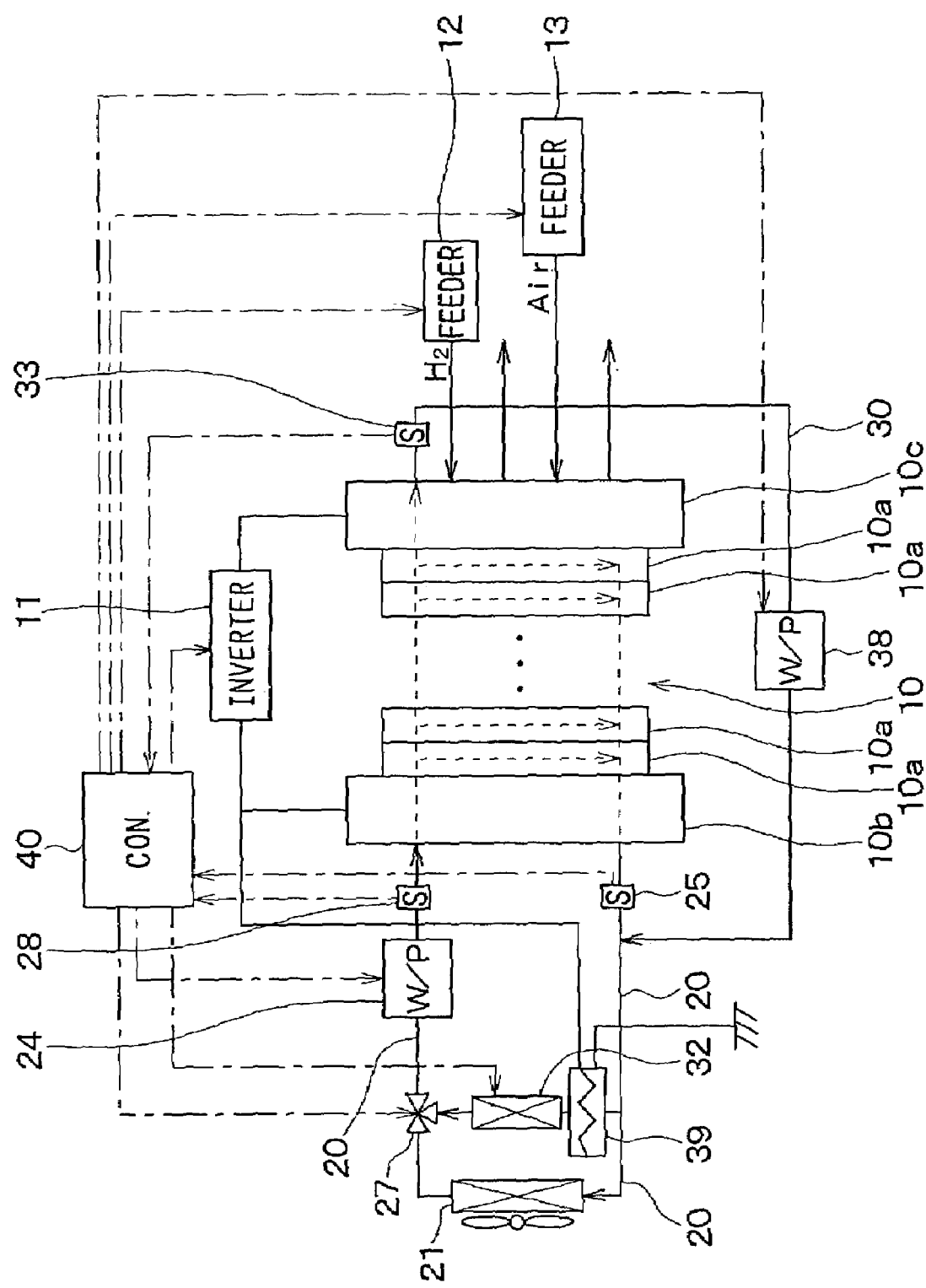
FIG. 12 is a schematic diagram showing an entire construction of a fuel cell system according to a seventh embodiment of the present invention.

FIG. 12 shows an entire structure of the fuel cell system of the seventh embodiment. As shown in FIG. 12, an electric heater 39 is provided in the heating path 26. The electric heater 39 heats cooling water flowing in the heating path 26 using electric power supplied from the fuel cell 10.

Electric power generated by the fuel cell 10 is consumed as motive power of a main motor for running a vehicle, as motive power of peripheral accessories for charging a secondary cell and the like through the inverter 11. However, a vehicle is generally stopped during the warm-up operation of the fuel cell 10, and charging capacity of the fuel cell 10 is restricted in a low temperature environment. Therefore, electric power cannot be sometimes consumed so much. In the seventh embodiment, the electric heater 39 for transforming electric power from the fuel cell to thermal energy is provided, and the fuel cell system is constructed so that cooling water is heated using the thermal energy, thereby performing rapid warm-up operation of the fuel cell 10.

Figure 13:
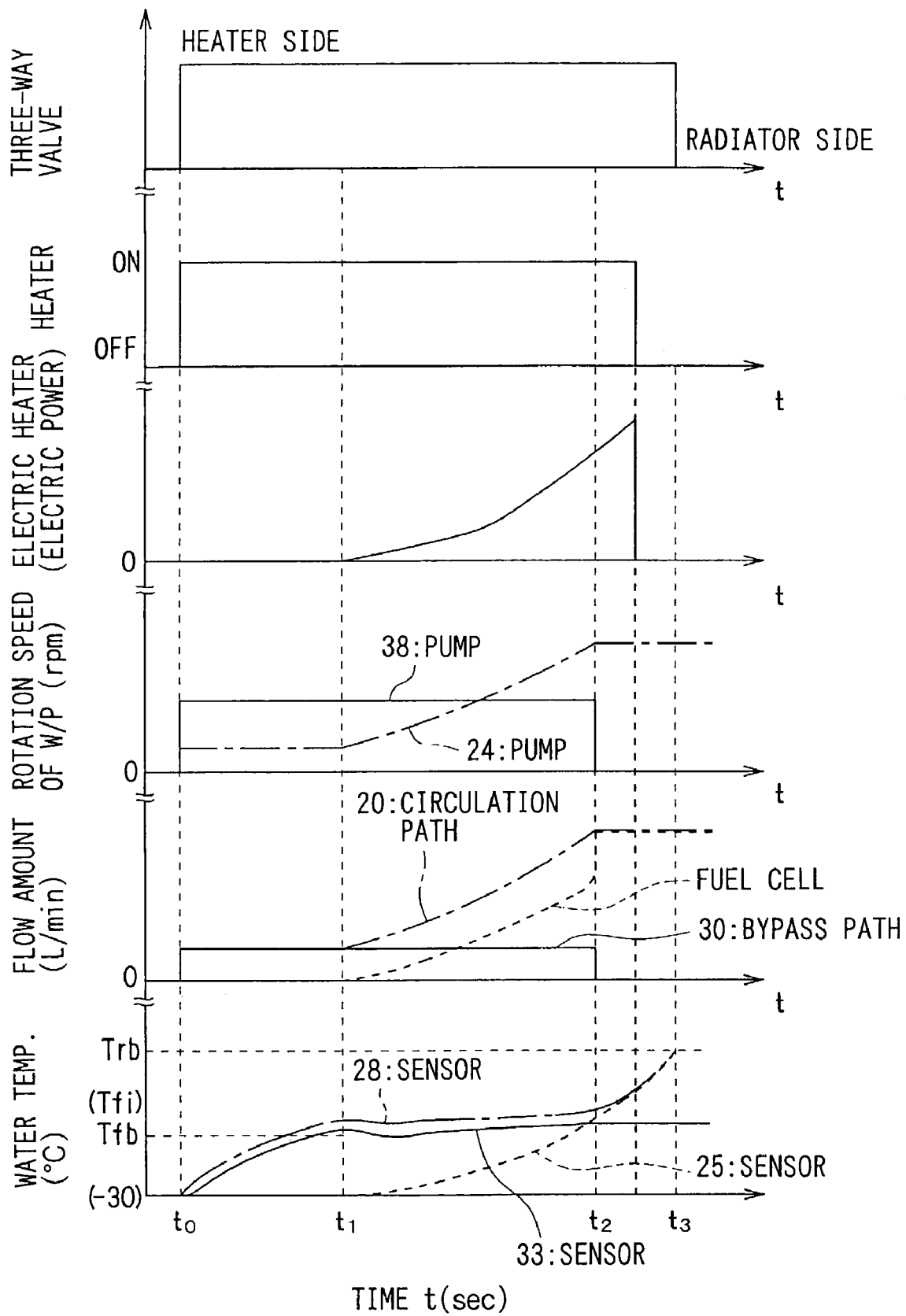
FIG. 13 is a timing diagram showing control operation of the fuel cell system shown in FIG. 12.

As shown in FIG. 13, when the fuel-cell partial temperature Tfc is increased to the fuel-cell bypass temperature Tfb, the fuel cell 10 starts power generation. In this case, electric power generated by the fuel cell 10 is applied to the electric heater 39, so that cooling water is also heated by the electric heater 39 in addition to the heater 32. As a result, the heat quantity to be supplied to cooling water is increased, and the amount of cooling water flowing into all the fuel cell 10 is increased, thereby performing more rapid warm-up operation.

(Eighth Embodiment)

Figure 14:
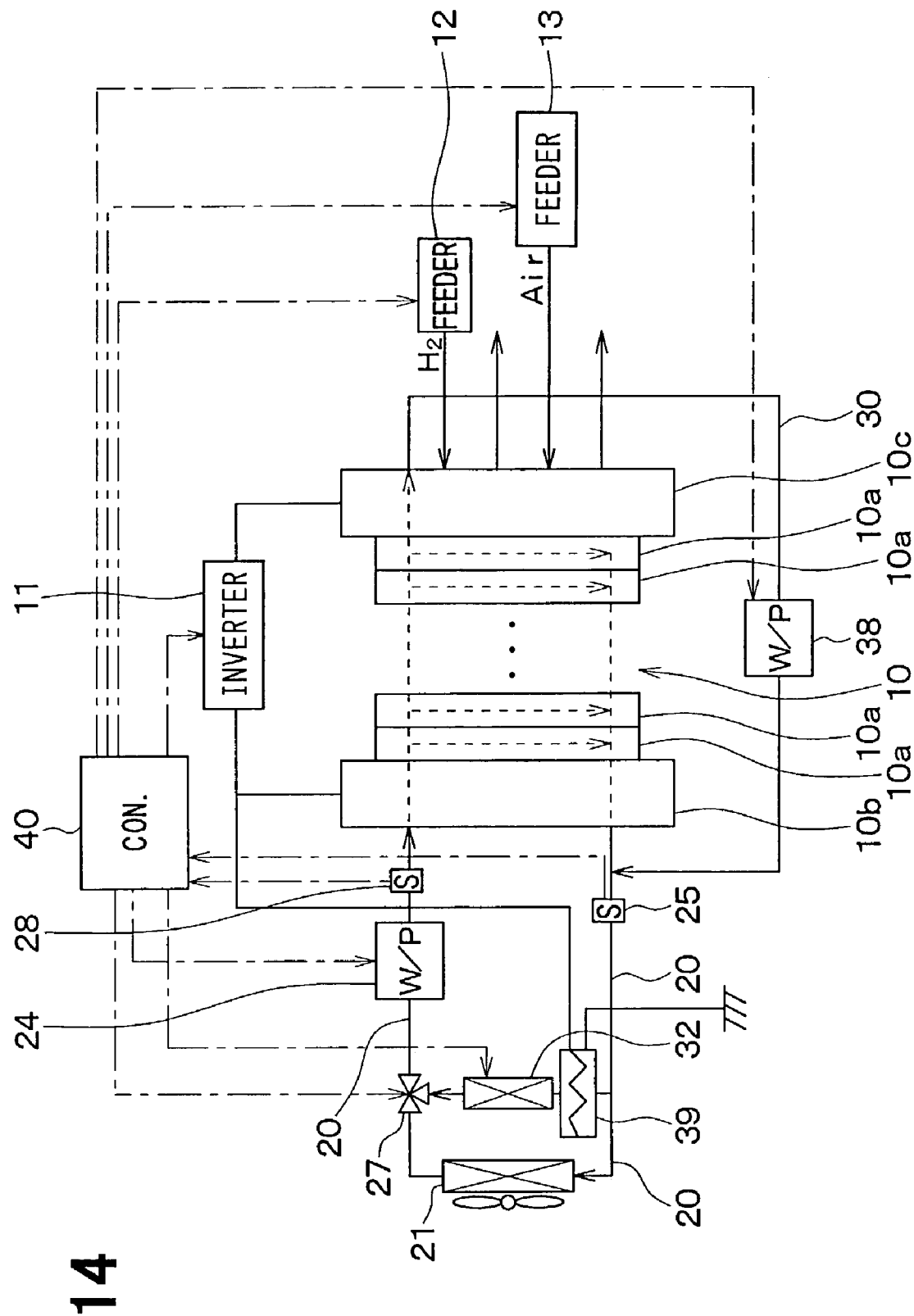
FIG. 14 is a schematic diagram showing an entire construction of a fuel cell system according to an eighth embodiment of the present invention.

In a fuel cell system of the eighth embodiment, as shown in FIG. 14, the first temperature sensor 33 is eliminated from the fuel cell system described in the above seventh embodiment. In the eighth embodiment, the same portions as the seventh embodiment are indicated by the same reference numerals, and description thereof is omitted.

As shown in FIG. 14, the first temperature sensor 33, provided in the bypath path 30 around the water outlet of the fuel cell 10 in FIG. 12, is eliminated. Further, the second temperature sensor 25, provided in the thermal medium circulation path 20 around the water outlet of the fuel cell 10 in FIG. 12, is provided in the thermal medium circulation path 20 at a downstream side of a connection point between the thermal medium circulation path 20 and the bypass path 30.

According to the eighth embodiment, when a part of the fuel cell 10 is collectively heated by circulating cooling water only in the bypass path 30, the fuel-cell partial temperature Tfc can be indirectly detected by the second temperature sensor 25. When cooling water is circulated into all the fuel cell 10, the fuel-cell entire temperature Tfco can be indirectly detected by the second temperature sensor 25. Accordingly, a flow amount condition of cooling water, for maintaining the temperature of cooling water flowing into the fuel cell 10 at a constant temperature, can be calculated based on an amount of cooling water flowing in the heater 32, a heating quantity of the heater 32 and the temperature detected by the second temperature sensor 25.

Figure 15:
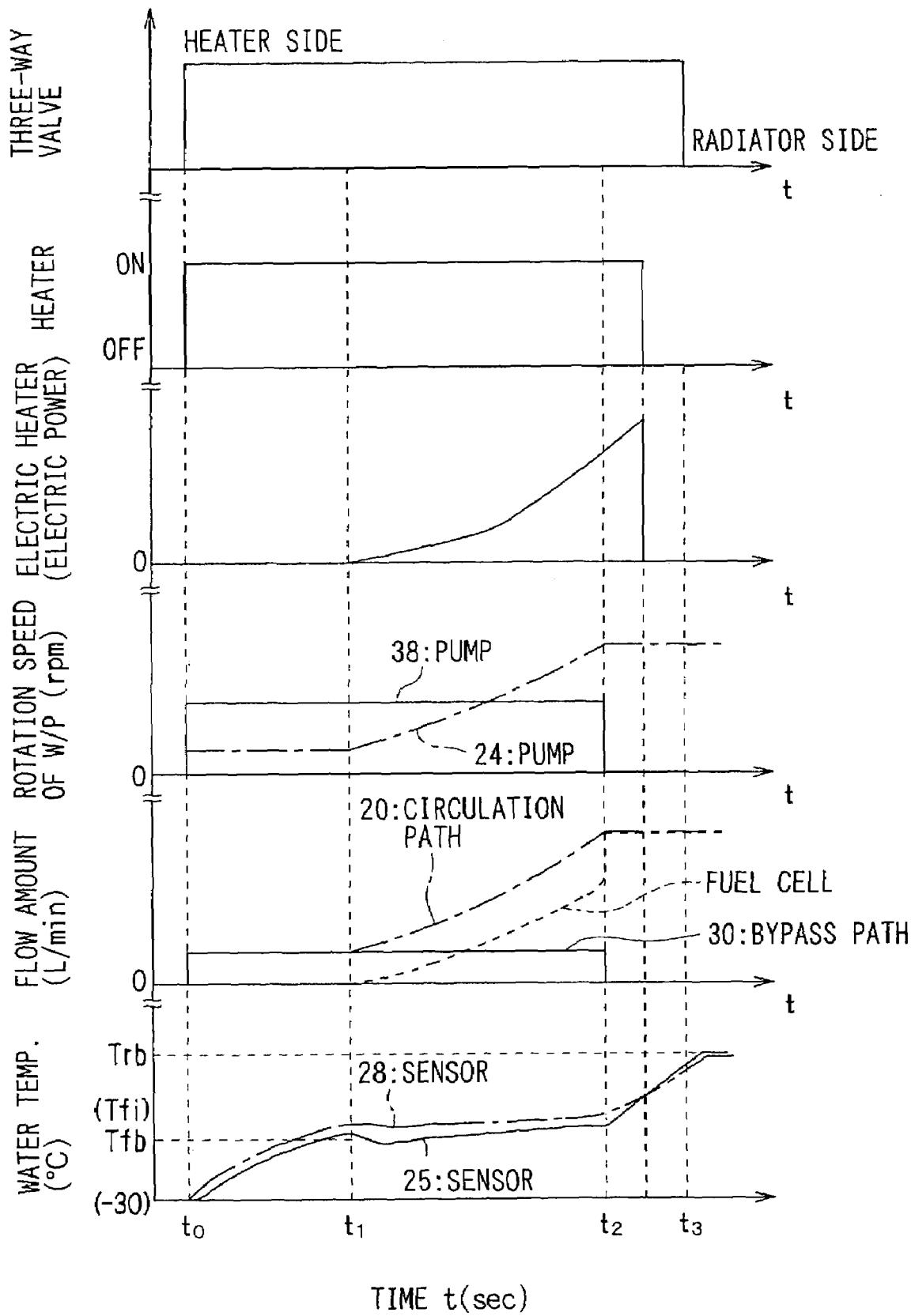
FIG. 15 is a timing diagram showing control operation of the fuel cell system shown in FIG. 14.

As shown in FIG. 15, when the cooling-water temperature detected by the second temperature sensor 25 becomes higher than the fuel-cell bypass temperature Tfb while a part of the fuel cell 10 is collectively heated, cooling water is circulated into all the fuel cell 10 to heat all the fuel cell 10. Since all of the fuel cell 10 is heated by cooling water, the detection temperature of the second temperature sensor 25 is temporarily reduced. Thereafter, the detection temperature of the second temperature sensor 25 is increased again to be higher than the fuel-cell bypass temperature Tfb. When the detection temperature of the second temperature sensor 25 is higher than the fuel-cell bypass temperature Tfb, it is determined that all the fuel cell 10 can generate electric power. Thus, in the eighth embodiment, the same effect as in the seventh embodiment can be obtained, and construction of the fuel cell system can be simplified by reducing the number of temperature sensors.

(Ninth Embodiment)

In the ninth embodiment, an arrangement position of the heater 32 is different from that in the above-described sixth embodiment. In the ninth embodiment, the same portions as the sixth embodiment are indicated by the same reference numerals, and detail description thereof is omitted.

Figure 16:
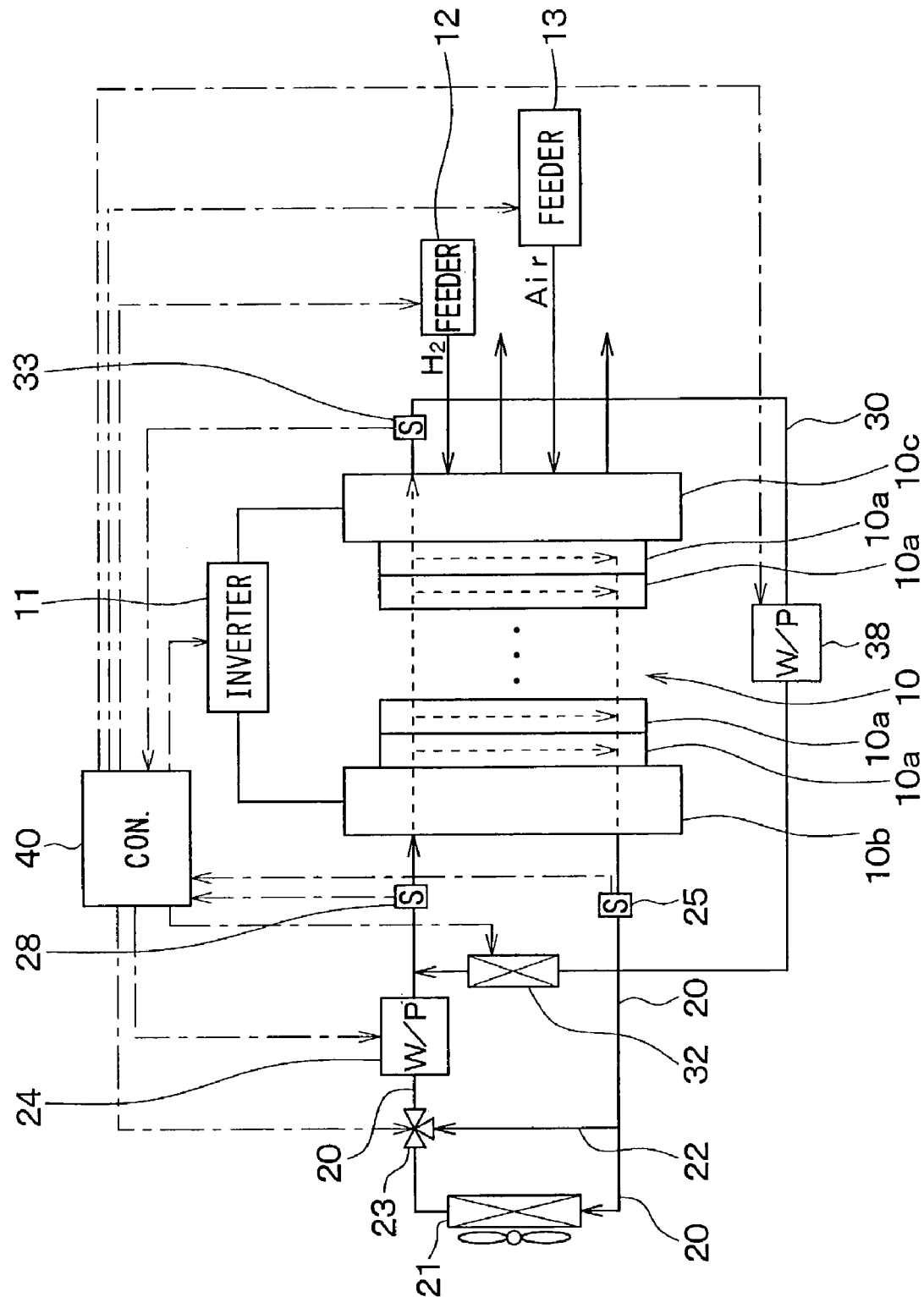
FIG. 16 is a schematic diagram showing an entire construction of a fuel cell system according to a ninth embodiment of the present invention.

As shown in FIG. 16, in the ninth embodiment, the bypass path 30 is connected to the thermal medium circulation path 20 at a position downstream from the water pump 24 and upstream from the fuel cell 10. The heater 32 is provided in the bypass path 30 at a downstream side of the bypass water pump 38. In this construction, when a part of the fuel cell 10 is collectively heated, cooling water is circulated into the bypass water pump 38, the heater 32 and the part of the fuel cell 10, in this order. Further, the radiator bypass path 22 through which cooling water bypasses the radiator 21, and the temperature control valve 23 for adjusting the amount of cooling water flowing into the radiator 21 are provided in the thermal medium circulation path 20.

Figure 17:
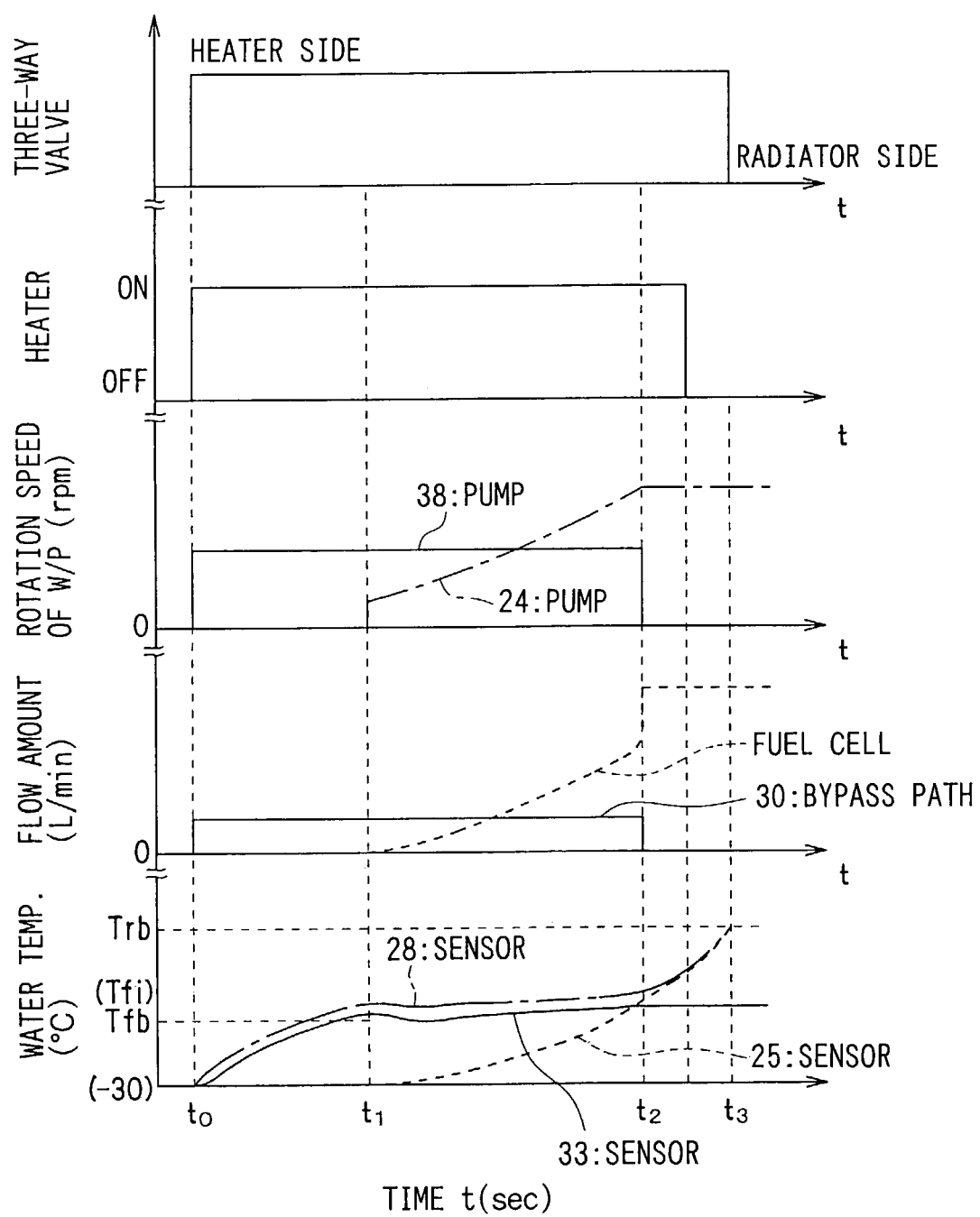
FIG. 17 is a timing diagram showing control operation of the fuel cell system shown in FIG. 16.

As shown in FIG. 17, in the ninth embodiment, only the bypass water pump 38 is operated in the time period from the time t0 and the time t1, and the water pump 24 is also operated in addition to the bypass water pump 38 in the time period from the time t1 to the time t2. Thereafter, only the water pump 24 is operated after the time t2. According to the ninth embodiment, the same effect as in the sixth embodiment can be obtained. Further, since a thermal medium is circulated in a short path when a part of the fuel cell 10 is collectively heated, the partial heating operation can be ended for a short time.

(Tenth Embodiment)

In the tenth embodiment of the present invention, hydrogen mixed with air (oxygen) and air mixed with hydrogen are supplied to the fuel cell 10. The other parts of the tenth embodiment are similar to those of the fuel cell system according to the first embodiment. In the tenth embodiment, the same portions as the above-described first embodiment are indicated by the same reference numerals, and description thereof is omitted.

Figure 18:
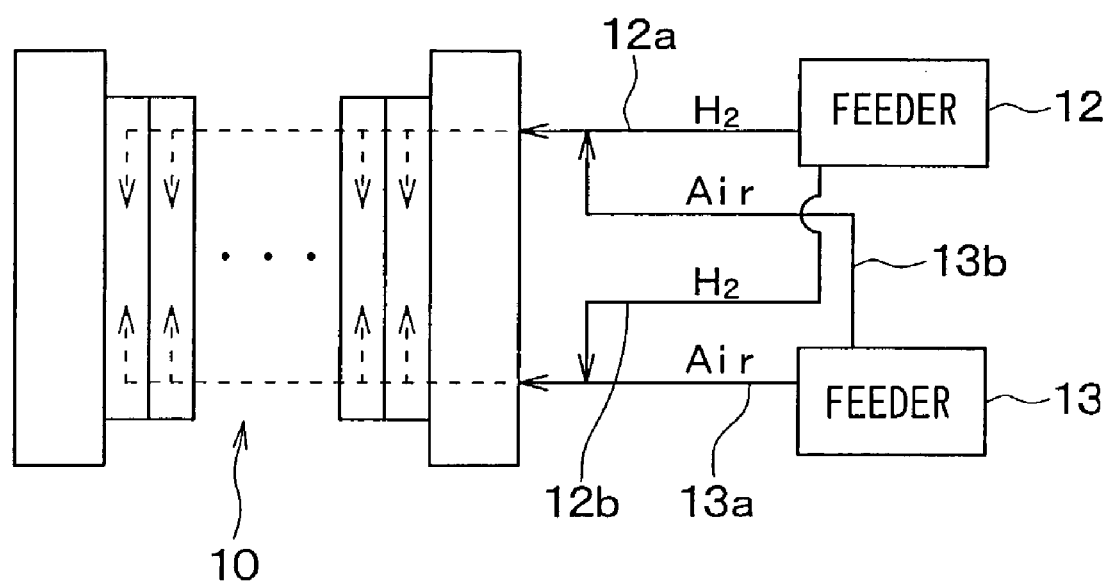
FIG. 18 is a schematic diagram showing a main construction of a fuel cell system according to a tenth embodiment of the present invention.

FIG. 18 shows a main portion of a fuel cell system according to the tenth embodiment. As shown in FIG. 18, an air mixing path 13b through which air from the air feeder 13 flows is connected to the hydrogen supply path 12a through which hydrogen from the hydrogen feeder 12 is supplied to the fuel cell 10. Further, a hydrogen mixing path 12b through which hydrogen from the hydrogen feeder 12 flows is connected to the air supply path 13a through which air from the air feeder 13 is supplied to the fuel cell 10. Therefore, air is mixed into the hydrogen flowing through the hydrogen supply path 12a, and hydrogen is mixed into the air flowing through the air supply path 13a.

According to the tenth embodiment, air is added from the air mixing path 13b to hydrogen flowing through the hydrogen supply path 12a when the warm-up operation of the fuel cell 10 is performed, so that mixture gas of hydrogen and air is introduced to the hydrogen electrode. Similarly, mixture gas of air and hydrogen is introduced also to the oxygen electrode. A catalyst normally composed of platinum (Pt) is carried on each of the hydrogen and oxygen electrodes of the fuel cell 10. Therefore, when mixture gas of hydrogen and air is introduced to each of the hydrogen and oxygen electrodes, the hydrogen is catalytically combusted on its catalyst. Using heat generated by this catalytic reaction, the fuel cell 10 can be partially heated.

Figure 19:
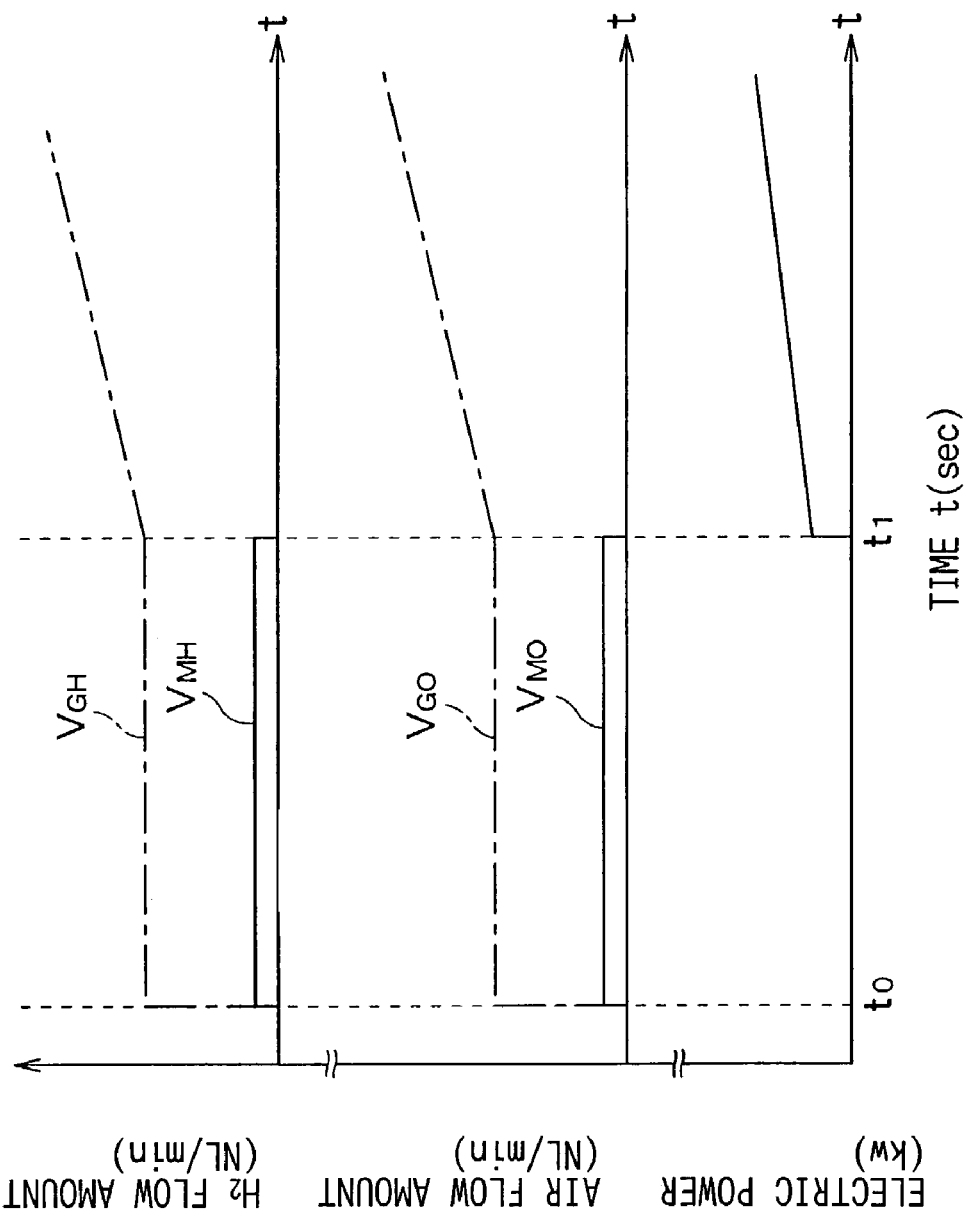
FIG. 19 is a timing diagram showing control operation of the fuel cell system shown in FIG. 18.

In the tenth embodiment, as shown in FIG. 19, while a part of the fuel cell 10 is collectively heated in the time period from the time t0 to the time t1, mixture gas of hydrogen and air (oxygen) is introduced to each of the hydrogen and oxygen electrodes of the fuel cell 10. In FIG. 19, VGH indicates a supply flow amount of hydrogen, VMH indicates a mixing flow amount of hydrogen, VGO indicates a supply flow amount of air, VMO indicates a mixing flow amount of air.

Figure 20A:
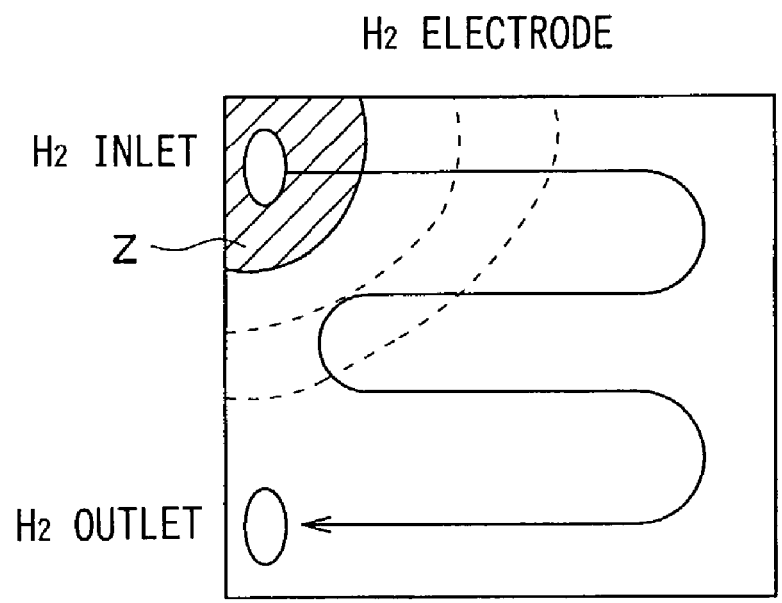
FIG. 20A is a schematic side view showing a heated state in a cell at a side of a hydrogen electrode in a fuel cell of the fuel cell system shown in FIG. 18.
Figure 20B:
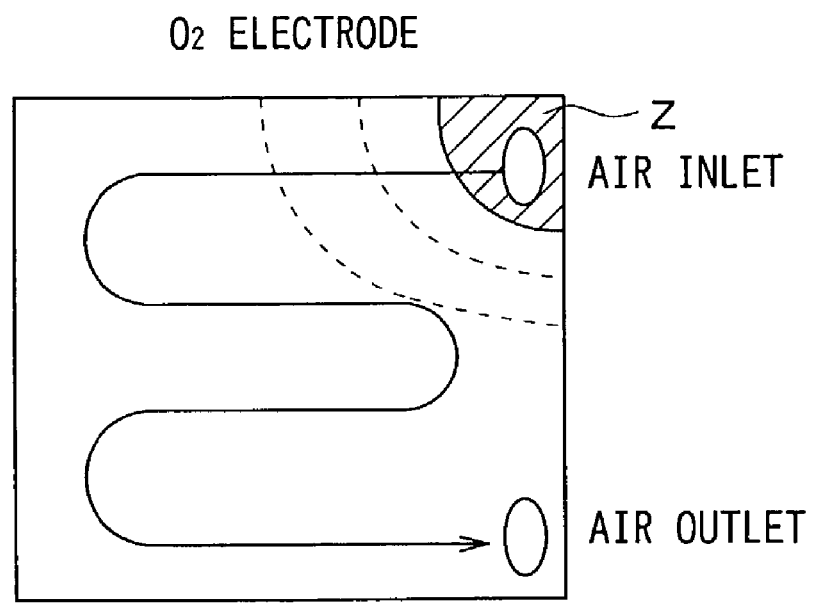
FIG. 20B is a schematic side view showing a heated state in a cell at a side of an oxygen electrode in the fuel cell.

FIG. 20A shows a heating state on a cell surface of the fuel cell 10 in the hydrogen electrode side, and FIG. 20B shows a heating state on a cell surface of the fuel cell 10 in an air electrode side. As shown in FIGS. 20A, 20B, mixture gas of hydrogen and air (oxygen) is catalytically combusted on the hydrogen and oxygen electrodes around the hydrogen and air inlets, respectively, so that a heated zone Z is formed around each of the hydrogen and air inlets. An area of the heated zone Z is changed in accordance with the temperature of the fuel cell 10 at the time t0. However, the heated zone Z can be controlled within a predetermined range by controlling a ratio of the supply flow amount VGH of hydrogen to the mixing flow amount VMO of air to be mixed with the hydrogen, and a ratio of supply flow amount VGO of air to flow amount VMH of hydrogen to be mixed with the air.

After the partial warm-up operation of the fuel cell 10 is ended at time t1, power generation is started at the heated zone Z, thereby increasing the power generation area. At this time (time t1), the mixing flow amount VMH of hydrogen to be mixed into the air and the mixing flow amount VMO of air to be mixed into the hydrogen are set at zero, and supply flow amount VGH of hydrogen and supply flow amount VMO of air are controlled to be increased. Thus, a part of the fuel cell 10 can be effectively heated using the catalytic combustion reaction.

(Eleventh Embodiment)

Figure 21:
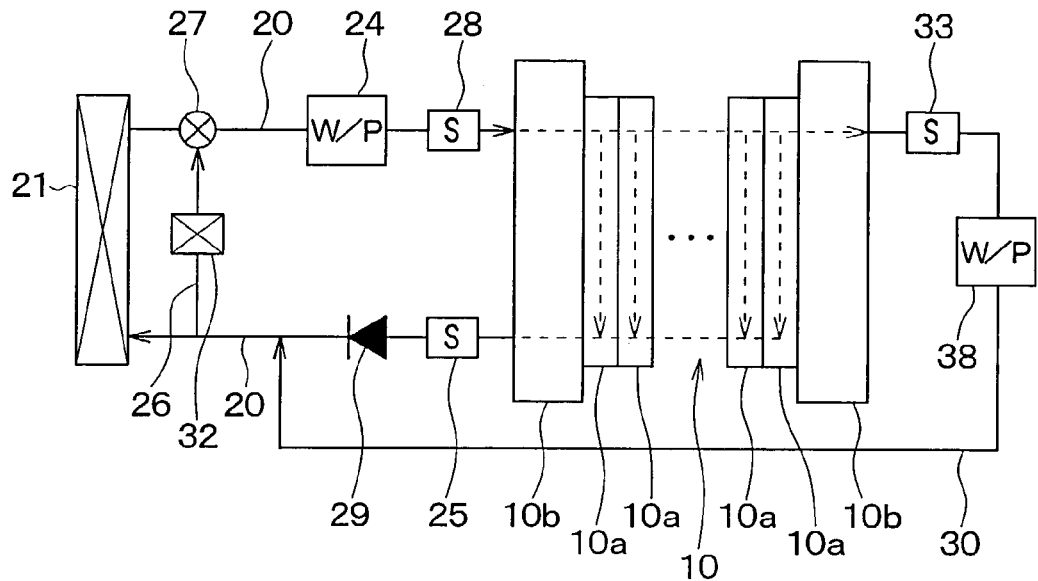
FIG. 21 is a schematic diagram showing a main construction of a fuel cell system according to an eleventh embodiment of the present invention.

FIG. 21 shows a main structure of a fuel cell system according to the eleventh embodiment. In the eleventh embodiment of the present invention, a check valve 29 is provided around a cooling water outlet of the fuel cell 10, relative to the fuel cell system of the above-described sixth embodiment shown in FIG. 10. The check valve 29 is disposed in the thermal medium circulation path 20 at a downstream side of the fuel cell and at an upstream side of a join point at which the bypass path 30 is joined with the thermal medium circulation path 20. Further, an electromagnetic valve for switching the flow direction can be used as the valve 27.

A diameter of a pipe member defining the bypass path 30 is set smaller than a diameter of a pipe member defining the thermal medium circulation path 20. For example, the diameter of the pipe member defining the bypass path is about 15 mm, and the diameter of the pipe member defining the thermal medium circulation path 20 is about 30 mm. In this case, it can prevent the cooling water from reversely flowing toward the outlet of the fuel cell 10 from the bypass path 30 through the thermal medium circulation path 20, while the cooling water circulates in the bypass path 30 in the warm-up operation.

Further, by setting the diameter of the pipe member defining the bypass path 30 to be smaller, a cooling water amount in the bypass path 30 can be made smaller, and the amount of the cooling water heated by the heater 32 in the warm-up operation can be made smaller. Thus, the temperature of cooling water can be rapidly increased in the warm-up operation, and the heating time period for heating the fuel cell 10 can be shortened.

(Twelfth Embodiment)

Figure 22:
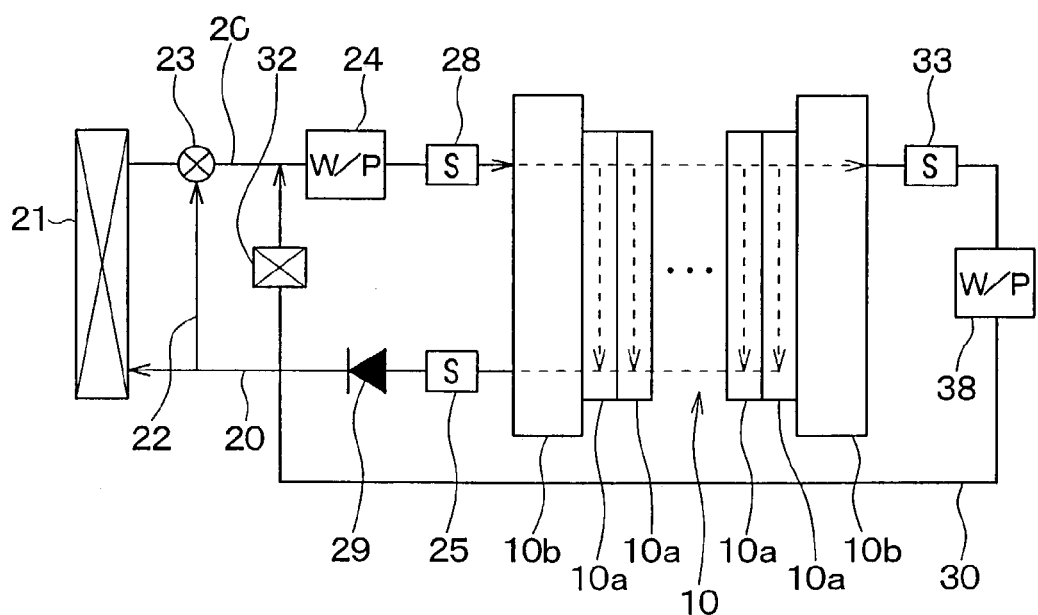
FIG. 22 is a schematic diagram showing a main construction of a fuel cell system according to a twelfth embodiment of the present invention.

FIG. 22 shows a main structure of a fuel cell system according to the twelfth embodiment. In the twelfth embodiment, relative to the fuel cell system of the above-described ninth embodiment shown in FIG. 16, the check valve 29 is provided similarly to the above-described eleventh embodiment, and the arrangement position of the water pump 24 is changed. In the twelfth embodiment, as shown in FIG. 22, the water pump 24 is provided in the thermal medium circulation path 20 at an upstream side of the fuel cell 10 and at a downstream side of a join point of the bypass path 30 joined to the thermal medium circulation path 20.

According to the twelfth embodiment, when a part of the fuel cell 10 is collectively heated in the warm-up operation, cooling water can be circulated using both the water pumps 24, 38. If a non-freezing liquid is used as the thermal medium, the viscosity of the cooling water becomes high in a low temperature such as −30° C., and the pump load becomes high. In this case, by operating both the water pumps 24, 38, the pump capacity can be increased.

(Thirteenth Embodiment)

Figure 23:
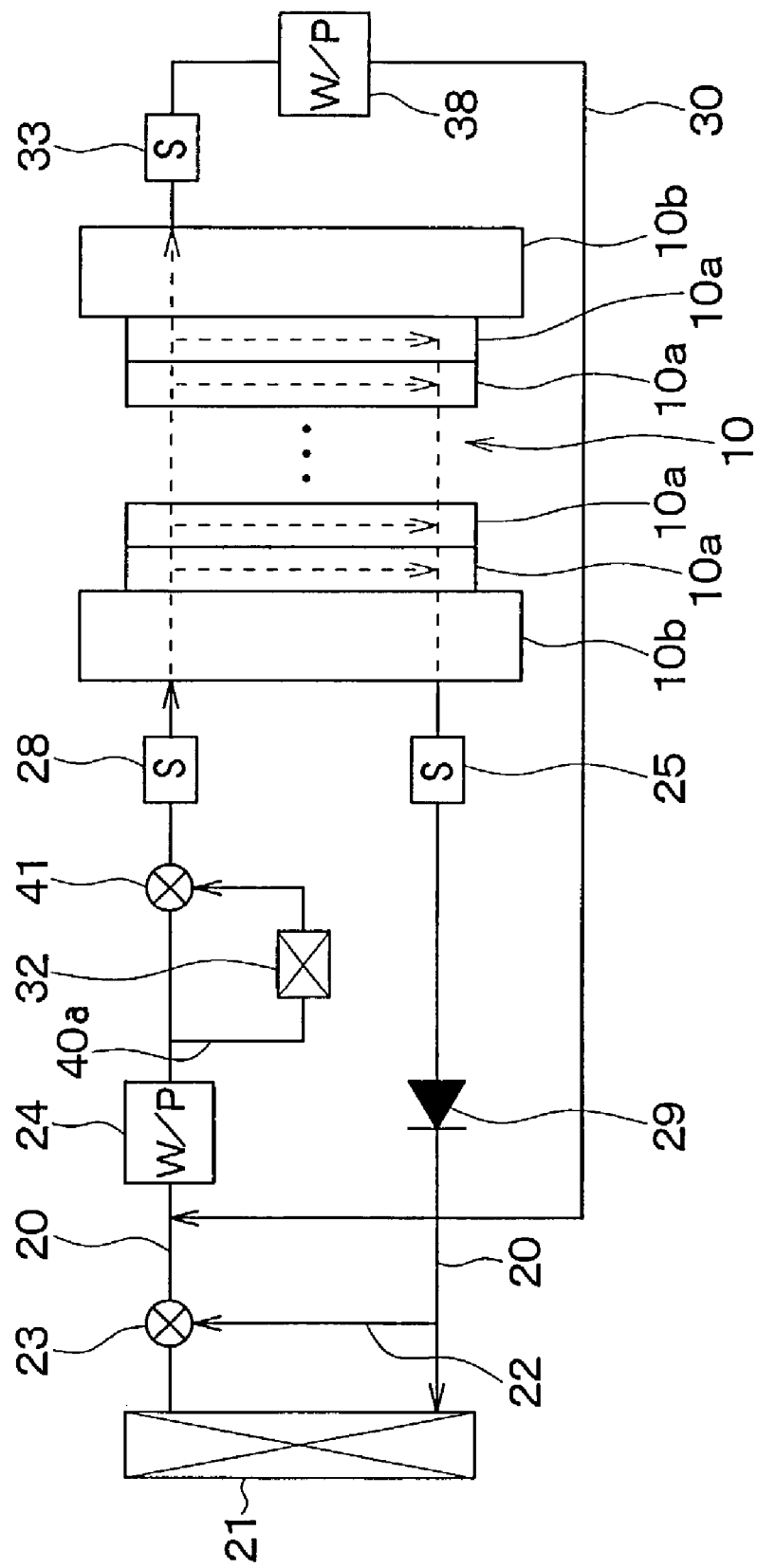
FIG. 23 is a schematic diagram showing a main construction of a fuel cell system according to a thirteenth embodiment of the present invention.

FIG. 23 shows a fuel cell system of the thirteenth embodiment. In the thirteenth embodiment, the arrangement position of the heater 32 is changed, relative to the fuel cell system described in the above twelfth embodiment. In the thirteenth embodiment, as shown in FIG. 23, the heater 32 is provided in the thermal medium circulation path 20 at a downstream side of the join portion of the bypass path with the thermal medium circulation path 20, between the water pump 24 and the fuel cell 10. A heating bypass path 40aa is branched from the thermal medium circulation path 20, and is rejoined to the thermal medium circulation path 20. In the thirteenth embodiment, the heater 32 is disposed in the heating bypass path 40a. A flow adjustment valve 41 is disposed at a rejoined point where the heating bypass path 40a is rejoined to the thermal medium circulation path 20, to adjust a flow amount of cooling water passing through the heating bypass path 40a and a flow amount of cooling water flowing through the thermal medium circulation path 20 while bypassing the heating bypass path 40a.

According to the thirteenth embodiment of the present invention, in the warm-up operation, the flow adjustment valve 41 is adjusted so that cooling water flows through the heater core 32 provided in the heating bypass path 40a. At this time, the flow amount of cooling water flowing through the heater 32 is adjusted by the flow adjustment valve 41, so that the heating temperature of cooling water can be adjusted and the heating temperature of the fuel cell 10 can be adjusted. Further, because the heater 32 is disposed at a downstream side of the water pump 24, it can prevent heat of the cooling water heated by the heater 32 from being lost in the water pump 24 having a large thermal capacity.

On the other hand, in the normal operation (normal power-generation operation) of the fuel cell system, the flow adjustment valve 41 is controlled so that cooling water only passes through the thermal medium circulation path 20 without being flowing through the heating bypass path 40a. Therefore, even when a large amount of cooling water (100L/min) is circulated in the thermal medium circulation path 20 for cooling the fuel cell 10, pressure loss due to the heater 32 can be prevented. Further, it can prevent a large amount of cooling water from flowing into the heater core 32, and durability of the heater 32 can be improved.

(Fourteenth Embodiment)

Figure 24:
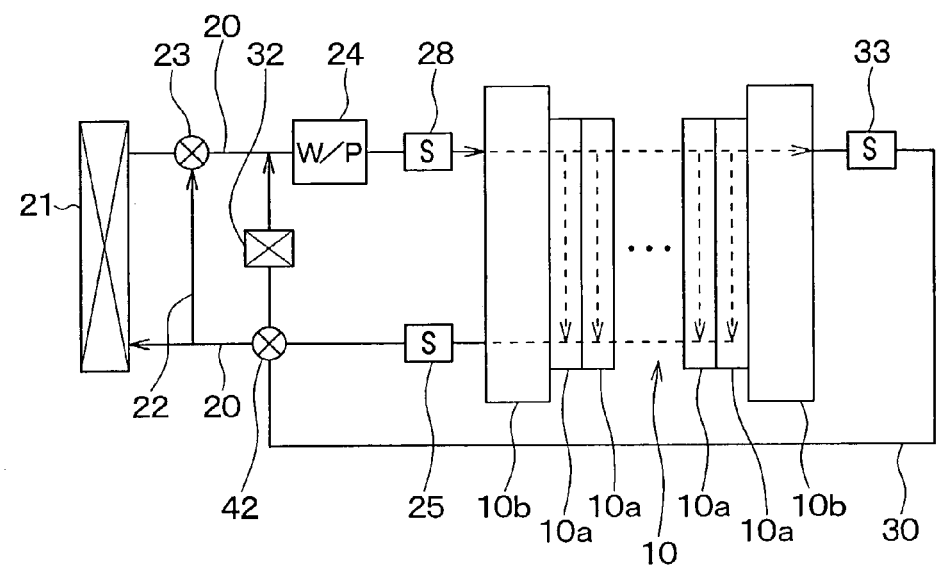
FIG. 24 is a schematic diagram showing a main construction of a fuel cell system according to a fourteenth embodiment of the present invention.

FIG. 24 shows a fuel cell system according to the fourteenth embodiment of the present invention. In the fuel cell system of the fourteenth embodiment, a four-way valve 42 is disposed but the check valve 29 is omitted, relative to the fuel cell system of the above-described twelfth embodiment.

In the fourteenth embodiment, the bypass path 30 is connected to the thermal medium circulation path 20 at a downstream side of the Fuel cell 10, before being joined to the thermal medium circulation path 20 at an upstream side of the fuel cell 10. The four-way valve 42 is provided at a join point between the bypass path 30 and the thermal medium circulation path 20 at a downstream side of the fuel cell 10. The four-way valve 42 is disposed to switch a flow of cooling water from the thermal medium circulation path 20 or the bypass pass 30 to the thermal medium circulation path 20 or the bypass path 30.

According to the fourteenth embodiment of the present invention, in the warm-up operation, a first closed circuit is formed by the four-way valve 42, so that cooling water flows through the fuel cell 10, the bypass path 30, the heater 32 and the water pump 24 in this order, to heat a part of the fuel cell 10.

Next, when the temperature of the fuel cell 10 is increased to a predetermined temperature at which the part of the fuel cell 10 can generate electrical power, a second closed circuit is formed by the four-way valve 42, so that cooling water flows through the fuel cell 10, the thermal medium circulation path 20, the four-way valve 42, the bypass path 30, the heater 32 and the water pump 24, in this order. In this case, the power generation of the fuel cell 10 is started. Thus, the temperature increase of the fuel cell 10 is facilitated using self heat generation of the fuel cell 10.

Next, when the temperature of the fuel cell 10 is further increased and it is necessary to cool the fuel cell 10, a third closed circuit is formed by the four-way valve 42, so that cooling water flows through the fuel cell 10, the thermal medium circulation path 20, the radiator 21 and the water pump 24, in this order. Thus, the fuel cell 10 can be cooled by the cooling water circulating in the third closed circuit.

Accordingly, in the fourteenth embodiment, by providing the four-way valve 42 at the join point between the bypass path 30 and the thermal medium circulation path 20 at the downstream side of the fuel cell 10, the flow path of cooling water can be arbitrarily changed to form the first, second and third closed circuits. Further, in the fourteenth embodiment, only using the water pump 24, water can circulate in each of the first, second and third closed circuits.

(Fifteenth Embodiment)

Figure 25:
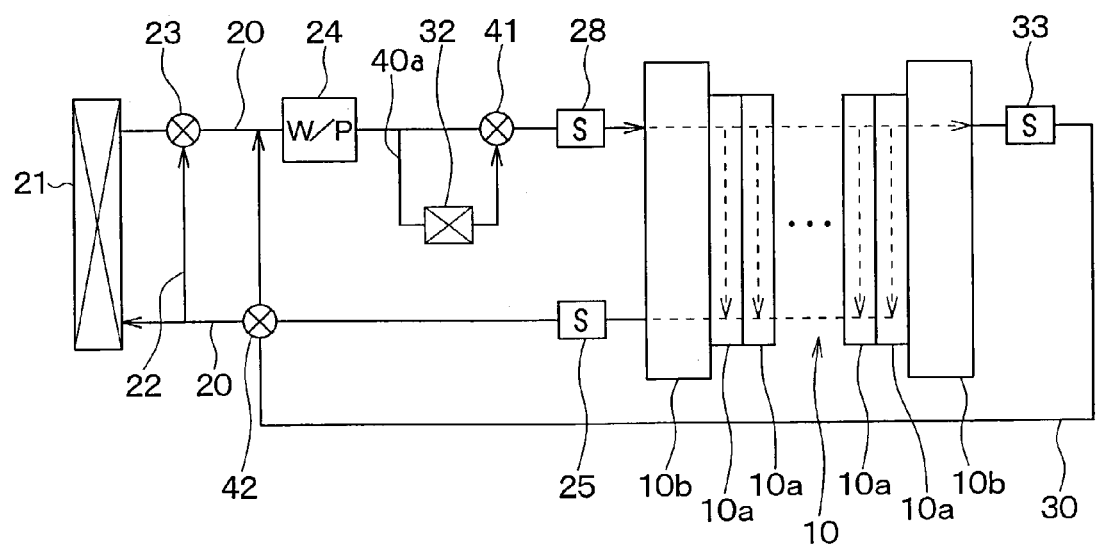
FIG. 25 is a schematic diagram showing a main construction of a fuel cell system according to a fifteenth embodiment of the present invention.

FIG. 25 shows a fuel cell system according to the fifteenth embodiment of the present invention. In the fifteenth embodiment, relative to the fuel cell system of the fourteenth embodiment, the arrangement position of the heater 32 is changed similarly to the thirteenth embodiment shown in FIG. 23. Accordingly, in the fifteenth embodiment, the same effect as that in the thirteenth embodiment can be obtained.

(Sixteenth Embodiment)

Figure 26:
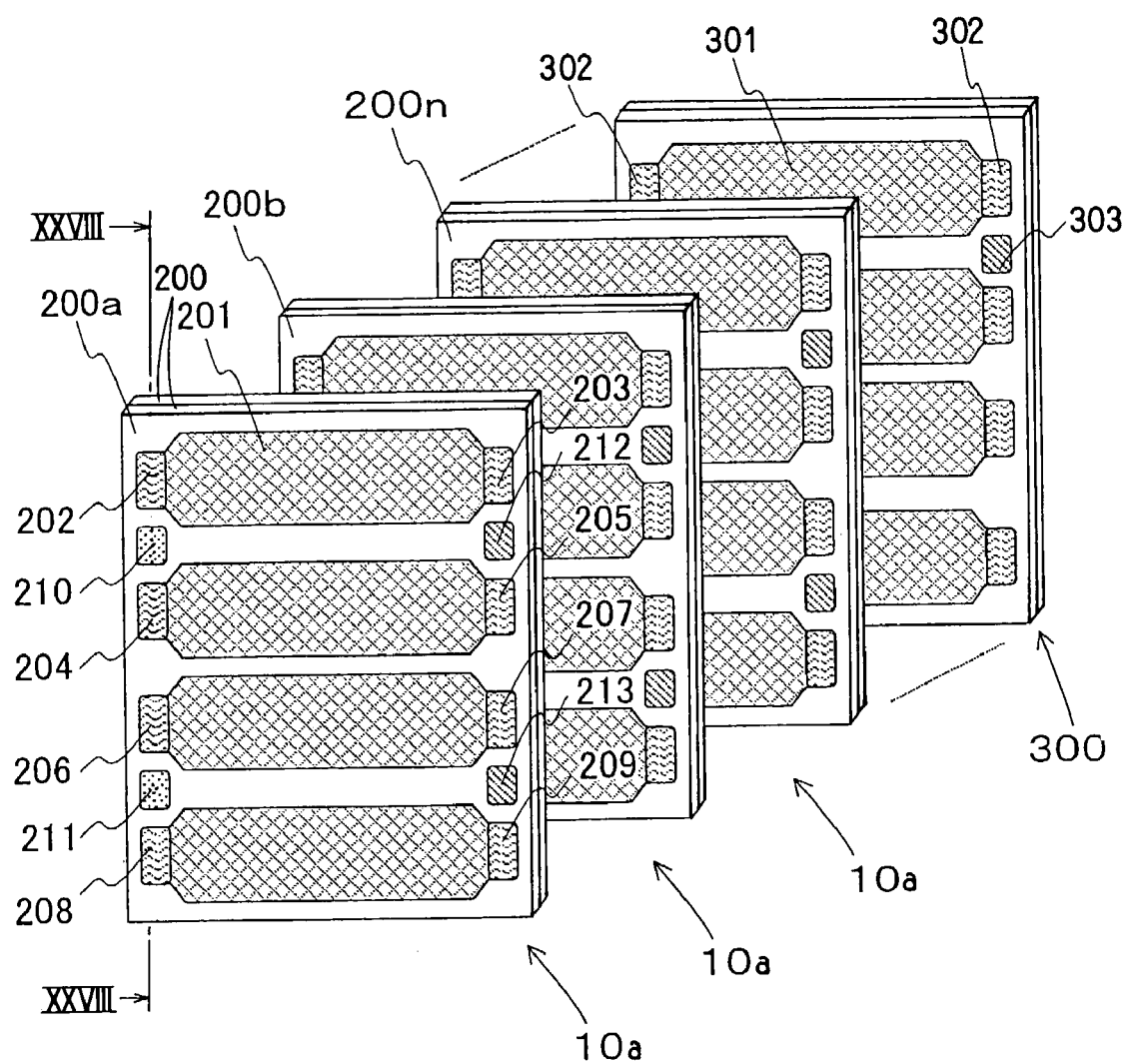
FIG. 26 is an exploded perspective view showing an arrangement relationship between water paths of cooling water, water inlets thereof and water outlets thereof in each cell of a fuel cell according to a sixteenth embodiment of the present invention.
Figure 27:
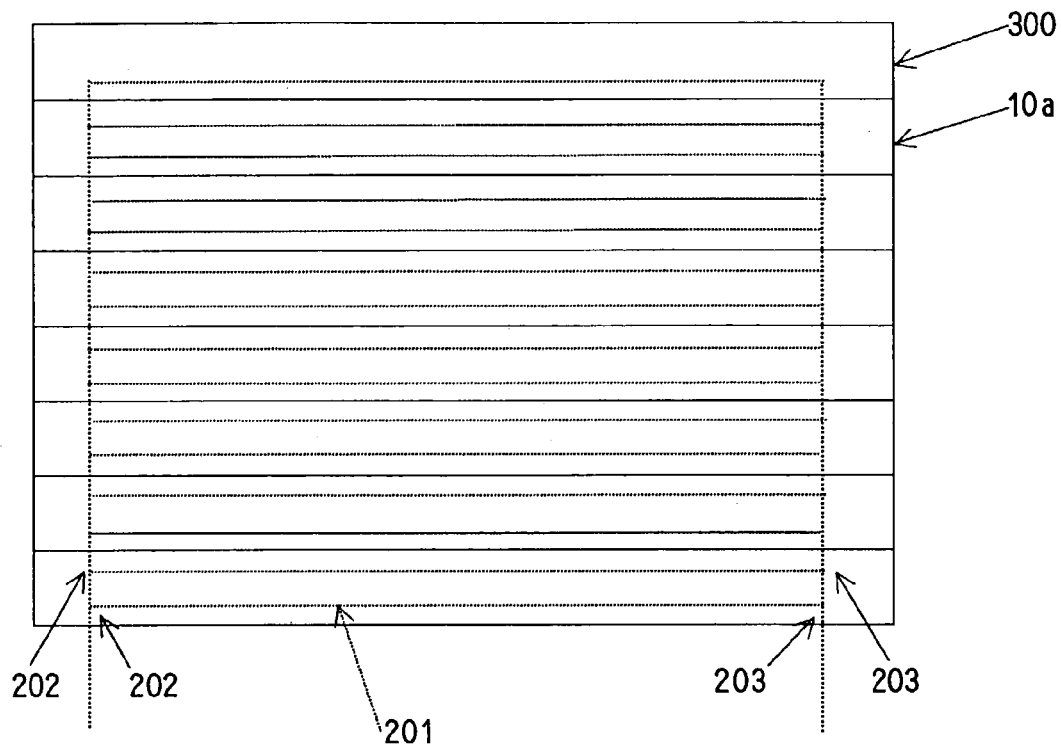
FIG. 27 is a schematic diagram showing a circulation path of cooling water in the fuel cell shown in FIG. 26.
Figure 28:
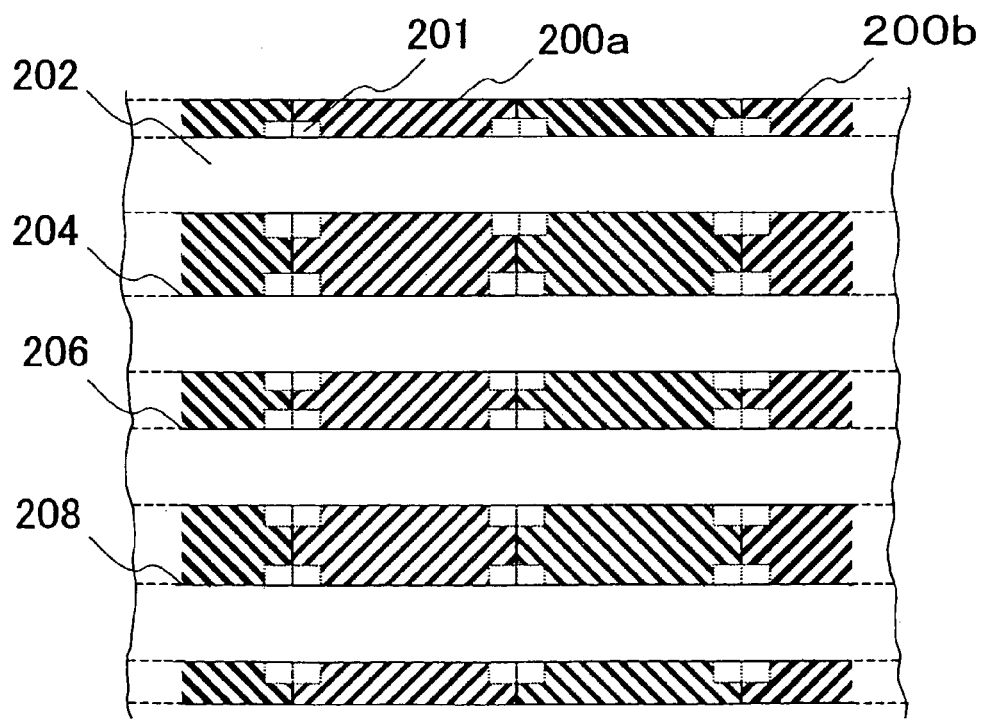
FIG. 28 is a sectional view taken along line XXVIII—XXVIII in FIG. 26.

The sixteenth embodiment of the present invention will be now described with reference to FIGS. 26–34. FIG. 26 shows a stacking state of plural cells 10a constructing a fuel cell 10 of the sixteenth embodiment, FIG. 27 shows a thermal medium circulation path in the stated state of the cells 10a in FIG. 26, and FIG. 28 is a cross-sectional view taken along line XXVIII—XXVIII in FIG. 26. In FIGS. 26–28, each cell 10a includes a solid electrolyte sheet (not shown) and two separators 200 provided at both ends of the solid electrolyte sheet. A hydrogen path through which hydrogen is circulated is provided between one separator 200 and the solid electrolyte sheet, and an air path through which air (oxygen) is circulated is provided between the other separator 200 and the solid electrolyte sheet. Further, a water path through cooling water (thermal medium) is circulated is provided on the each separator 200 at each opposite side of the hydrogen path and the air path.

In FIG. 26, each of cooling water surfaces 200a–200n extends in a direction approximately perpendicular to a stack direction of the cells 10a. On each of the cooling water surfaces 200a–200n, plural independent water paths 201 extending in a direction perpendicular to the stack direction are provided in parallel. Water inlets 202, 204, 206, 208 communicate with the water paths 201 at one end, and water outlets 203, 205, 207, 209 communicate with the water paths 201 at the other end. The water paths 201 are provided on each separator 200 by recessing a part of each separator 200. The water inlets 202, 204, 206, 208 and the water outlets 203, 205, 207, 209, are provided to penetrate through each separator 200, so that the water inlets 202, 204, 206, 208 and the water outlets 203, 205, 207, 209 of the cells 10a are communicate with each other, respectively.

As shown in FIG. 26, the water paths 201 are arranged adjacent to each other through each separator 200 in the stack direction of the cells 10a. Therefore, as shown in FIG. 27, the water paths 201 are connected in parallel, through each of the water inlets 202, 204, 206, 208 and each of the water outlets 203, 205, 207, 209 in the fuel cell 10. In this embodiment, the water paths 201, arranged at different lines in the direction perpendicular to the stack direction, are provided independently. Accordingly, the cooling water can independently flow through the water paths 201 at different lines.

As shown in FIG. 26, an air inlet 210, an air outlet 211, a hydrogen inlet 212 and a hydrogen outlet 213 are provided in each cell 10a. Accordingly, after the cells 10a are stacked, the air paths and the hydrogen paths are connected in parallel through the air inlet and outlet 210, 211 and through the hydrogen inlet and outlet 212, 213, respectively. Further, the cells 10a are stacked from a front side to a rear side in FIG. 26, and a side plate 300 is fixed to the stacked cells 10a at the most rear side. Water paths 301 are provided on the side plate 300 similar to the water paths 201 in the cells 10a, and recess portions 302 communicating with the water inlet and the water outlet of the each cell 10a are also provided on each water path 301 at both ends.

Figure 29:
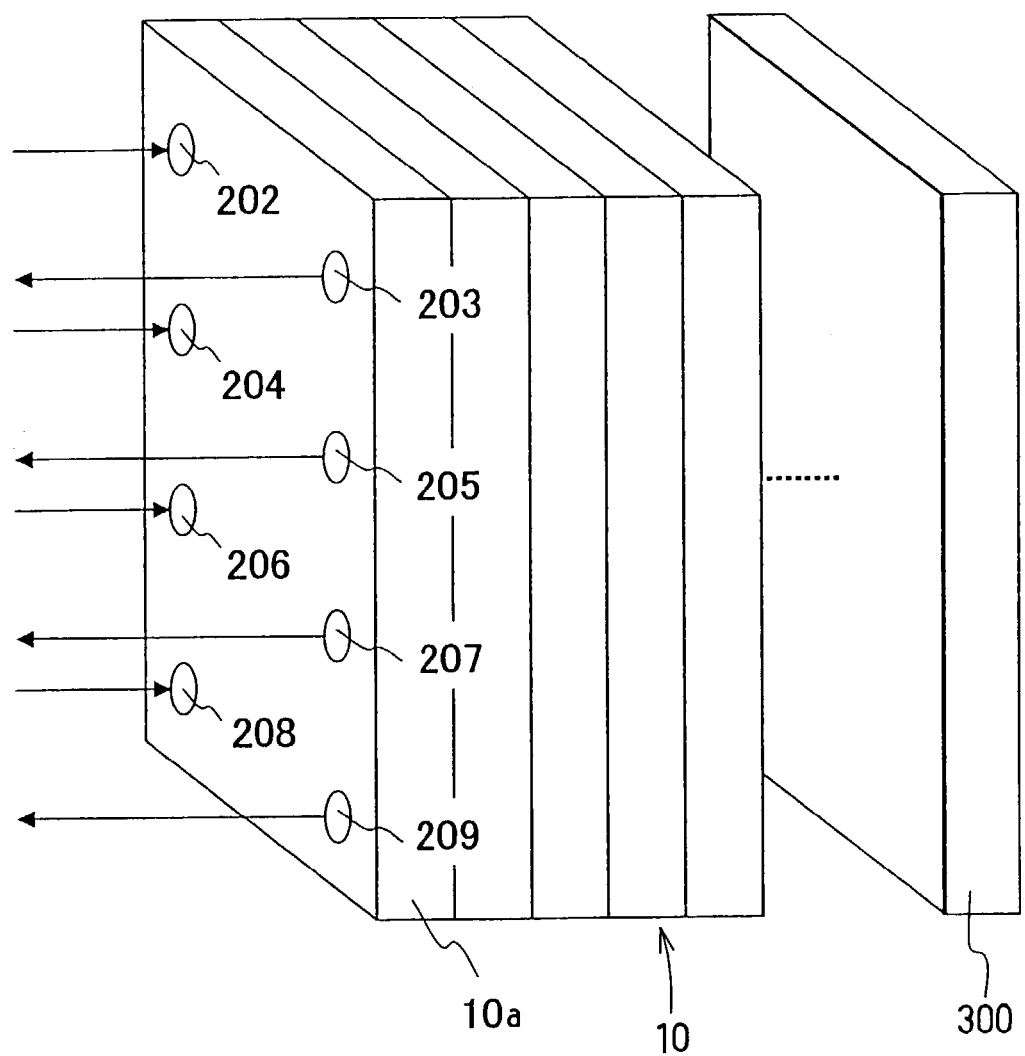
FIG. 29 is a schematic perspective view showing a stacked state of plural cells of the fuel cell according to the sixteenth embodiment.

FIG. 29 shows a circulation state of cooling water after the cells 10a are stacked to construct the fuel cell 10. As shown in FIG. 29, cooling water is introduced into the cells 10a from the inlets 202, 204, 206 and 208 in parallel from a left side of the fuel cell 10, and its stream is stopped and turned in the side plate 300 at a right side of the fuel cell 10 in FIG. 29. Thereafter, the cooing water flows through the outlets 203, 205, 207 and 209 in the cells 10a in parallel, and flows out from the fuel cell 10 at the left side. Specifically, in the cells 10a, cooling water introduced from the water inlet 202 flows out from the water outlet 203, cooling water introduced from the water inlet 204 flows out from the water outlet 205, cooling water introduced from the water inlet 206 flows out from the water outlet 207, and cooling water introduced from the water inlet 208 flows out from the water outlet 209.

Figure 30:
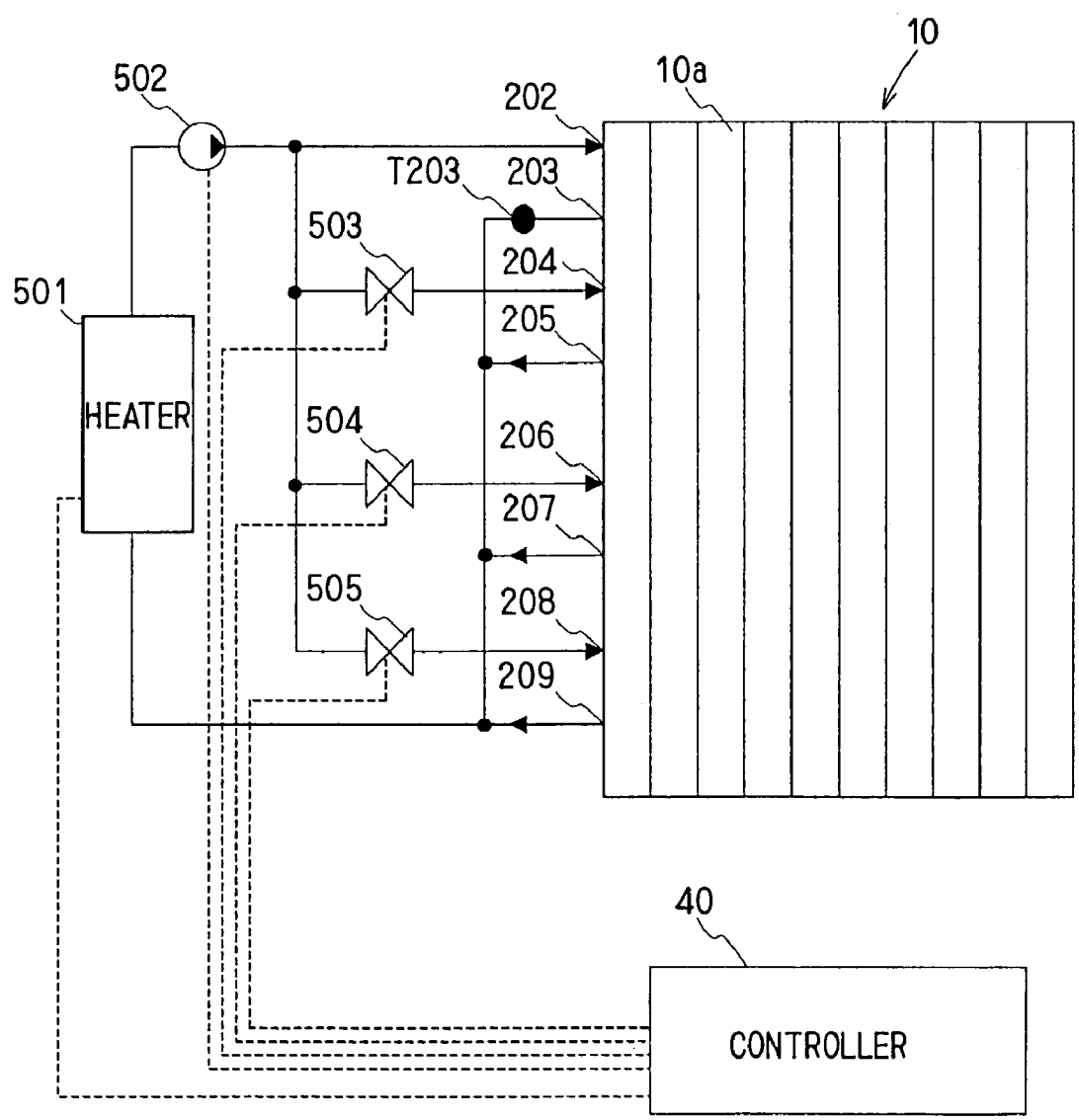
FIG. 30 is a schematic diagram showing a fuel cell system having the fuel cell according to the sixteenth embodiment.

FIG. 30 shows the fuel cell system including a cooling system of the sixteenth embodiment. Further, cooling water circulated in the cooling system shown in FIG. 30 includes anti-freezing solution not to be frozen at a temperature equal to or lower than a freezing point. For example, the anti-freezing solution is not frozen at −30° C.

In FIG. 30, a heating device 501 is an electric heater in the sixteenth embodiment. Here, a heater using a fossil fuel can be used instead of the electrical heater. As shown in FIG. 30, a circulation pump 502 is disposed to circulate cooling water, and opening-closing valves 503–505 are provided for stopping streams of cooling water into the water inlets 204, 206, 208, respectively. In the sixteenth embodiment, the thermal medium circulation device is constructed by the circulation pump 502 and the opening-closing valves 503–505. An outlet temperature sensor T203 is disposed at the water outlet 203 of the fuel cell 10 to detect the temperature of cooling water at the water outlet 203. The outlet temperature sensor T203 corresponds to the first temperature sensor 33 in the above-described first embodiment.

The controller 40 controls operation of the electrical heater 501, the circulation pump 502 and the opening-closing valves 503–505 in accordance with an electric signal from the outlet temperature sensor T203. When the cooling water temperature at the water outlet 203, detected by the outlet temperature sensor T203, reaches 0° C. during an initial time, air and hydrogen are supplied to the fuel cell 10 from the air inlet 210 and the hydrogen inlet 212, respectively.

The controller 40 operates the electric heater 501 and the circulation pump 502, and controls the opening-closing valves 503–505 to be closed, when the cooling water temperature detected by the outlet temperature sensor T203 is equal to or lower than the freezing point. Then, when the controller 40 determines that the detected temperature of cooling water detected by the outlet temperature sensor T203 is increased higher than the freezing point, the controller 40 controls the opening-closing valves 503–505 to be opened in order in accordance with a temperature increase of the cooling water.

Figure 31:
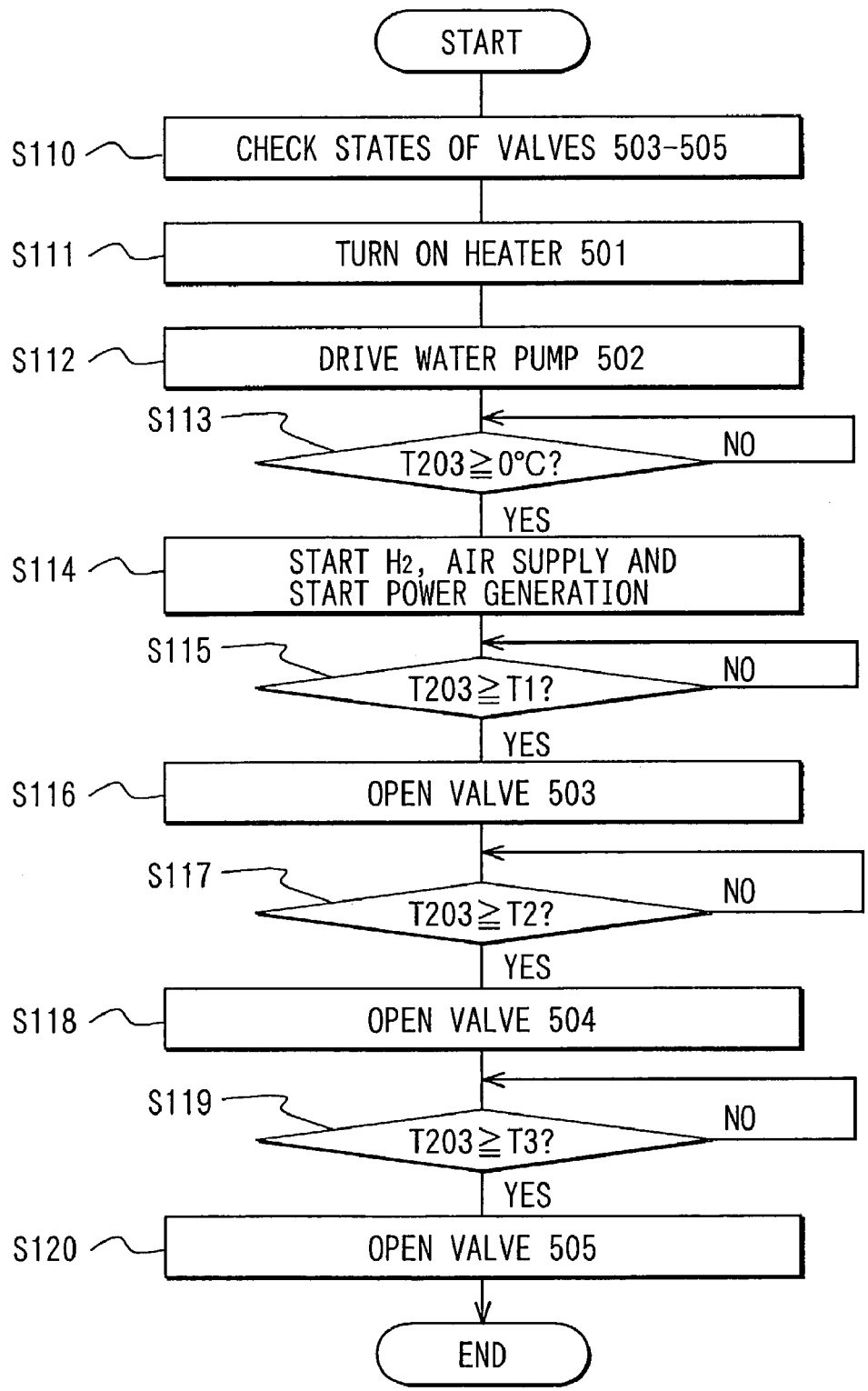
FIG. 31 is a flow diagram showing control operation of the fuel cell system according to the sixteenth embodiment.
Figure 32A:
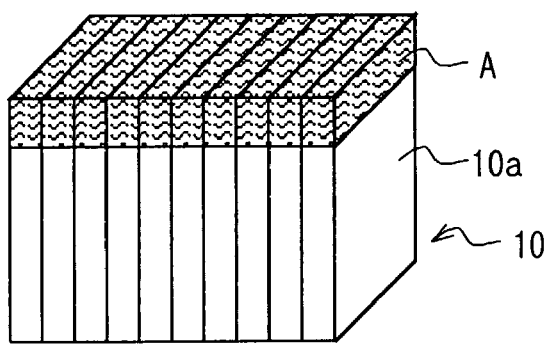
FIG. 32A is a schematic perspective view showing a warm-up state of the fuel cell in an area A.
Figure 32B:
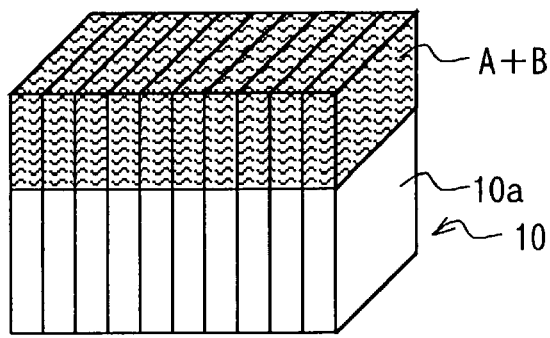
FIG. 32B is a schematic perspective view showing a warm-up state of the fuel cell in areas A and B.
Figure 32C:
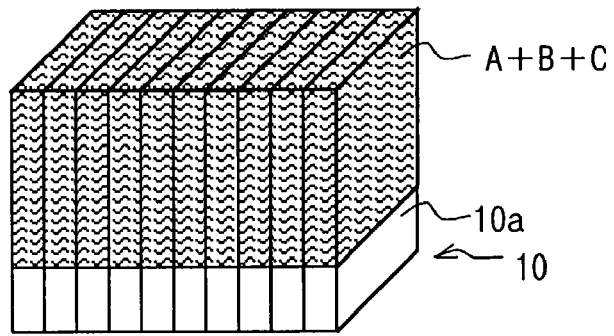
FIG. 32C is a schematic perspective view showing a warm-up state of the fuel cell in areas A–C.
Figure 33:
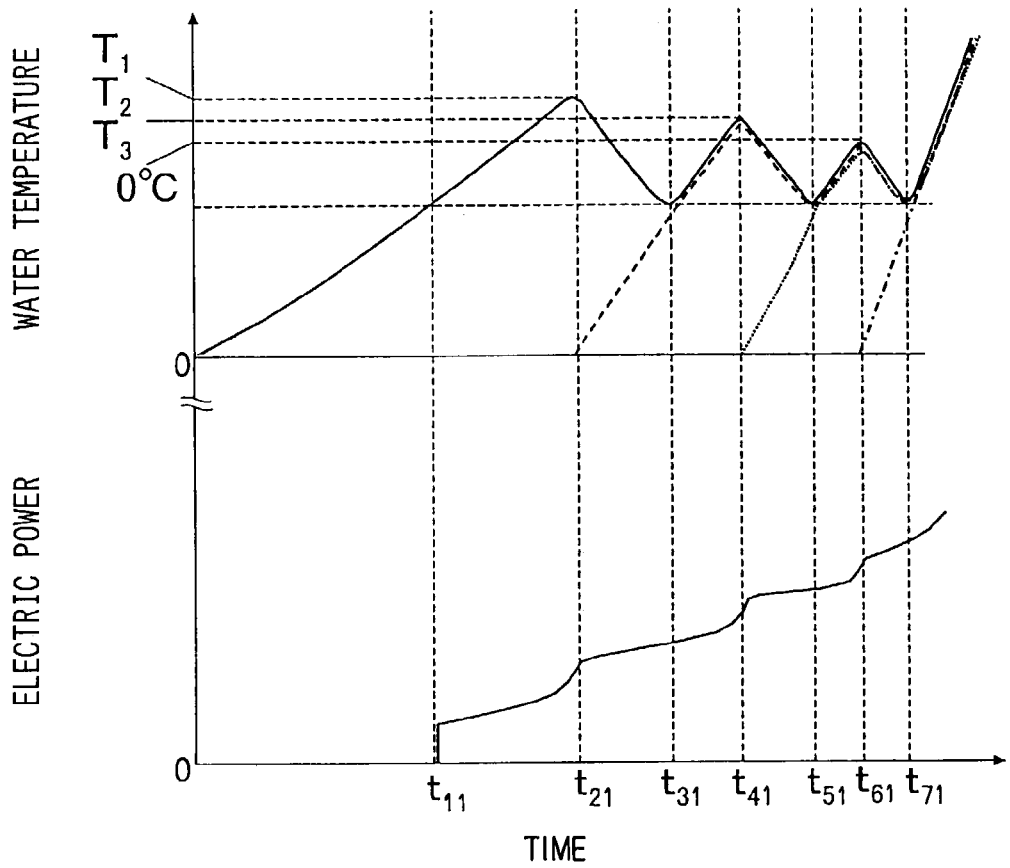
FIG. 33 is a characteristic graph showing a relationship between a temperature of the fuel cell and electric power generated from the fuel cell according to the sixteenth embodiment.

Specifically, as shown in FIG. 31, it is checked that the opening-closing valves 503–505 are closed at step S110 at the start time where the temperature detected by the outlet temperature sensor T203 is lower than a set temperature (e.g., 0° C.). At steps S111, S112, the electric heater 501 and the circulation pump 502 are operated. That is, the electric heater 501 is turned on at step S111, and the circulation pump 502 is driven and operated at step S112. Thus, cooling water heated by the electric heater 501 is circulated from the water inlet 202 to the water outlet 203 through the water path 201 using the operation of the circulation pump 502. That is, in this case, as shown in FIG. 32A, the heated cooling water is circulated into each cell 10a of the fuel cell 10 in an area A. At step S113, it is determined whether or not the cooling water temperature detected by the outlet temperature sensor T203 is higher than the set temperature (0° C.). Then, as shown in FIG. 33, when the temperature of cooling water in the area A is increased from −30° C. to 0° C. after a predetermined time t11 passes, it is determined that the cooling water temperature reaches to 0° C. at step S113 in FIG. 31. Next, at step S114, hydrogen supply and air supply to the fuel cell 10 are started, and the fuel cell 10 generates electric power in the area A. Therefore, cooling water is heated by reaction heat due to power generation in the area A of the fuel cell 10.

At step S115, it is determined whether or not the cooling water temperature detected by the outlet temperature sensor T203 is equal to or higher than a first predetermined temperature T1. When the cooling water temperature at the water outlet 203 is increased to be equal to or higher than the first predetermined temperature T1 after a predetermined time t21 passes, it is determined that the cooling water temperature T203 reaches to the first predetermined temperature T1 at step S115. At step S116, the opening-closing valve 503 is opened, so that a part of cooling water is also circulated into an area B in FIG. 32B from the water inlet 204 to the water outlet 205 through the water path 201 while bypassing the water inlet 202. At step S117, it is determined whether or not the cooling water temperature detected by the outlet temperature sensor T203 is equal to or higher than a second predetermined temperature T2 lower than the first predetermined temperature T1. Here, the temperature of cooling water circulated in the area B is low at −30° C., but cooling water from the water outlet 203 is joined with cooling water from the water outlet 205. Therefore, the cooling water temperature at the water outlet 203 is reduced to approximate 0° C. from the first predetermined temperature T1 after a predetermined time t31 passes, as shown in FIG. 33. Further, since the heated cooling water is supplied from the water inlet 204 into the area B, the area B is warmed up, and power generation is performed also in the area B. Therefore, cooling water circulated in the area B is heated by reaction heat due to the power generation in the area B. Then, when the cooling water temperature at the water outlet 203 is increased to be equal to or higher than the second predetermined temperature T2 after a predetermined time t41 passes, it can be determined that the cooling water temperature detected by the outlet temperature sensor T203 reaches the temperature T2 at step S117. At step S118, the opening-closing valve 504 is opened. When the opening-closing valve 504 is opened, cooling water is also circulated into an area C in FIG. 32C.

At step S119, it is determined whether or not the cooling water temperature detected by the outlet temperature sensor T203 is equal to or higher than a third predetermined temperature T3 lower than the second predetermined temperature T2. Here, when the opening-closing valve 504 is opened, since the temperature of cooling water in the area C is low at −30° C., the temperature of cooling water at the water outlet 203 is reduced at approximately 0° C. after a predetermined time t51 passes, as shown in FIG. 33. However, cooling water circulated in the area C is heated by reaction heat due to power generation in the area C, and the cooling water temperature at the water outlet 203 is increased again. Then, when the cooling water temperature at the water outlet 203 is increased to be equal to or higher than the temperature T3 after a predetermined time t61 passes, it is determined that the cooling water temperature reaches to the third predetermined temperature T3 at step S119 in FIG. 31.

Figure 32D:
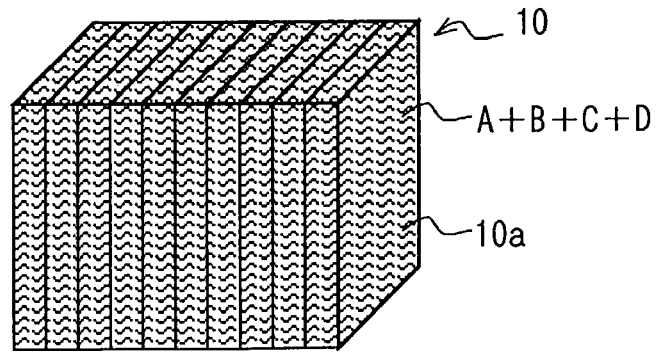
FIG. 32D is a schematic perspective view showing a warm-up state of the fuel cell in areas A–D (entire area), according to the sixteenth embodiment.

At step S120, the opening-closing valve 505 is opened, and cooling water is also circulated into an area D in FIG. 32D. The temperature of the area D is increased, and power generation is performed therein. Here, when the opening-closing valve 505 is opened, since the temperature of cooling water in the area D is low at −30° C., the temperature of cooling water at the water outlet 203 is reduced to approximate 0° C. after a predetermined time t71 passes. However, the temperature of cooling water circulated in the area D is increased also by heat generation due to power generation in the area D. Thus, all the areas A, B, C and D in each cell 10a of the fuel cell 10 are warmed up, and the warm-up control in FIG. 31 is ended.

Figure 34:
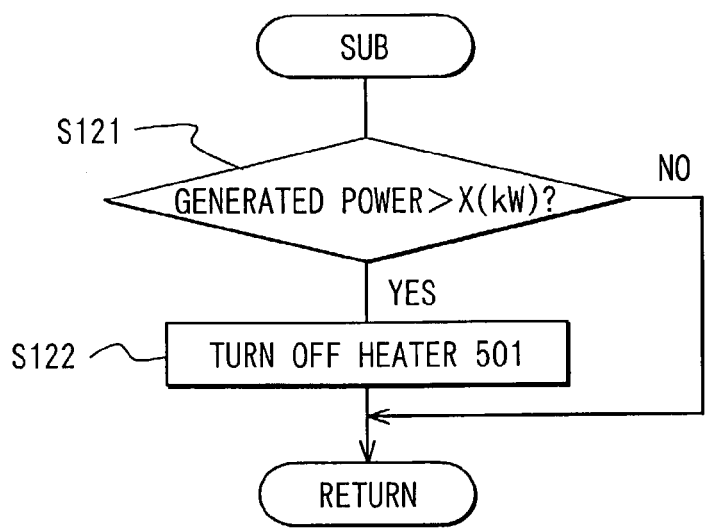
FIG. 34 is a flow diagram showing control operation of the fuel cell system, for ending warm-up operation of the fuel cell, according to the sixteenth embodiment.

In the above-described warm-up operation of the fuel cell 10, the cooling water temperature detected by the outlet temperature sensor T203 is set at approximate 0° C. after each of the predetermined time t31, t51, t71 passes, for preventing the cooling water from being frozen. Specifically, when the temperatures of the areas A, B, C that are heated once are reduced lower than 0° C., power generation in the fuel cell 10 is restricted due to freezing of water contained therein. Therefore, the predetermined temperatures T1, T2, T3 are beforehand set using experiments and calculations so that the temperatures of the areas A, B, C are maintained equal to or higher than 0° C., respectively. Further, as shown in FIG. 34, at step S121, it is determined whether or not the electric power generated by the fuel cell 10 is larger than a predetermined power X (kilowatts, i.e., KW). When the generated power from the fuel cell 10 is larger than the predetermined power X at step S121, energization for the electric heater 501 is stopped at step S122. That is, at step S122, the electric heater 501 is turned off, and the warm-up operation of the fuel cell 10 is finished.

In the sixteenth embodiment, in the warm-up operation of the fuel cell 10, cooling water heated by the electric heater 501 can be circulated into each cell 10a of the fuel cell 10 from the area to the entire area (A+B+C+D) in order, so that power generation can be performed in the fuel cell 10 from the area A to the entire area (A+B+C+D) in order. In FIGS. 32A–32D, a warm-up state is shown in the fuel cell 10 from the area A to the area (A+B+C+D) Further, since the opening-closing valves 503–505 are opened in order while power generation is gradually performed, a heat source due to the power generation is increased in accelerative, thereby shortening warm-up time of the fuel cell 10. That is, since the fuel cell 10 converts hydrogen energy to electric power and heat due to power generation, all the fuel cell 10 can be effectively warmed up also using heat due to power generation.

Further, according to the sixteenth embodiment of the present invention, since a part of each cell 10a can be uniformly warmed up, the fuel cell 10 can generate electric power for a short time using a small heating capacity of the heater 501. For example, when electric power of approximate 10W can be generated by warming up 10% of each cell 10a to the temperature where cooling water is not frozen, electric power of (10W×the number of cells 10a) can be generated from the fuel cell 10. Accordingly, in this case, electric power of 100W can be obtained when the number of the cells 10a is ten.

Hydrogen and air are necessary to be supplied to the fuel cell 10 for power generation. Therefore, accessories such as the hydrogen feeder 12 and the air feeder 13 are necessary to be operated using electric power from any one, for example, the secondary battery, except for the fuel cell 10 before power generation. However, the temperature of the secondary battery is also low, and its discharge performance tends to be reduced. Accordingly, a relationship indicated by the following formula (1) is required to be satisfied between electric power Pf output from the fuel cell 10, electric power Pbat output from the secondary battery and accessory motive power Ph required for initial warm-up operation and power generation.

$$Pf > Pbat > Ph \qquad (1)$$

That is, the accessories such as the hydrogen feeder 12 and the air feeder 13 are operated using electric power from the secondary battery before power generation of the fuel cell 10. However, the accessories such as the hydrogen feeder 12 and the air feeder 13 are operated using electrical power from the fuel cell 10 while the fuel cell 10 charges the secondary battery directly after starting power generation. Therefore, a part of each cell 10a, to be warmed-up, is required to be suitably set so that the formula (1) is satisfied.

Specifically, when 1–30% of each cell 10a is initially warmed up, the formula (1) is satisfied in the normal fuel cell system.

(Seventeenth Embodiment)

Figure 35:
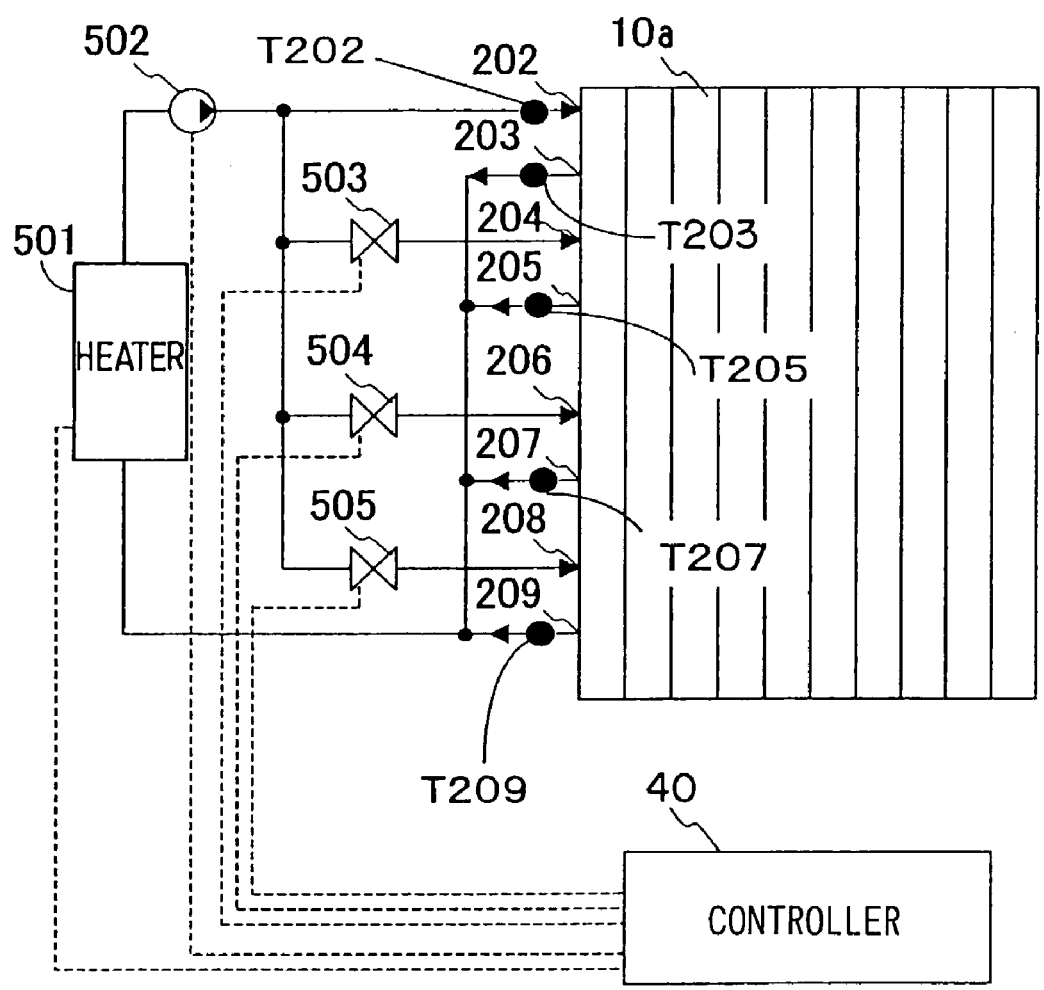
FIG. 35 is a schematic diagram showing a fuel cell system according to a seventeenth embodiment of the present invention.

The seventeenth embodiment of the present invention will be now described with reference to FIGS. 35–37. In the above-described sixteenth embodiment of the present invention, only the outlet temperature sensor T203 is provided. However, in the seventeenth embodiment, as shown in FIG. 35, an inlet temperature sensor T202 is provided at the water inlet 202 for the area A of the fuel cell 10. Further, outlet temperature sensors T203, T205, T207, T209 are provided at the water outlets 203, 205, 207, 209 from the areas A, B, C, D of the fuel cell 10, respectively. The open degrees of the opening-closing valves 503–505 are adjusted by the controller 40, based on signals from the outlet temperature sensors T203, T205, T207.

Figure 36:
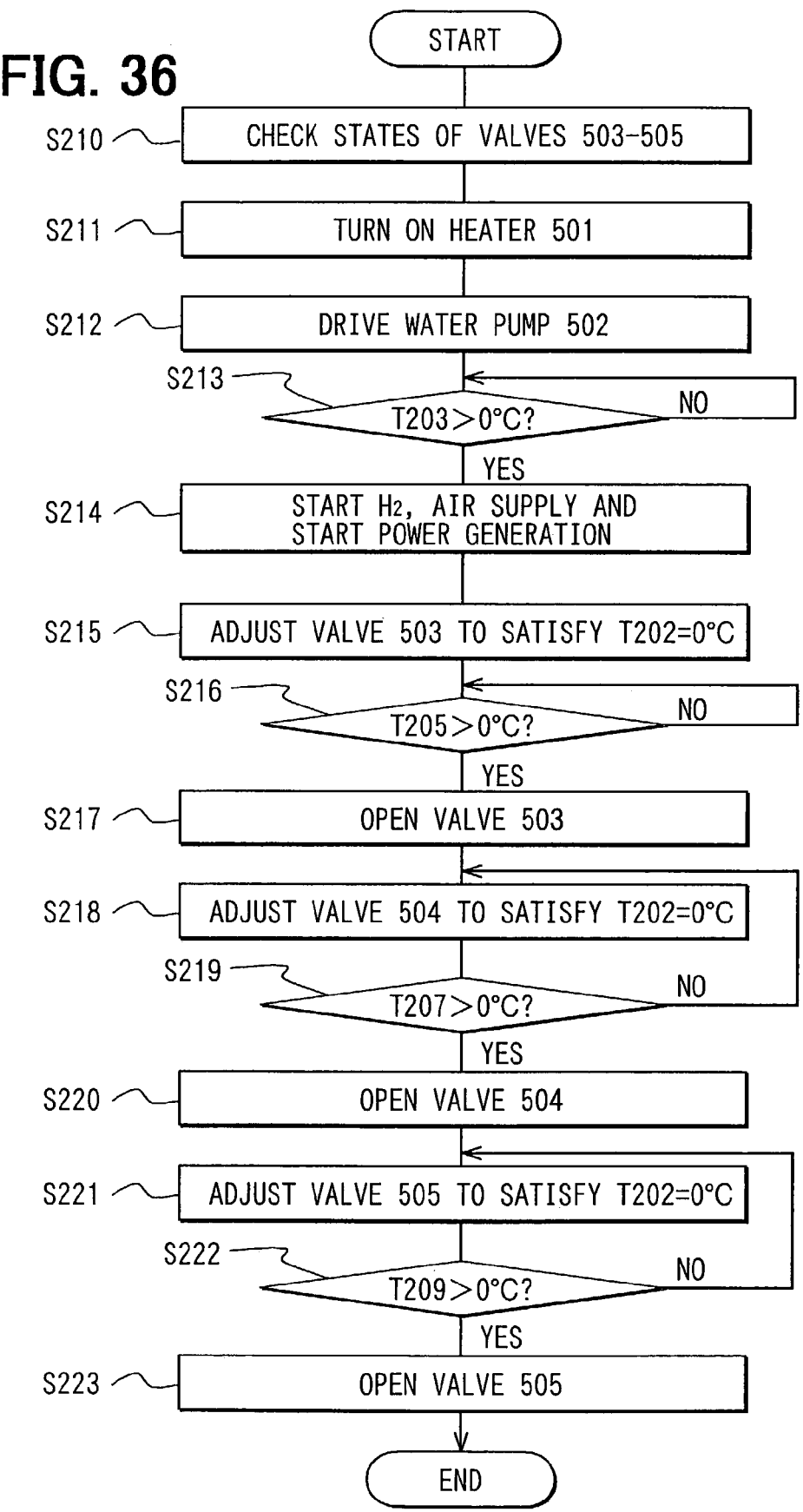
FIG. 36 is a flow diagram showing control operation of the fuel cell system according to the seventeenth embodiment.

Specifically, as shown in FIG. 36, it is checked at a start time of the warm-up operation that the opening-closing valves 503–505 are closed at step S210. Thereafter, at steps S211, S212, the electric heater 501 and the circulation pump 502 are operated. Then, heated cooling water is circulated into the fuel cell 10 in the area A, and the area A is warmed up. At step S213, it is determined whether or not the cooling water temperature detected by the outlet temperature sensor T203 is equal to or higher than 0° C. When the temperature of cooling water at the water outlet 203 is increased equal to or higher than 0° C. after time t11 passes, it is determined that the cooling water temperature detected by the outlet temperature sensor T203 reaches 0° C. at step S213. At step S214, fuel gas (hydrogen and air) is supplied to the fuel cell 10, and the fuel cell 10 starts power generation in the area A. At step S215, the open degree of the opening-closing valve 503 is adjusted so that the temperature of cooling water at the water inlet 202 for the area A is set at 0° C. Thus, a part of cooling water is circulated into the fuel cell 10 in the area B, but its circulation amount is adjusted to set the temperature of cooling water at the water inlet 202 at 0° C. Since entire heat from the electric heater 501 and the area A is supplied to the area B of the fuel cell 10, the area B of the fuel cell 10 can be effectively warmed up without a heat loss.

At step S216, it is determined whether or not the cooling water temperature detected by the outlet temperature sensor T205 is equal to or higher than 0° C. Power generation is performed in the area B by warming up the area B using cooling water circulated into the area B, and heat due to the power generation is radiated to cooling water in the area B. Therefore, the temperature of cooling water at the water outlet 205 from the area B is increased later. Then, when the cooling water temperature detected by the outlet temperature sensor T205 is increased to be equal to or higher than 0° C., it is determined that the cooling water temperature reaches to 0° C. at step S216. At step S217, the opening-closing valve 503 is entirely opened.

At step S218, the open degree of the opening-closing valve 504 is adjusted so that the temperature of cooling water at the water inlet 202 becomes 0° C. after time t21 passes. Therefore, a part of cooling water is circulated into the fuel cell 10 in the area C, but its circulation amount is adjusted to set the temperature of cooling water at the water inlet 202 at 0° C. At step S219, it is determined whether or not the cooling water temperature detected by the outlet temperature sensor T207 is equal to or higher than 0° C. Power generation is performed in the area C by warming up the area C using cooling water circulated into the area C, and heat due to the power generation is radiated to cooling water in the area C. Therefore, the temperature of cooling water at the water outlet 207 from the area C is increased. When the cooling water temperature detected by the outlet temperature sensor T207 is increased equal to or higher than 0° C., the opening-closing valve 504 is entirely opened at step S220.

At step S221, the open degree of the opening-closing valve 505 is adjusted so that the temperature of cooling water at the water inlet 202 is set at 0° C. after time t31 passes. Therefore, a part of cooling water is circulated into the fuel cell 10 in the area D, but its circulation amount is adjusted so that the temperature of cooling water at the water inlet 202 is set at 0° C. At step S222, it is determined whether or not the cooling water temperature detected by the outlet temperature sensor T209 is equal to or higher than 0° C. Power generation is performed in the area D by warming up the area D using cooling water circulated into the area D, and heat due to the power generation is radiated to cooling water in the area D. Therefore, the temperature of cooling water at the water outlet 209 from the area D is increased. Then, when the cooling water temperature detected by the outlet temperature sensor T209 is increased equal to or higher than 0° C. at step S222, the opening-closing valve 505 is entirely opened at step S223. Thus, the control of the warm-up operation is ended in FIG. 36.

Figure 37:
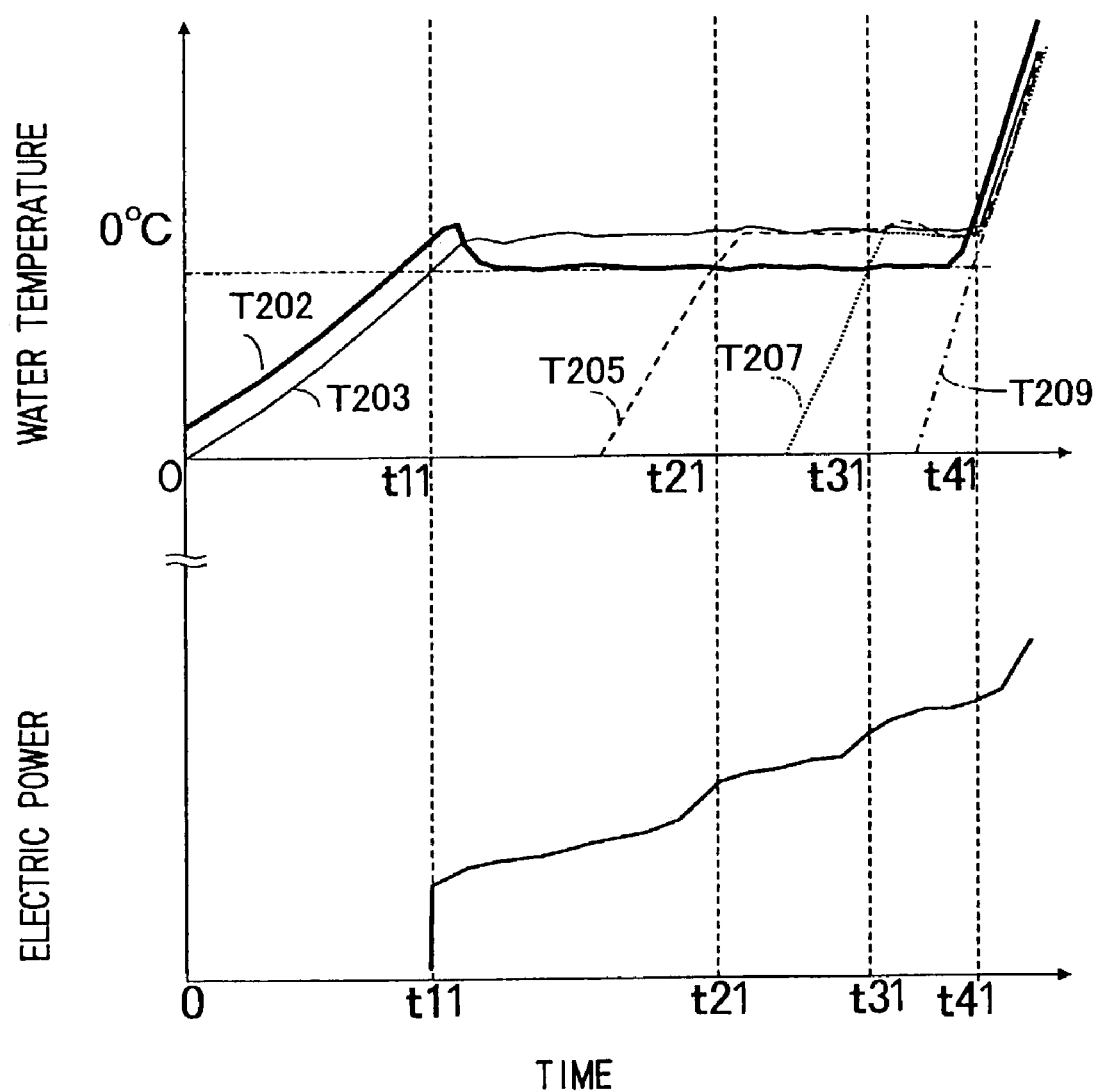
FIG. 37 is a characteristic graph showing a relationship between a temperature of the fuel cell and electric power generated from the fuel cell according to the seventeenth embodiment.

A relationship between the temperature of the fuel cell 10 and electric power generated from the fuel cell 10 in the above control operation is shown in FIG. 37. According to the seventeenth embodiment, the temperatures of cooling water at the water outlets of the fuel cell 10 can be directly detected by the outlet temperature sensors T203, T205, T207, T209, and the open degrees of the opening-closing valves 503–505 are adjusted, thereby adjusting cooling water amounts flowing into the areas A–D. Accordingly, each of the areas A–D can be warmed up more rapidly, and the warm-up time for which the warm-up operation is performed can be shortened.

(Eighteenth Embodiment)

Figure 38:
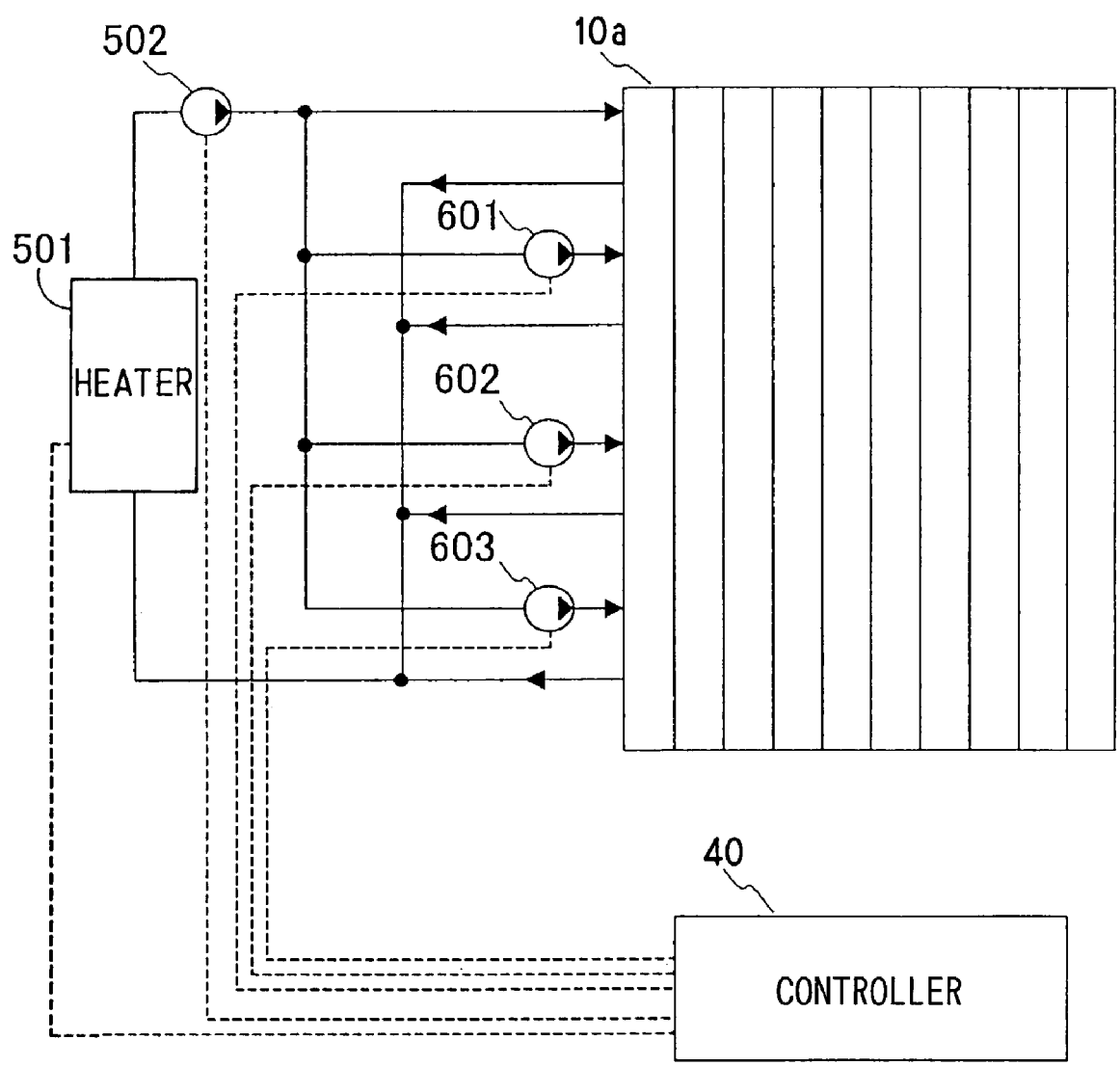
FIG. 38 is a schematic diagram showing a fuel cell system according to an eighteenth embodiment of the present invention.

In the above-described seventeenth embodiment of the present invention, the opening-closing valves 503–505 are used. However, in the eighteenth embodiment, as shown in FIG. 38, flow-amount variable pumps 601–603 are used in place of the opening-closing valves 503–505. Even in this case, control operation can be performed similarly to the above-described seventeenth embodiment. Accordingly, the advantages similar to the above-described seventeenth embodiment can be obtained.

(Nineteenth Embodiment)

Figure 39:
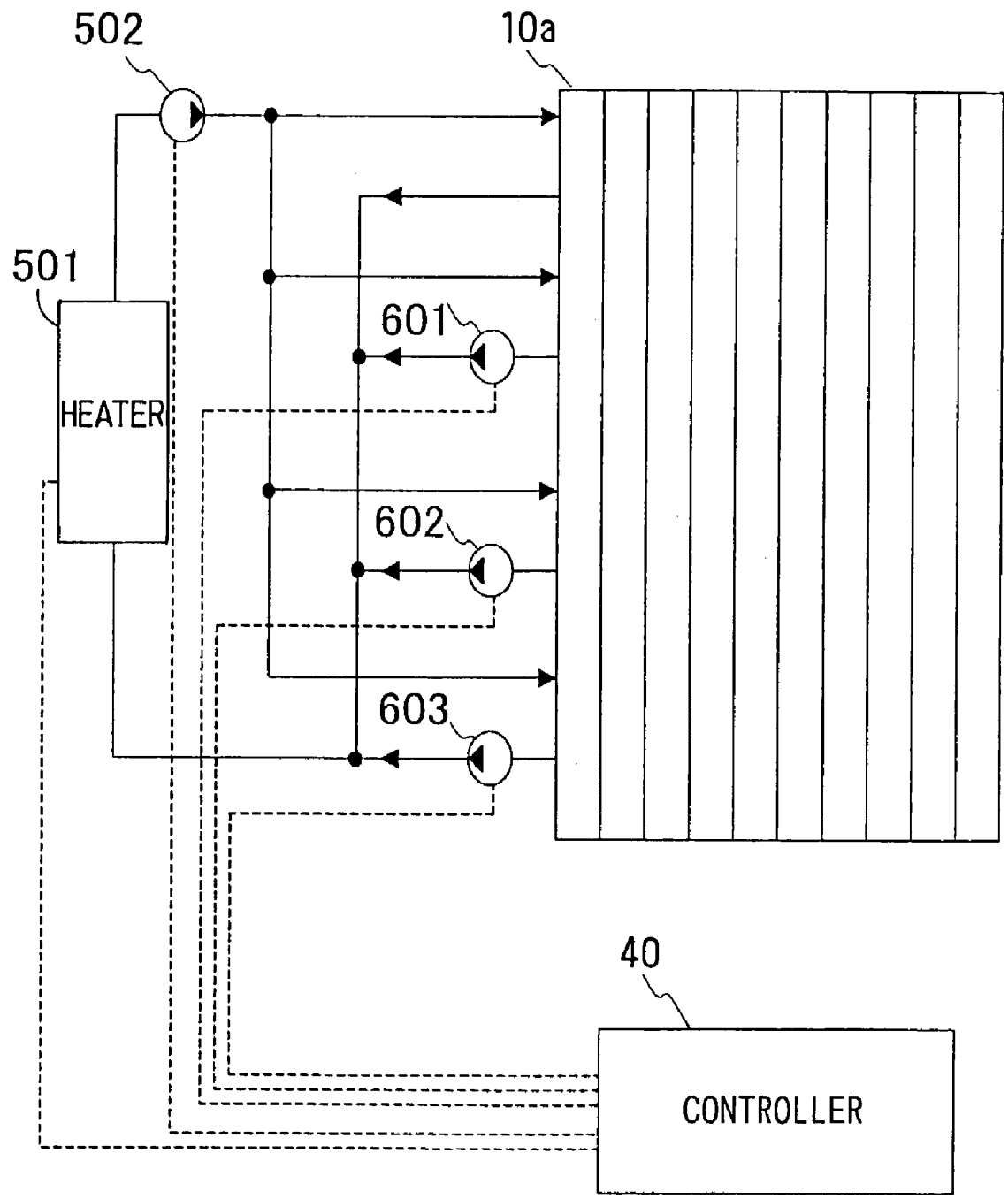
FIG. 39 is a schematic diagram showing a fuel cell system according to a nineteenth embodiment of the present invention.

In the ninth embodiment, as shown in FIG. 39, the flow-amount variable pumps 601–603 are provided at the water outlet sides from the areas B–D in place of the water inlet sides. Even in this case, control operation can be performed similarly to the above-described seventeenth embodiment. Accordingly, advantages similar to those of the above-described seventeenth embodiment can be obtained.

(Twentieth Embodiment)

Figure 40:
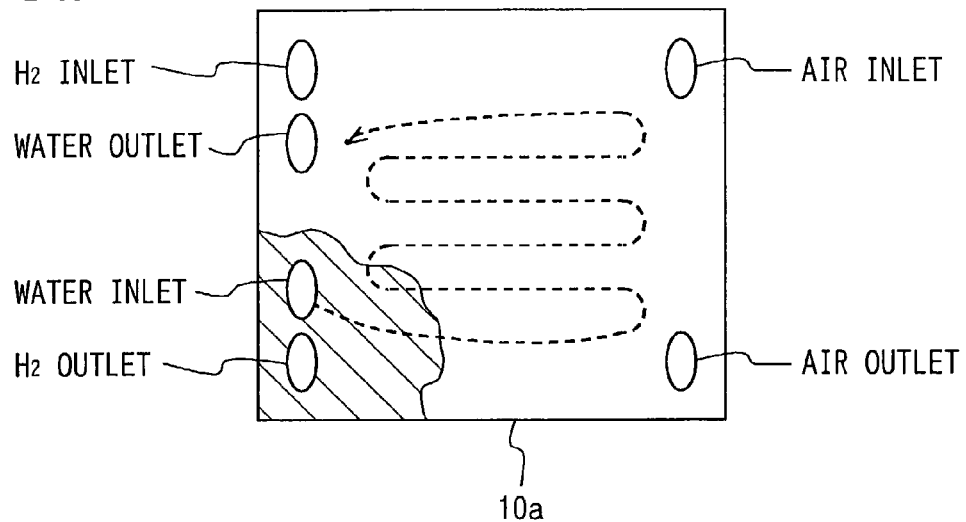
FIG. 40 is a schematic side view showing a flow direction of cooling water in a cell according to a twentieth embodiment of the present invention.

In FIG. 2 of the above-described first embodiment, the water inlet is provided around the air inlet, and the water outlet is provided around the air outlet. However, the position arrangements of the water inlet, the water outlet, the air inlet and the air outlet are not limited to the structure shown in FIG. 2, and can be changed arbitrarily. In the twentieth embodiment, as shown in FIG. 40, the water inlet is provided around the hydrogen outlet, and the water outlet is provided around the hydrogen inlet. In this case, a part of moisture generated by the electrochemical reaction is distributed in the electrolyte film of each cell 10a, and is stored also around the hydrogen outlet. Accordingly, heated cooling water flows into each cell 10a from the water inlet around the hydrogen outlet, and it can prevent water from being frozen around the hydrogen outlet in a low temperature environment.

Alternatively, the water inlet can be provided around the hydrogen inlet, and the water outlet may be provided around the hydrogen outlet. In this case, it can prevent moisture contained in humidified hydrogen from being frozen around the hydrogen inlet in a low temperature environment.

(Twenty-First Embodiment)

Figure 41:
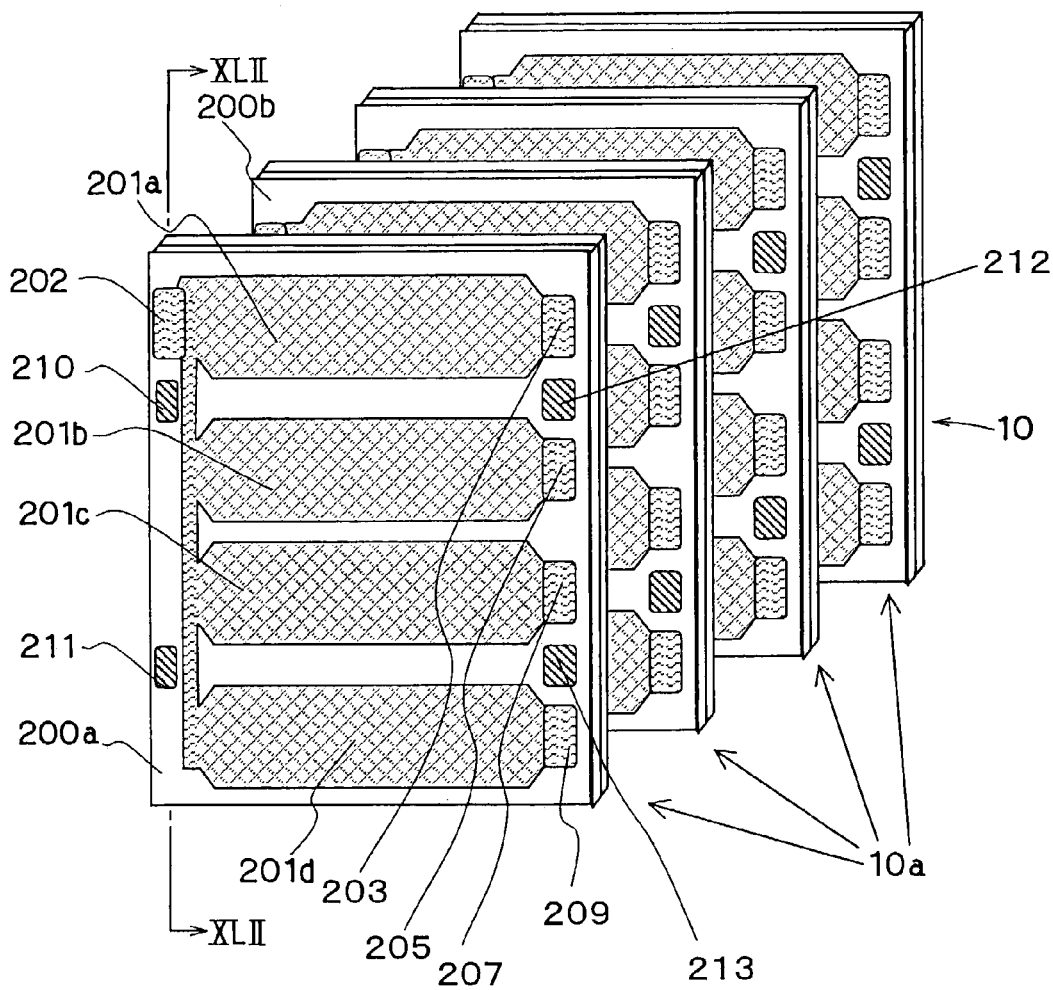
FIG. 41 is an exploded perspective view showing plural stacked cells in a fuel cell according to a twenty-first embodiment of the present invention.
Figure 42:
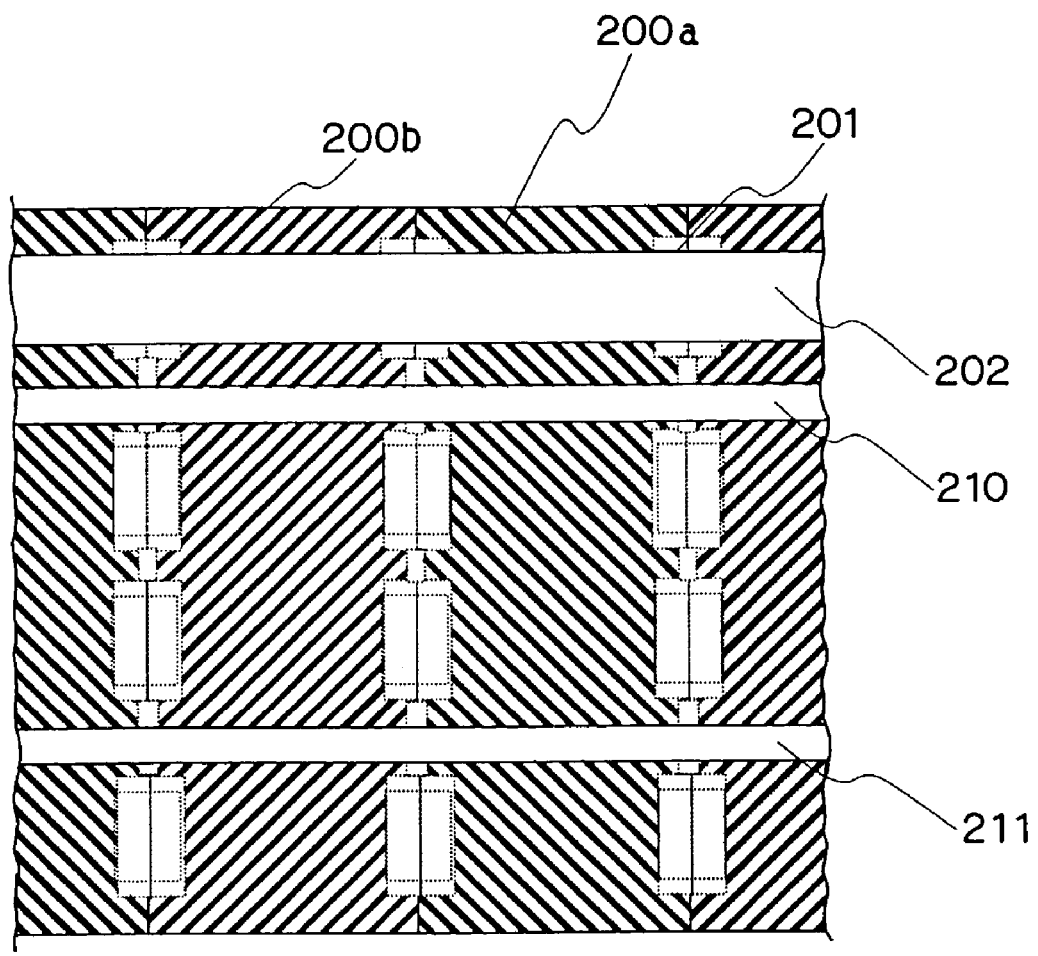
FIG. 42 is a cross-sectional view taken along line XLII—XLII in FIG. 41.

The twenty-first embodiment of the present invention will be now described with reference to FIGS. 41–44. In the above-described sixteenth through eighteenth embodiments of the present invention, the plural water paths 201 extending in the direction perpendicular to the stack direction of the cells 10a are provided independently in each of the cooling water surfaces 200a–200n. However, in the twenty-first embodiment of the present invention, as shown in FIG. 41, inlet sides of cooling water (thermal medium) of water paths 201a, 201b, 201c, 201d are provided to communicate with a single water inlet 202, and outlet sides of cooling water (thermal medium) of the water paths 201a, 201b, 201c, 201d are provided to independently communicate with water outlets 203, 205, 207, 209, respectively. That is, the inlet sides of cooling water of the water paths 201a–201d are provided in common, and the outlet sides of cooling water of the water paths 201a–201d are provided independently. FIG. 42 is a sectional view taken along line XLII—XLII in FIG. 41, and FIG. 43 is a schematic diagram showing a fuel cell system according to the twenty-first embodiment.

Figure 43:
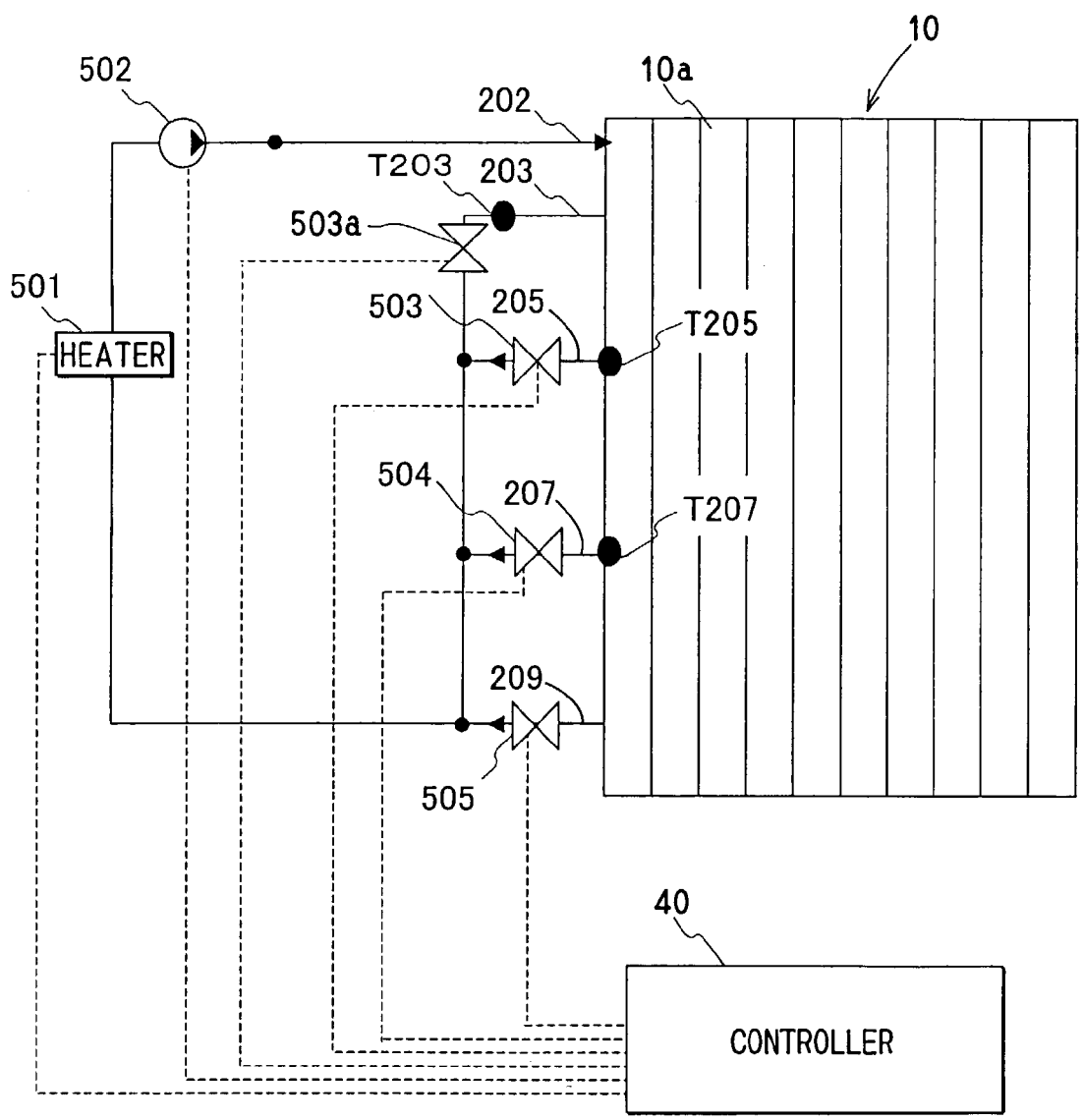
FIG. 43 is a schematic diagram showing a fuel cell system having the fuel cell according to the twenty-first embodiment.

As shown in FIG. 43, the circulation pump 502 is disposed to circulate cooling water, and opening-closing valves 503a and 503–505 are provided for stopping the flow of cooling water from the water outlets 203, 205, 207, 209, respectively. In the twenty-first embodiment, the outlet temperature sensor T203 is disposed in the fuel cell 10 to detect the temperature of cooling water flowing from the water outlet 203, the outlet temperature sensor T205 is disposed in the fuel cell 10 to detect the temperature of cooling water at the water outlet 205, and the outlet temperature sensor T207 is disposed to detect the temperature of cooling water at the water outlet 207.

Next, control operation of the fuel cell 10 according to the twenty-first embodiment of the present invention will be now described with reference to FIG. 44. First, it is checked that the valve 503a is opened and the valves 503–505 are closed at step S310. Then, at steps S311, S312, the electric heater 501 and the circulation pump 502 are operated. That is, the electric heater 501 is turned on at step S111, and the circulation pump 502 is driven and operated at step S112. Thus, cooling water heated by the electric heater 501 is circulated from the water inlet 202 to the water outlet 203 through the water path 201a by the operation of the circulation pump 502. That is, in this case, the heated cooling water circulates only to the water path 201a (see FIG. 41), and only a part of the fuel cell 10 is heated.

At step S313, it is determined whether or not the cooling water temperature detected by the outlet temperature sensor T203 at the water outlet 203 of the water path 201a, is higher than a set temperature (e.g., 0° C.). When the temperature at the water outlet 203 is lower than 0° C. at step S313, the control program returns. On the other hand, when the temperature at the water outlet S203 is higher than 0° C. at step S313, the control program moves step S314. Next, at step S314, hydrogen supply and air supply to the fuel cell 10 are started, and a part area of the fuel cell 10 generates electric power. Therefore, cooling water is heated by the heat due to power generation in the area of the fuel cell 10, corresponding to the water path 201a.

At step S315, it is determined whether or not the cooling water temperature detected by the outlet temperature sensor T203 is equal to or higher than a first predetermined temperature T1 higher than 0° C. When the cooling water temperature at the water outlet 203 is increased to be equal to or higher than the first predetermined temperature T1, it is determined that the cooling water temperature T203 reaches to the first predetermined temperature T1 at step S315. At step S316, the opening-closing valve 503 at the water outlet of the path 201b is opened, so that cooling water is also circulated into the water path 201b. In this case, the water temperature at the water outlet 203 in the water path 201a decreases due to the circulation of the cooling water in the water path 201b. Therefore, at step S316, the opening degree of the valve 503a is adjusted so that the temperature of cooling water at the outlet 203 is in a predetermined range R (i.e., in the range higher than 0° C.).

Next, at step S317, it is determined whether or not the cooling water temperature at the outlet 205 of the water path 201b, detected by the outlet temperature sensor T205, is equal to or higher than a second predetermined temperature T2. When the valve 503 is opened at step S316, cooling water circulates in the water path 201b, so that temperature in the water passage 201b is increased. In this case, when the temperature of cooling water at the outlet 205 of the water path 201b is higher than the second predetermined temperature T2, the control program moves to step S318. On the other hand, when the temperature of cooling water at the outlet 205 of the water path 201b is lower than the second predetermined temperature T2, the control program returns to step S317.

Next, at step S318, the valve 504 at the outlet 207 of the water path 201c is opened, the valve 503 at the outlet 205 of the water path 201b is opened, and the opening degree of the valve 501a is adjusted so that the temperature of cooling water flowing from the outlet 203 is in the predetermined temperature range R. Because the valve 504 is opened at step S318, cooling water circulates in the water pash 201c, so that temperature in an area of the fuel cell 10, corresponding to the water path 201c, is increased.

Next, at step S319, it is determined whether or not the cooling water temperature at the outlet 207 of the water path 201c is higher than a third predetermined temperature T3. The water temperature at the outlet 207 is detected by the temperature sensor T207. When the water temperature at the outlet 207 of the water path 201c is higher than the third predetermined temperature T3 at step S319, the control program moves to step S320. On the other hand, when the water temperature at the outlet 207 of the water path 201c is lower than the third predetermined temperature T3 at step S319, the control program does not move to step S320 until the water temperature at the outlet 207 of the water path 201c is higher than the third predetermined temperature T3.

Next, at step S320, the valves 503–505 are opened, and the opening degree of the valve 503a is adjusted so that the water temperature at the outlet 203 of the water path 201a is in the predetermined range R. Because the valve 505 is opened, cooling water also circulates to the path 201d, so that the area of the fuel cell, corresponding to the water path 201d, is also heated. Thus, all the area of the fuel cell 10 is warmed-up.

According to the twenty-first embodiment of the present invention, the water paths 201a–201d are communicated with each other at the water inlet side, heat quantity due to generated electrical power in each path can be readily transmitted through the cooling water. Therefore, the warm-up operation of the fuel cell 10 can be effectively rapidly performed at an initial time.

(Twenty-Second Embodiment)

Figure 45:
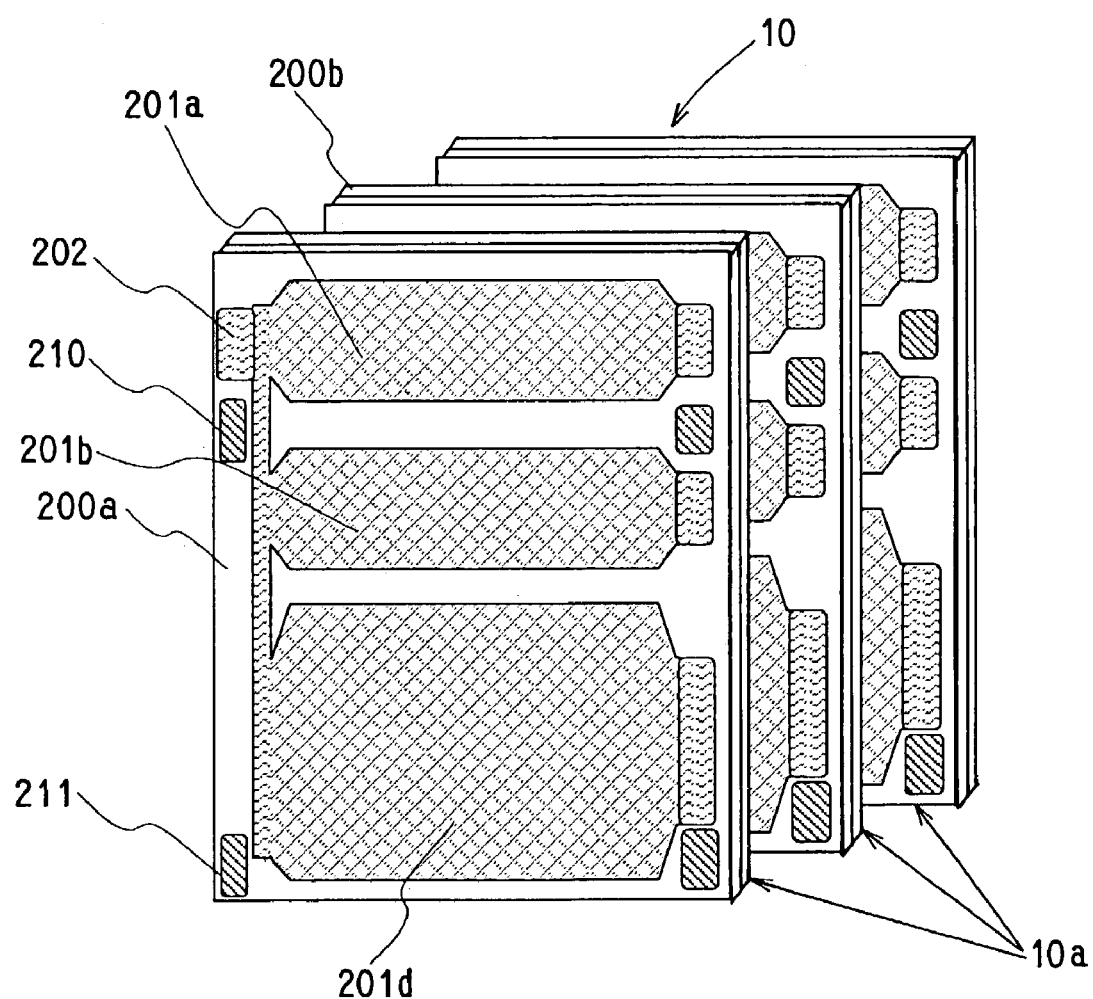
FIG. 45 is an exploded perspective view showing plural stacked cells in a fuel cell according to a twenty-second embodiment of the present invention.
Figure 46:
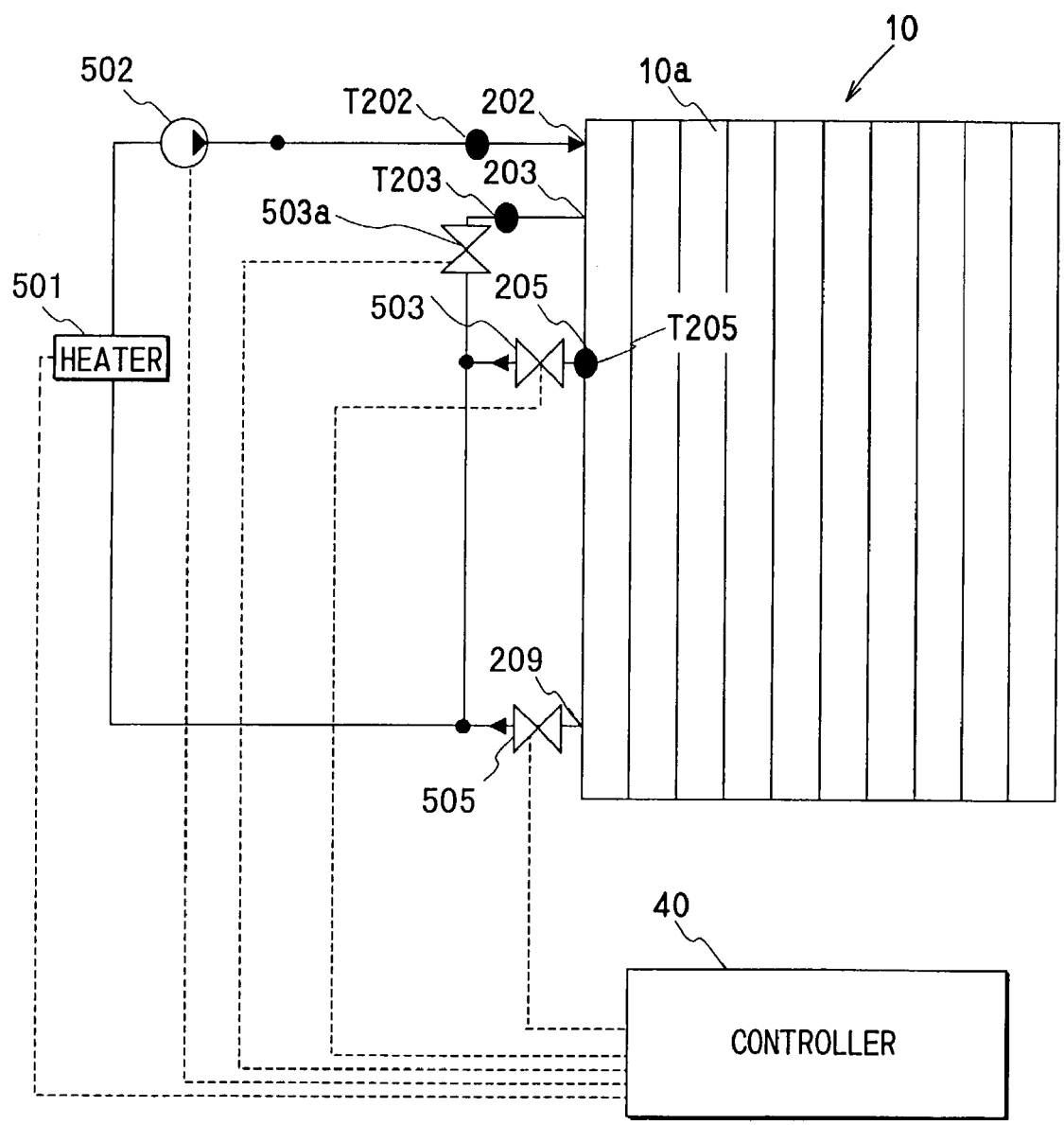
FIG. 46 is a schematic diagram showing a fuel cell system having the fuel cell according to the twenty-second embodiment.

The twenty-second embodiment of the present invention will be now described with reference to FIGS. 45–47. In the above-described twenty-first embodiment, the four water paths 201*a*, 201*b*, 201*c*, 201*d* are provided in each cell 10*a*. However, in the twenty-second embodiment, three water paths 201*a*, 201*b*, 201*d* are provided in each cell 10*a*, as shown in FIG. 45. Accordingly, as shown in FIG. 46, the water outlet 207 described in the twenty-first embodiment is omitted, and the valve 504 and the water temperature sensor T207 provided in the water outlet are omitted. In FIGS. 45 and 46, the other parts are similar to those in FIGS. 41 and 43 of the twenty-first embodiment.

Figure 44:
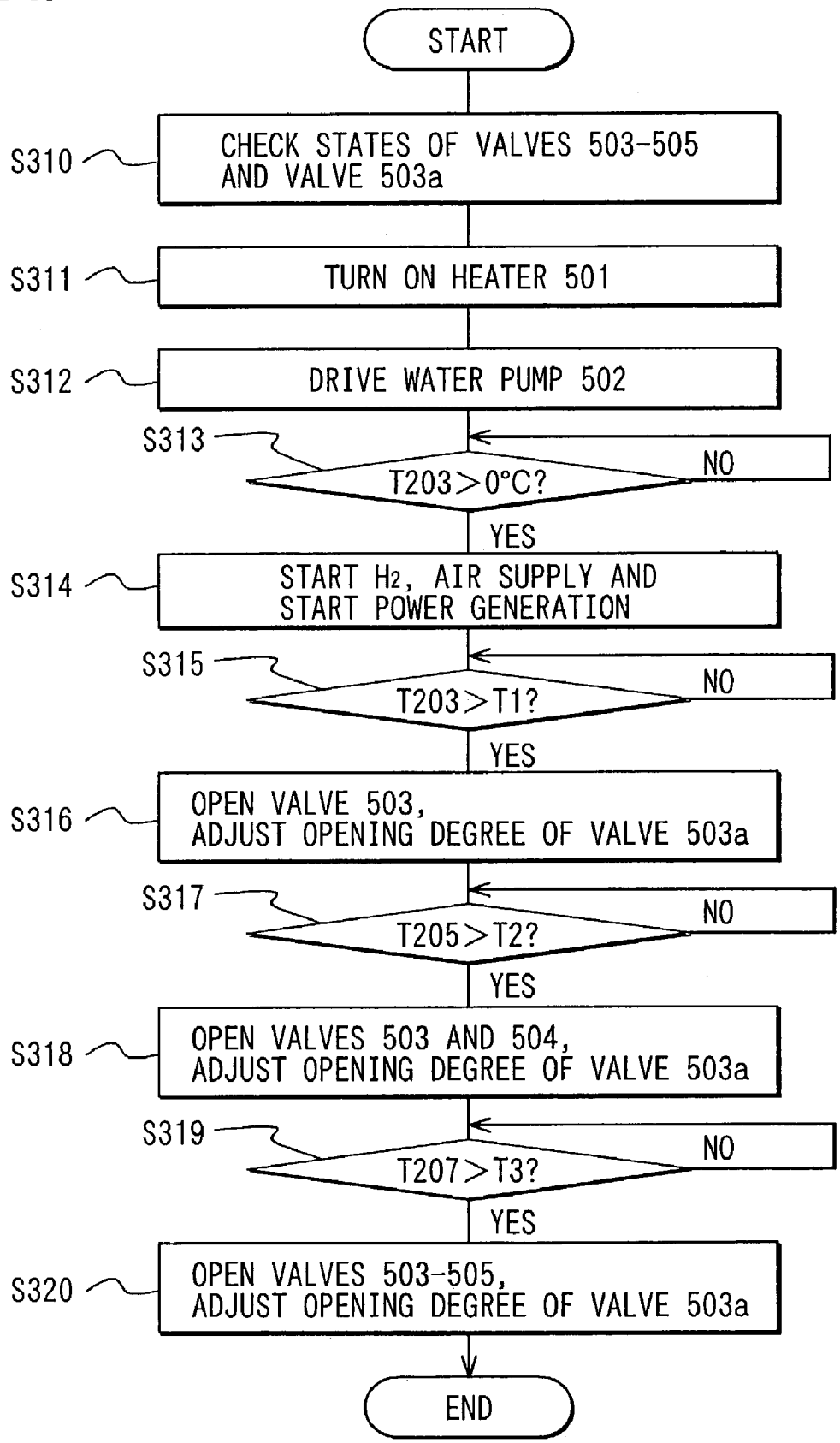
FIG. 44 is a flow diagram showing control operation of the fuel cell system according to the twenty-first embodiment.
Figure 47:
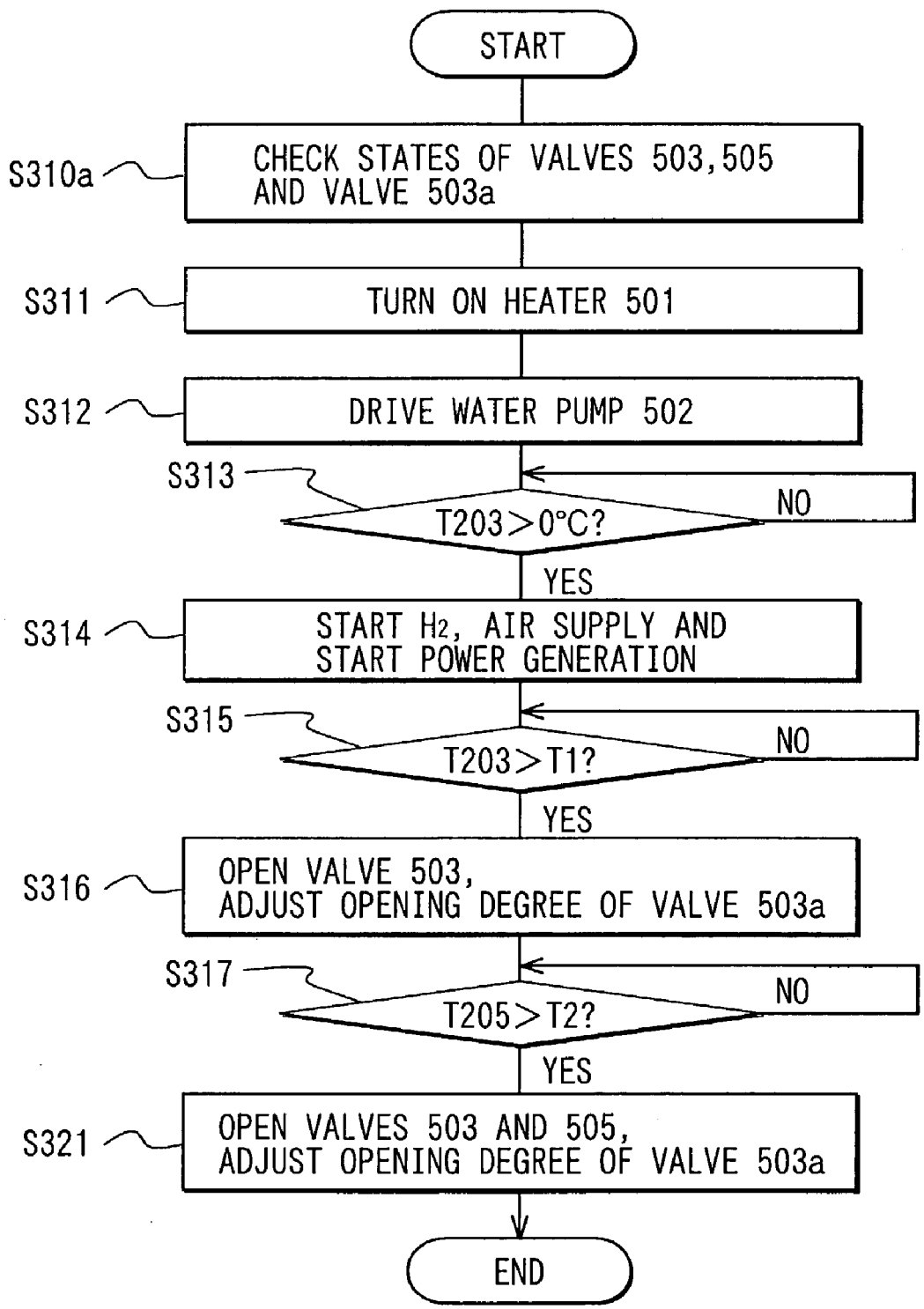
FIG. 47 is a flow diagram showing control operation of the fuel cell system according to the twenty-second embodiment.

In FIG. 47 of the twenty-second embodiment, steps similar to those in FIG. 44 of the twenty-first embodiment are indicated by the same step numbers, and detail description thereof is omitted. As shown in FIG. 47, at step S310*a*, it is checked that the valves 503, 505 are closed and the valve S503*a* is opened. Further, when the temperature of cooling water at the outlet 205, detected by the temperature sensor T205, is higher than the second predetermined temperature T2 at step S317, the valves 503, 505 are opened, and the opening degree of the valve 503*a* is adjusted so that the water temperature at the outlet 203 is in the predetermined temperature range R higher than 0° C., at step S321. Thereafter, the control program shown in FIG. 47 is ended.

In the twenty-second embodiment, the other parts are similar to those of the above-described twenty-first embodiment.

(Twenty-Third Embodiment)

Figure 48:
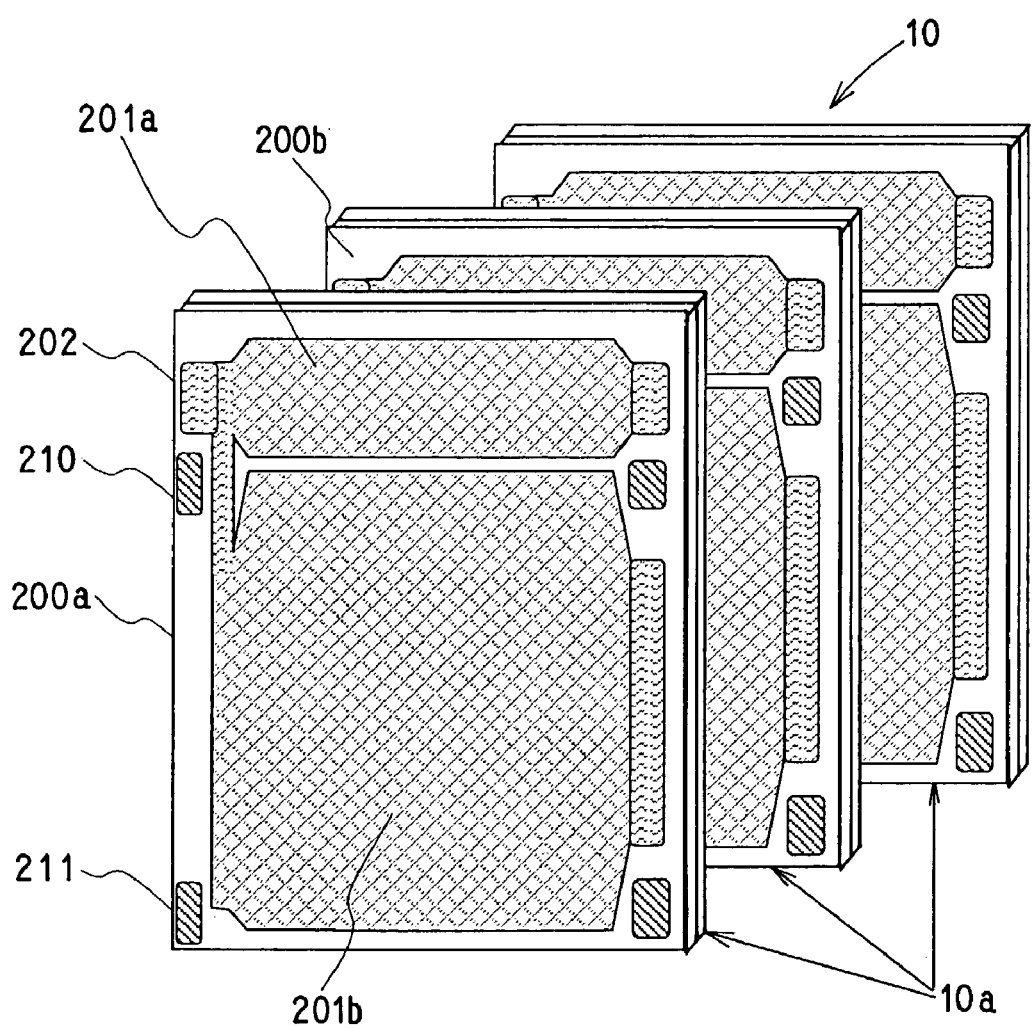
FIG. 48 is an exploded perspective view showing plural stacked cells in a fuel cell according to a twenty-third embodiment of the present invention.
Figure 49:
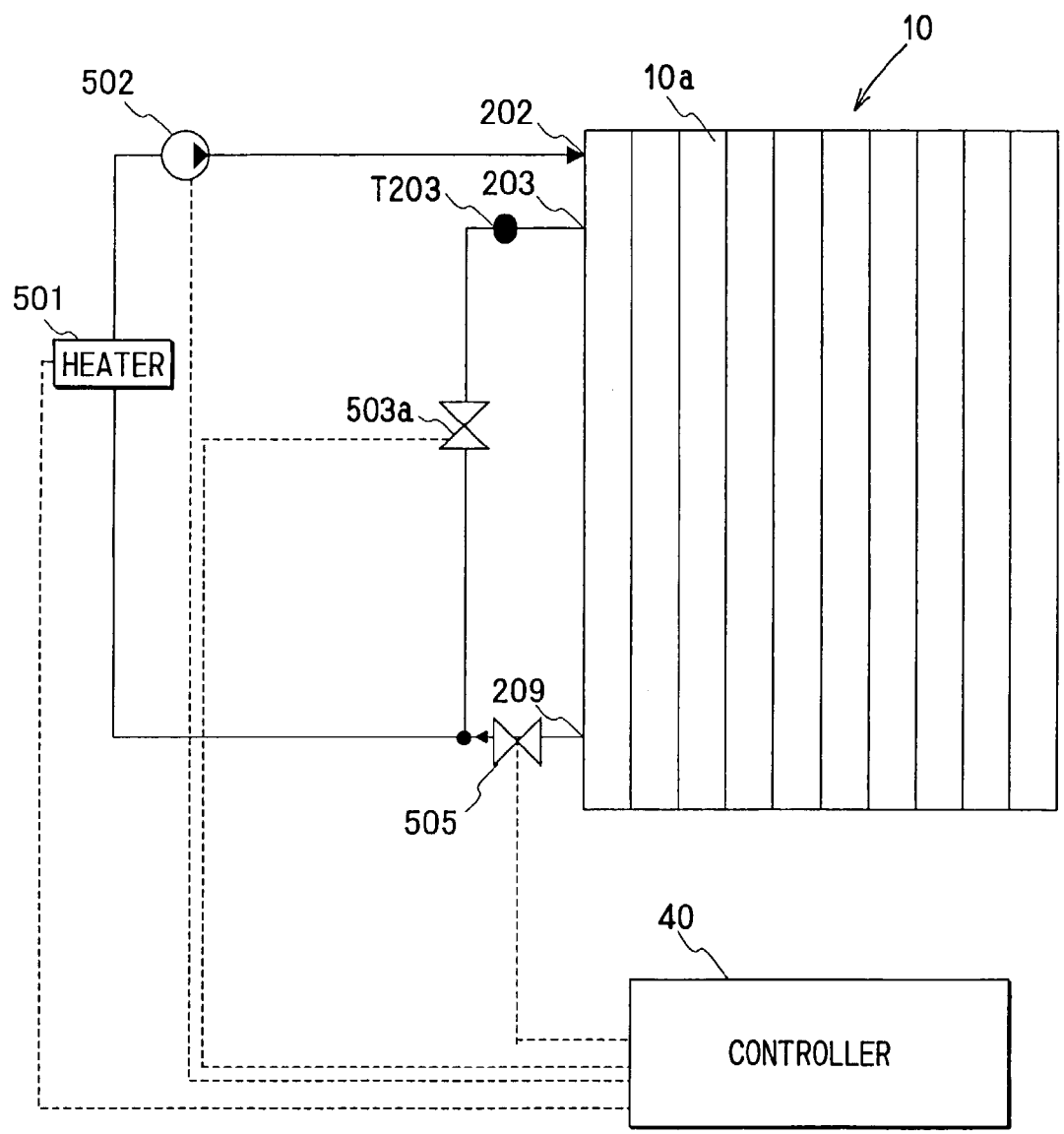
FIG. 49 is a schematic diagram showing a fuel cell system having the fuel cell according to the twenty-third embodiment.

The twenty-third embodiment of the present invention will be now described with reference to FIGS. 48–50. In the twenty-third embodiment, two water paths 201*a*, 201*b* are provided in each cell 10*a*, as shown in FIG. 48. Accordingly, as shown in FIG. 49, the water outlets 205, 207 described in the twenty-first embodiment are omitted, and the valves 503, 504 and the water temperature sensors T205, T207 are omitted. In FIGS. 48 and 49, the other parts are similar to those in FIGS. 41 and 43 of the twenty-first embodiment.

Figure 50:
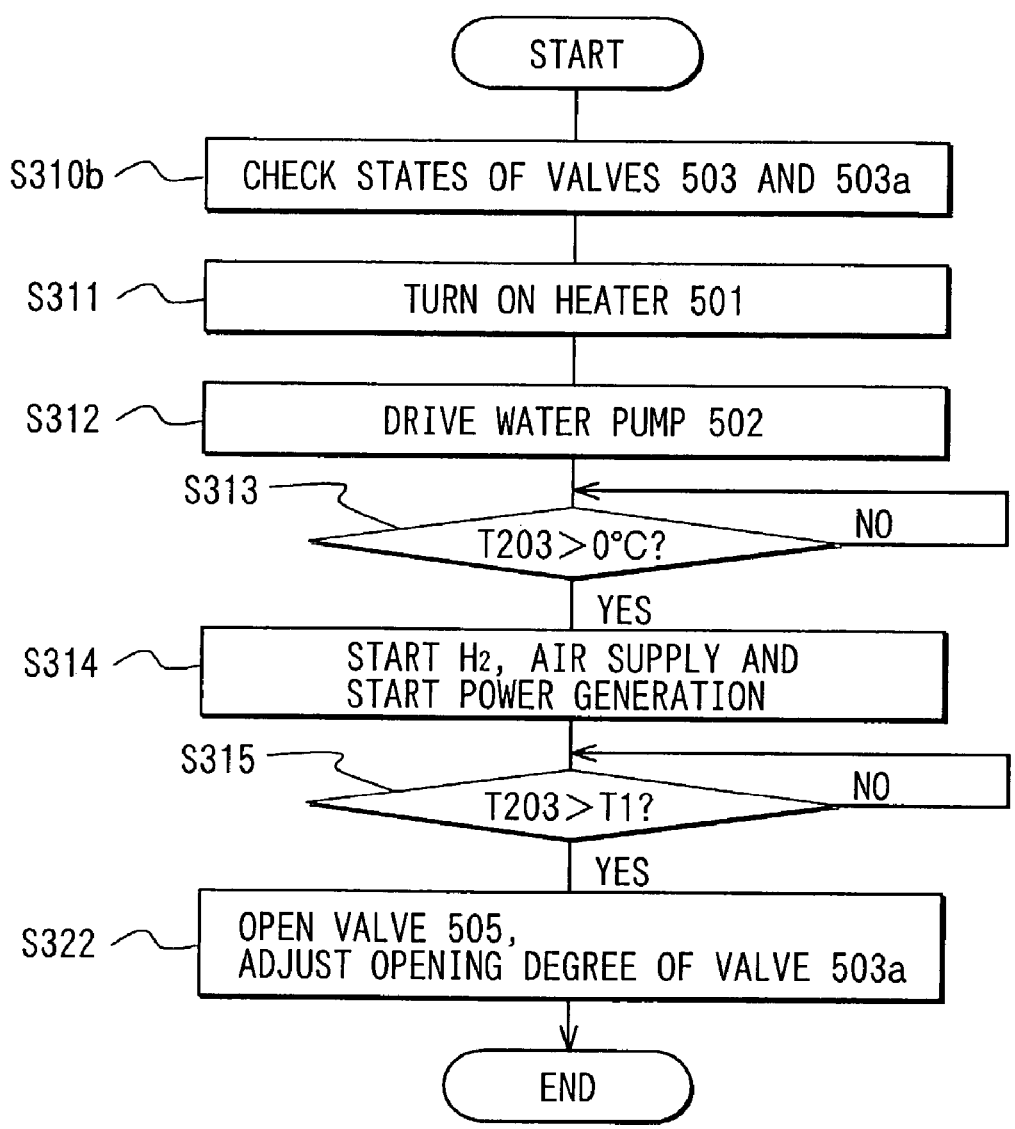
FIG. 50 is a flow diagram showing control operation of the fuel cell system according to the twenty-third embodiment.

In FIG. 50 of the twenty-second embodiment, steps similar to those in FIG. 44 of the twenty-first embodiment are indicated by the same step numbers, and detail description thereof is omitted. As shown in FIG. 50, at step S310*b*, it is checked that the valve 505 is closed and the valve S503*a* is opened. Further, when the temperature of cooling water at the outlet 203, detected by the temperature sensor T203, is higher than the first predetermined temperature T1 at step S315, the valve 505 is opened, and the opening degree of the valve 503*a* is adjusted so that the water temperature at the outlet 203 is in the predetermined temperature range R higher than 0° C., at step S322. Thereafter, the control program shown in FIG. 50 is ended.

In the twenty-third embodiment, the other parts are similar to those of the above-described twenty-first embodiment.

(Twenty-Fourth Embodiment)

The twenty-fourth embodiment of the present invention will be now described with reference to FIGS. 51–53. In the above-described twenty-first to twenty-third embodiments, the water inlet sides of the plural water paths are provided in common, and the water outlet sides thereof are provided independently, However, in the twenty-fourth embodiment of the present invention, the water inlet sides of the plural water paths are provided independently, and the water outlet sides thereof are provided in common.

Figure 51:
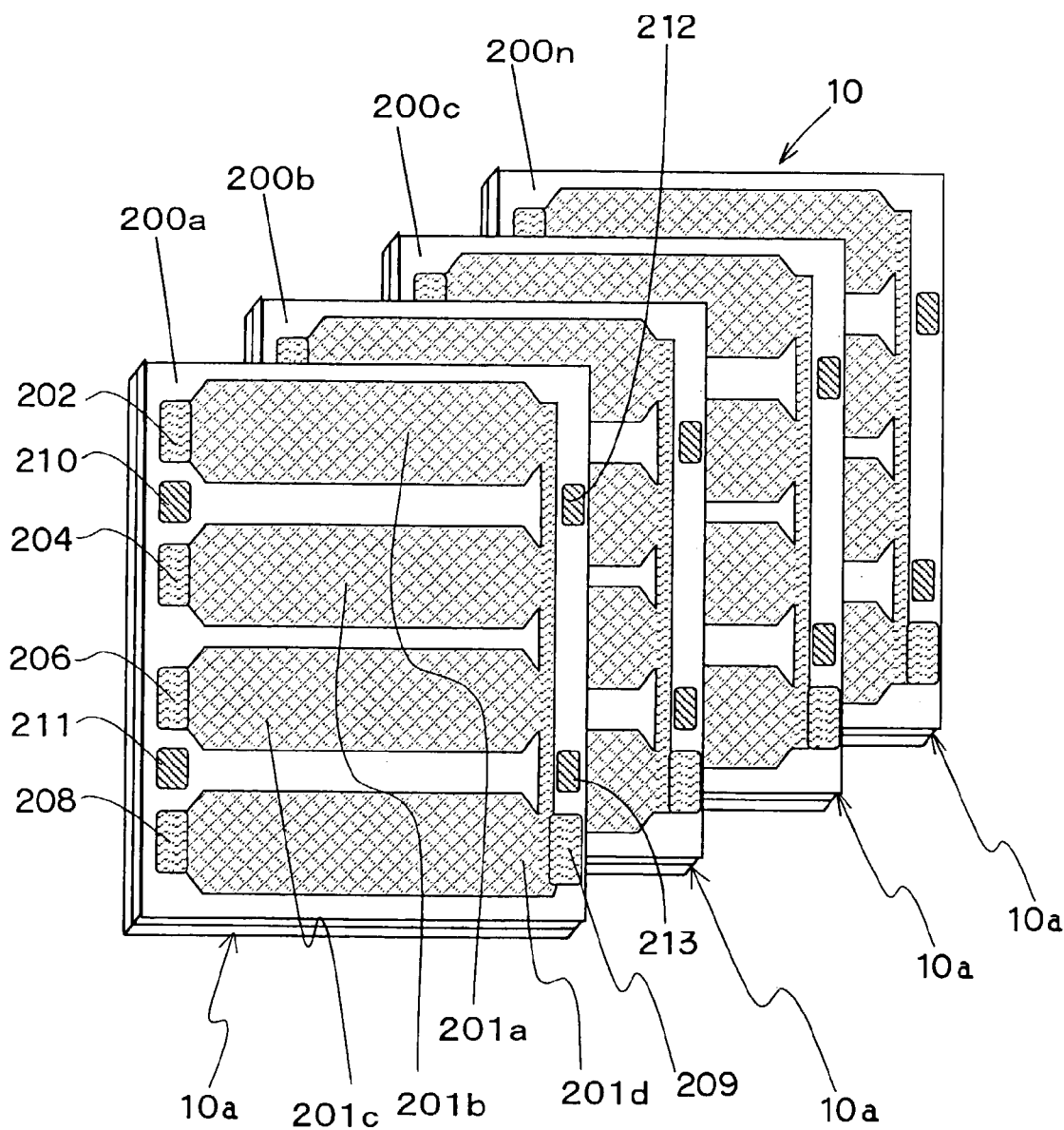
FIG. 51 is an exploded perspective view showing plural stacked cells in a fuel cell according to a twenty-fourth embodiment of the present invention.

Specifically, as shown in FIG. 51, outlet sides of cooling water (heat-exchanging medium) of water paths 201*a*, 201*b*, 201*c*, 201*d* are provided to communicate with a single water outlet 209, and inlet sides of cooling water (heat-exchanging medium) of the water paths 201*a*, 201*b*, 201*c*, 201*d* are provided to independently communicate with water inlets 202, 204, 206, 208, respectively. That is, the inlet sides of cooling water of the water paths 201*a*–201*d* are provided independently, and the outlet sides of cooling water of the water paths 201*a*–201*d* are provided in common. FIG. 52 is a schematic diagram showing a fuel cell system having the stacked fuel cell 10 in FIG. 51 according to the twenty-fourth embodiment, and FIG. 53 is a flow diagram showing control operation of the fuel cell system.

Figure 52:
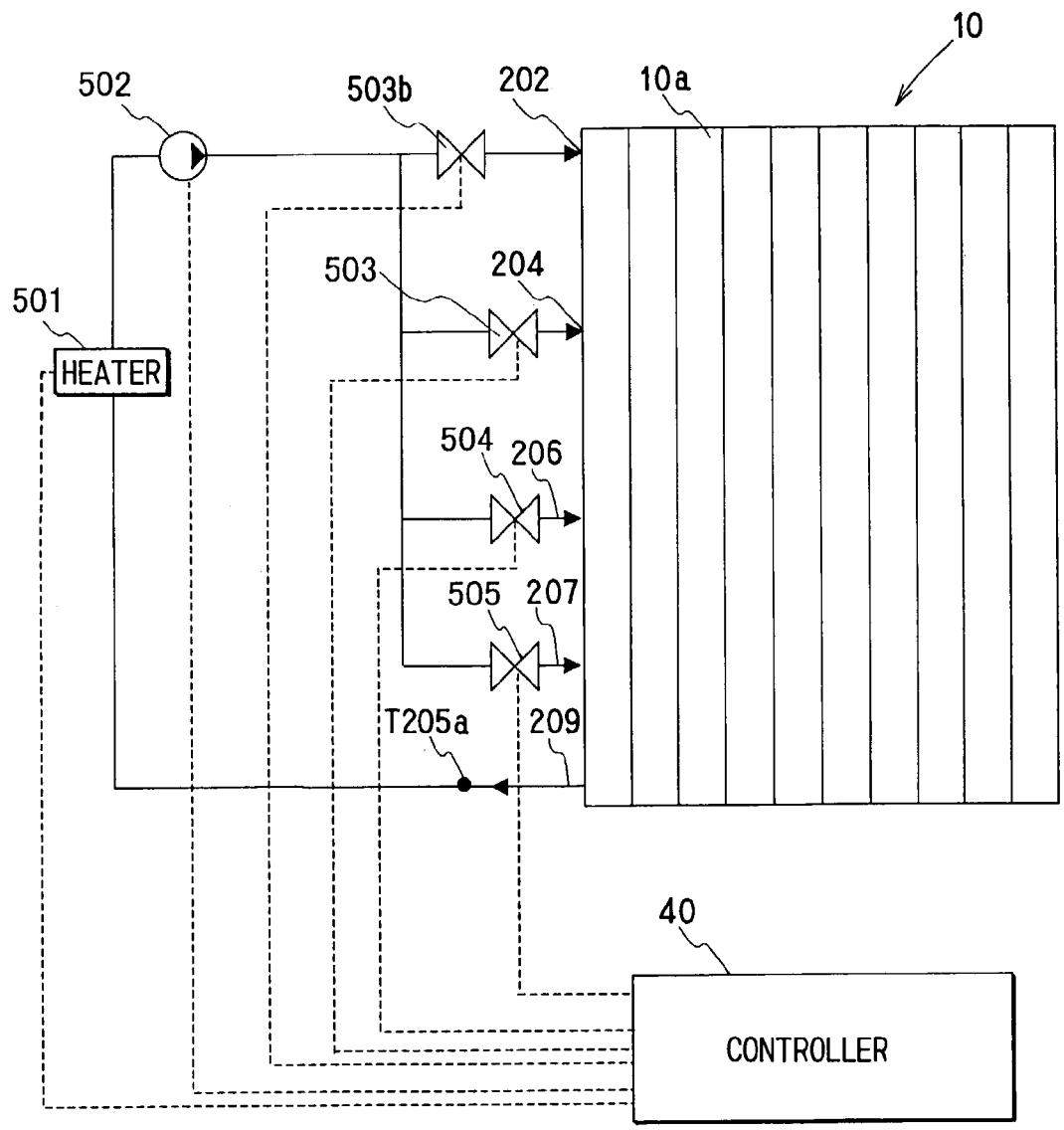
FIG. 52 is a schematic diagram showing a fuel cell system having the fuel cell according to the twenty-fourth embodiment.

As shown in FIG. 52, the circulation pump 502 is disposed to circulate cooling water, and opening-closing valves 503*b* and 503–505 are provided for stopping the flow of cooling water into the water inlets 202, 204, 206, 208, respectively. In the twenty-fourth embodiment, a temperature sensor T205*a* is disposed in the fuel cell 10 to detect the temperature of cooling water flowing from the water outlet 209.

Next, control operation of the fuel cell 10 according to the twenty-fourth embodiment of the present invention will be now described with reference to FIG. 53. First, it is checked that the valve 503*b* is opened and the valves 503–505 are closed at step S410. At steps S411, S412, the electric heater 501 and the circulation pump 502 are operated. That is, the electric heater 501 is turned on at step S411, and the circulation pump 502 is driven and operated at step S412. Thus, cooling water heated by the electric heater 501 is circulated from the water inlet 202 to the water outlet 209 through only the water path 201*a* by the operation of the circulation pump 502. That is, in this case, the heated cooling water circulates only to the water path 201*a*, and only a part of the fuel cell 10 is heated.

At step S413, it is determined whether or not the cooling water temperature detected by the temperature sensor T205*a*, flowing from the water outlet 209 of the water path 201*a*, is higher than a set temperature (e.g., 0° C.). When the water temperature from the water outlet 209 is lower than 0° C. at step S413, the control program returns. On the other hand, when the water temperature flowing from the water outlet 209 is higher than 0° C. at step S413, the control program moves to step S414.

Next, at step S314, hydrogen supply and air supply to the fuel cell 10 are started, and a part area of the fuel cell 10 generates electric power. Therefore, cooling water is heated by heat due to power generation in the area of the fuel cell 10.

Next, at step S415, the valve 503 provided at the inlet side of the water path 201*b* is fully opened. Therefore, cooling water circulates to the water path 201*b*, and the temperature of cooling water at the outlet 209 is changed. Accordingly, at step S416, it is determined whether or not the temperature of cooling water from the outlet 209 is higher than 0° C. after the valve 503 is fully opened at step S415. When the temperature of cooling water from the outlet 209 is lower than 0° C. at step S416, the control program moves to step S417. At step S417, the opening degree of the valve 503 is adjusted so that the amount of cooling water flowing through the water path 201*b* is adjusted.

Next, at step S418, it is determined whether or not the temperature of cooling water from the outlet 209, detected by the temperature sensor T205*a*, is higher than 0° C. When the temperature of cooling water from the outlet 209 is lower than 0° C. at step S418, the control program returns to step S417. On the other hand, when the temperature of cooling water from the outlet 209 is higher than 0° C. at step S418, the control program moves to step S415.

When the temperature of cooling water from the outlet 209, detected by the temperature sensor T205*a* is higher than 0° C. at step S416, the control program moves to step S419. At step S419, the valve 504 provided in the water inlet 206 is fully opened, so that cooling water also circulates to the water path 201*c*. Because cooling water circulates to the water path 201*c*, the temperature of cooling water at the outlet 209 is changed. Accordingly, at step S420, it is determined whether or not the temperature of cooling water from the outlet 209 is higher than 0° C. after the valve 504 is fully opened at step S419. When the temperature of cooling water from the outlet 209 is lower than 0° C. at step S420, the control program moves to step S421. At step S421, the opening degree of the valve 504 is adjusted so that the amount of cooling water flowing through the water path 201*c* is adjusted.

Next, at step S422, it is determined whether or not the temperature of cooling water from the outlet 209 is higher than 0° C. When the temperature of cooling water from the outlet 209 is lower than 0° C. at step S422, the control program returns to step S421. On the other hand, when the temperature of cooling water from the outlet 209 is higher than 0° C. at step S422, the control program moves to step S419.

When the temperature of cooling water from the outlet 209, detected by the temperature sensor T205*a* is higher than 0° C. at step S420, the control program moves to step S423. At step S423, the valve 505 provided in the water inlet 208 is fully opened, so that cooling water also circulates to the water path 201*d*. Because cooling water circulates to the water path 201*d*, the temperature of cooling water at the outlet 209 is changed. Accordingly, at step S424, it is determined whether or not the temperature of cooling water from the outlet 209 is higher than 0° C. after the valve 505 is fully opened at step S423. When the temperature of cooling water from the outlet 209 is lower than 0° C. at step S424, the control program moves to step S425. At step S425, the opening degree of the valve 505 is adjusted so that the amount of cooling water flowing through the water path 201*d* is adjusted.

Next, at step S426, it is determined whether or not the temperature of cooling water from the outlet 209 is higher than 0° C. When the temperature of cooling water from the outlet 209 is lower than 0° C. at step S426, the control program returns to step S425. On the other hand, when the temperature of cooling water from the outlet 209 is higher than 0° C. at step S426, the control program moves to step S423.

According to the twenty-fourth embodiment of the present invention, a part of the fuel cell can be effectively heated in the fuel cell system where the inlet sides of the water paths 201*a*–201*d* are provided independently and the outlet sides of the water paths 201*a*–201*d* are provided to communicate with the single water outlet 209.

(Twenty-Fifth Embodiment)

Figure 54:
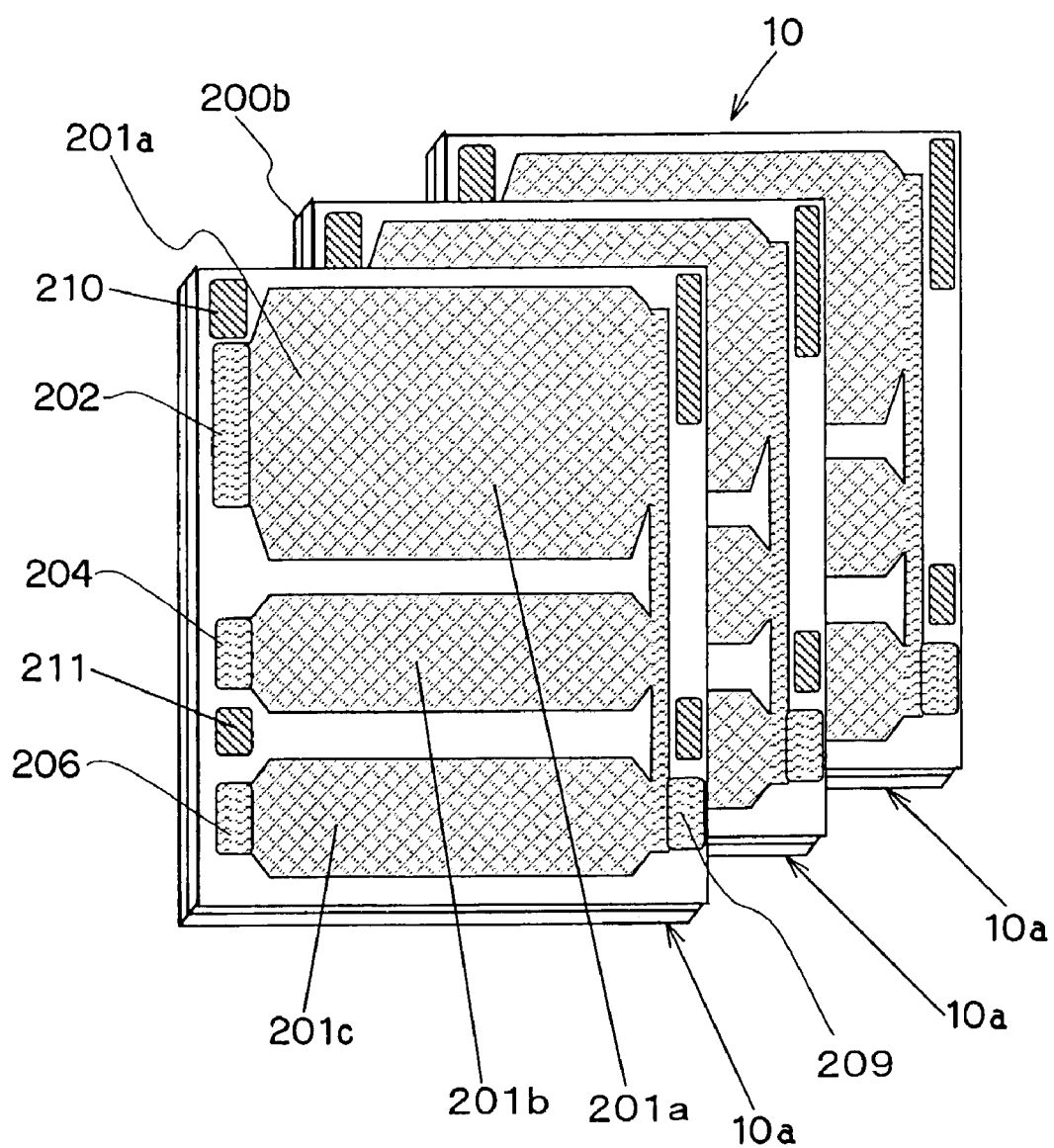
FIG. 54 is an exploded perspective view showing plural stacked cells in a fuel cell according to a twenty-fifth embodiment of the present invention.
Figure 55:
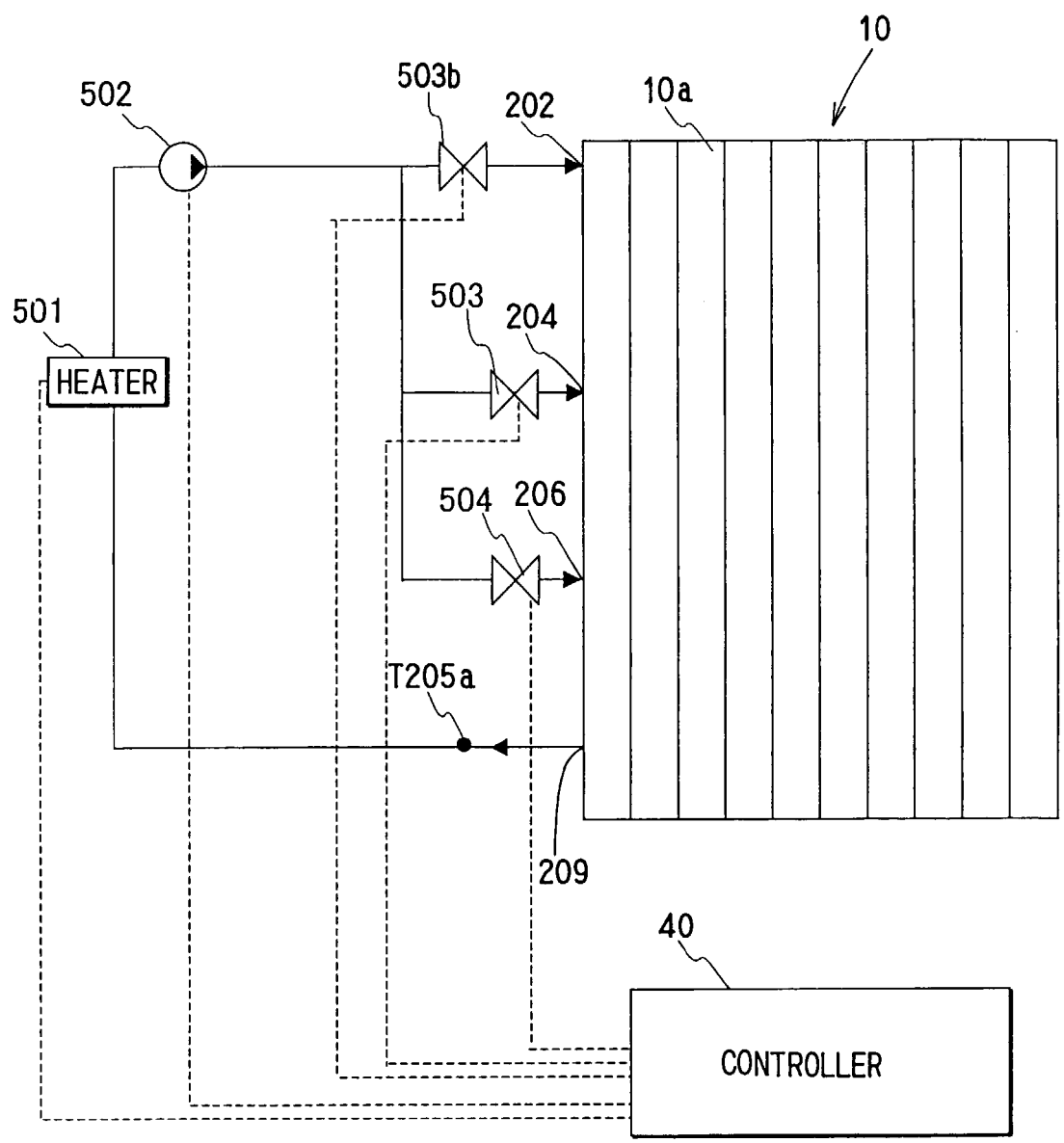
FIG. 55 is a schematic diagram showing a fuel cell system having the fuel cell according to the twenty-fifth embodiment.

The twenty-fifth embodiment of the present invention will be now described with reference to FIGS. 54–56. In the above-described twenty-fourth embodiment, the four water paths 201*a*, 201*b*, 201*c*, 201*d* are provided in each cell 10*a*. However, in the twenty-fifth embodiment, three water paths 201*a*, 201*b*, 201*d* are provided in each cell 10*a*, as shown in FIG. 54. Accordingly, as shown in FIG. 55, the water outlet 207 described in the twenty-fourth embodiment is omitted, and the valve 505 provided in the water inlet is omitted. In FIGS. 54 and 55, the other parts are similar those in FIGS. 51 and 52 of the twenty-fourth embodiment.

Figure 53:
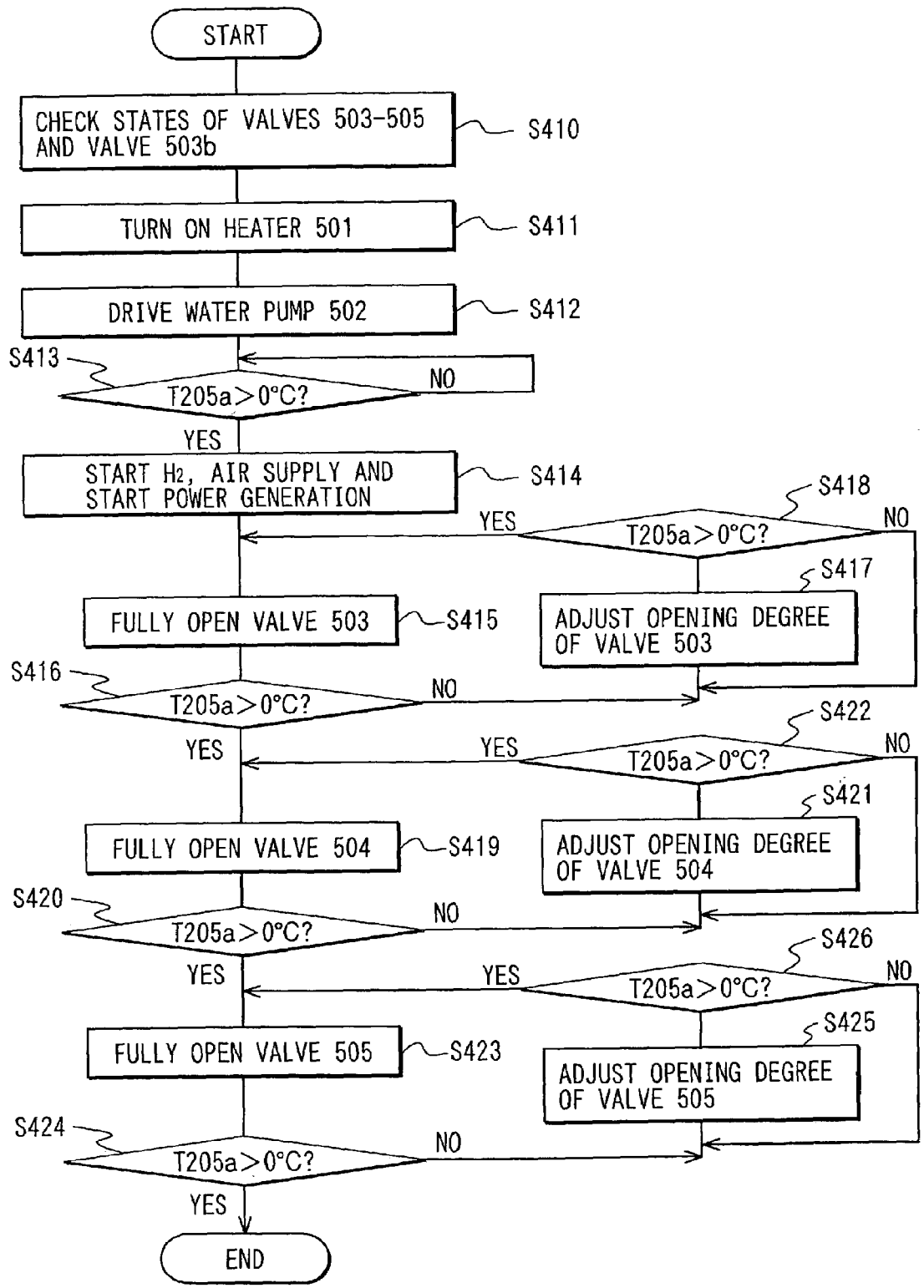
FIG. 53 is a flow diagram showing control operation of the fuel cell system according to the twenty-fourth embodiment.
Figure 56:
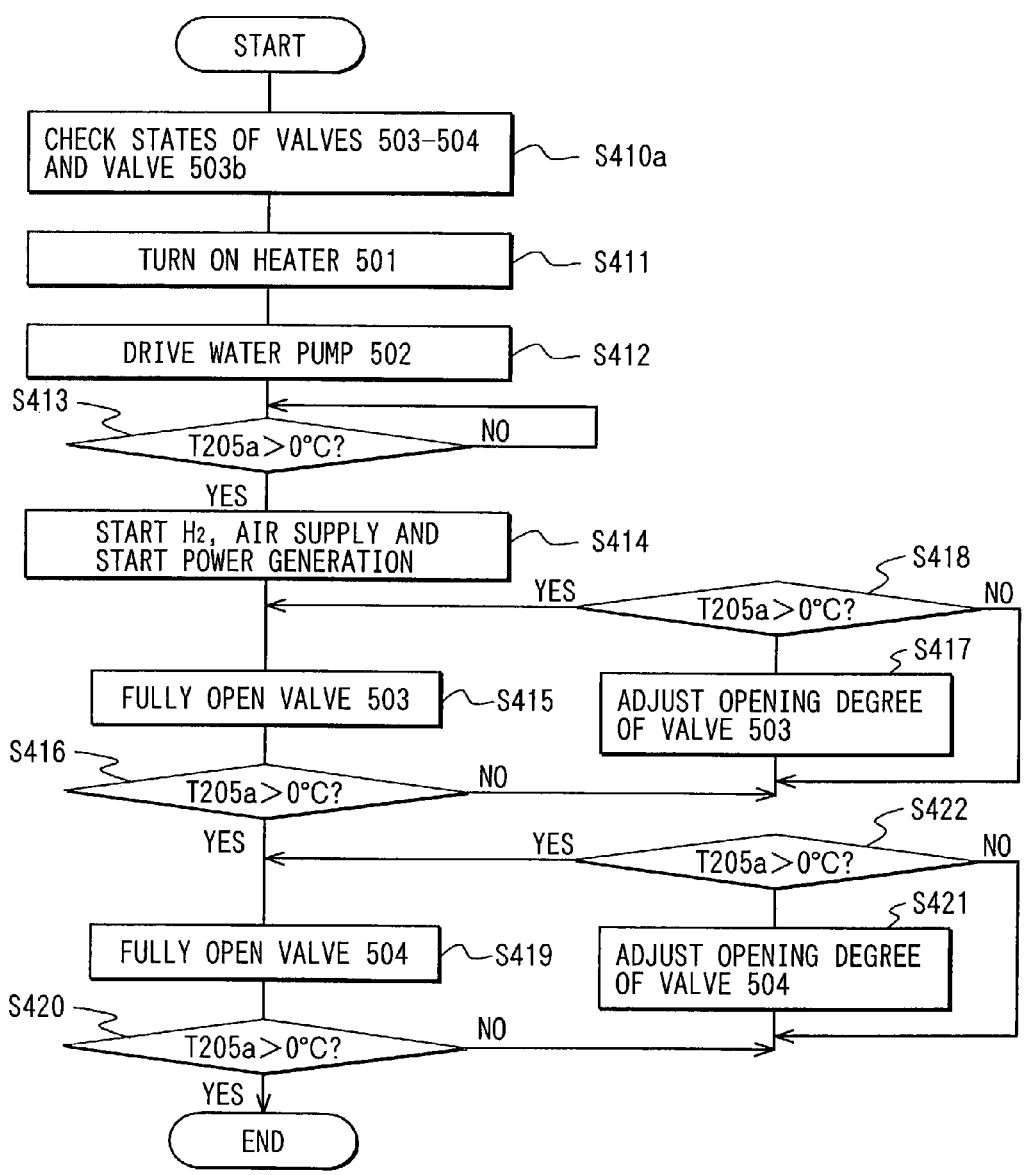
FIG. 56 is a flow diagram showing control operation of the fuel cell system according to the twenty-fifth embodiment.

In FIG. 56 of the twenty-fifth embodiment, steps similar to those in FIG. 53 of the twenty-fourth embodiment are indicated by the same step numbers, and detail description thereof is omitted. As shown in FIG. 56, at step S410*a*, it is checked that the valves 503, 504 are closed and the valve S503*b* is opened. Further, when the temperature of cooling water at the outlet 209, detected by the temperature sensor T205*a*, is higher than a predetermined temperature (e.g., 0° C.) at step S416, the initial control operation of the fuel cell system in FIG. 56 is ended.

In the twenty-fifth embodiment, the other parts are similar to those of the above-described twenty-fourth embodiment.

(Twenty-Sixth Embodiment)

Figure 57:
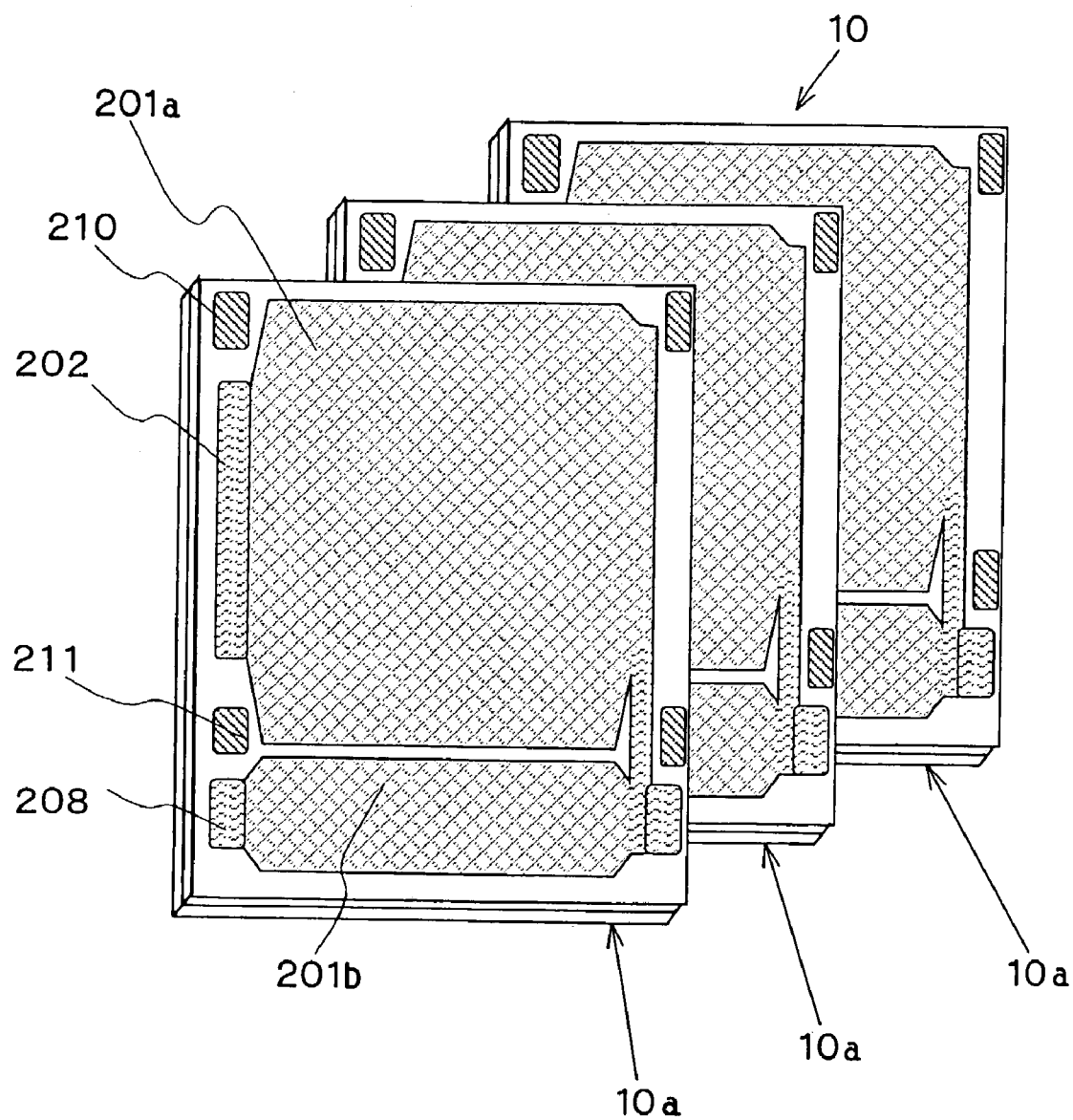
FIG. 57 is an exploded perspective view showing plural stacked cells in a fuel cell according to a twenty-sixth embodiment of the present invention.
Figure 58:
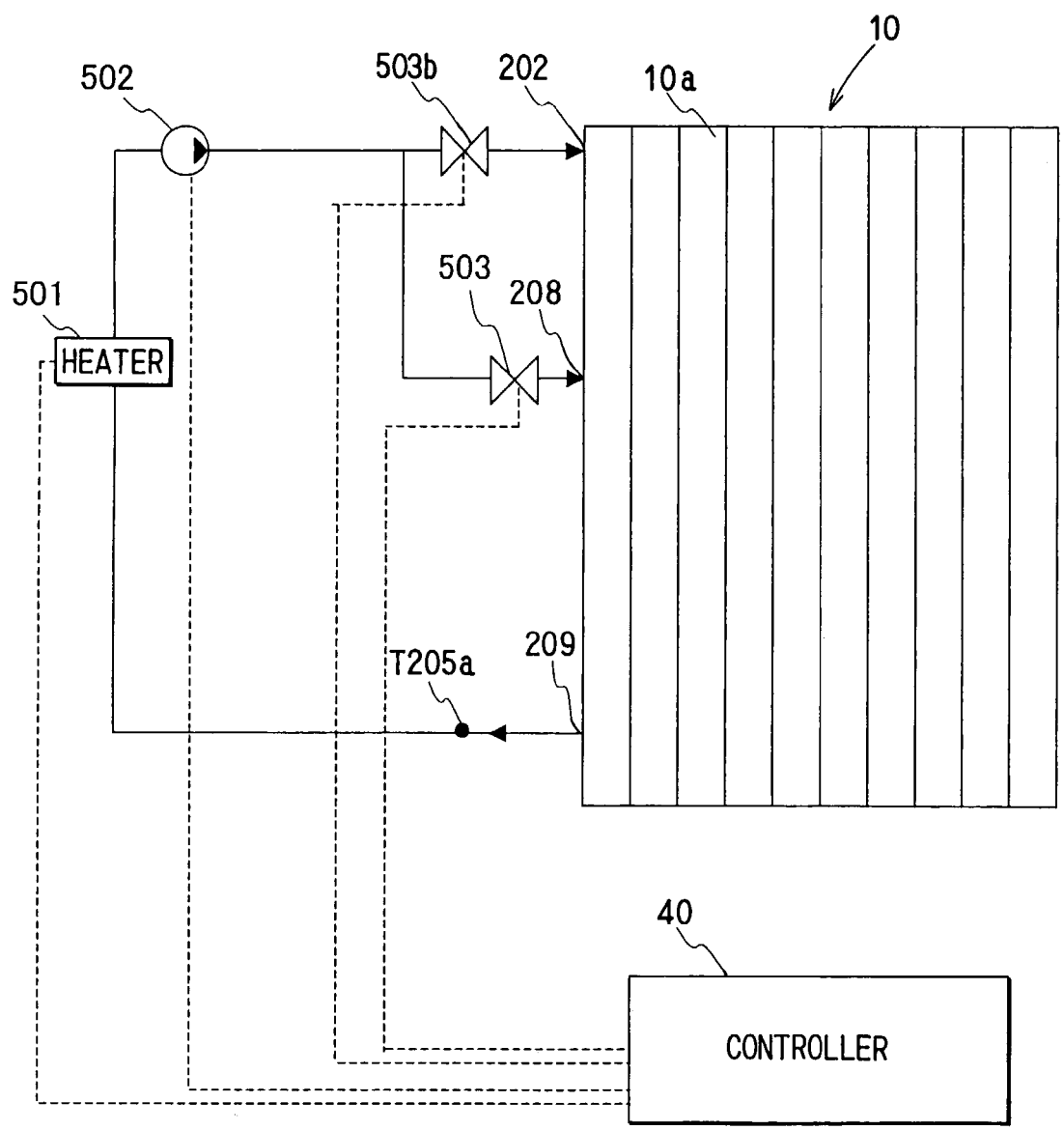
FIG. 58 is a schematic diagram showing a fuel cell system having the fuel cell according to the twenty-sixth embodiment.

The twenty-sixth embodiment of the present invention will be now described with reference to FIGS. 57–59. In the twenty-sixth embodiment, two water paths 201*a*, 201*b* are provided in each cell 10*a*, as shown in FIG. 57. Accordingly, as shown in FIG. 57, the water inlets 204, 206 described in the twenty-fourth embodiment are omitted. In FIGS. 57 and 58, the other parts are similar those in FIGS. 51 and 52 of the twenty-fourth embodiment.

Figure 59:
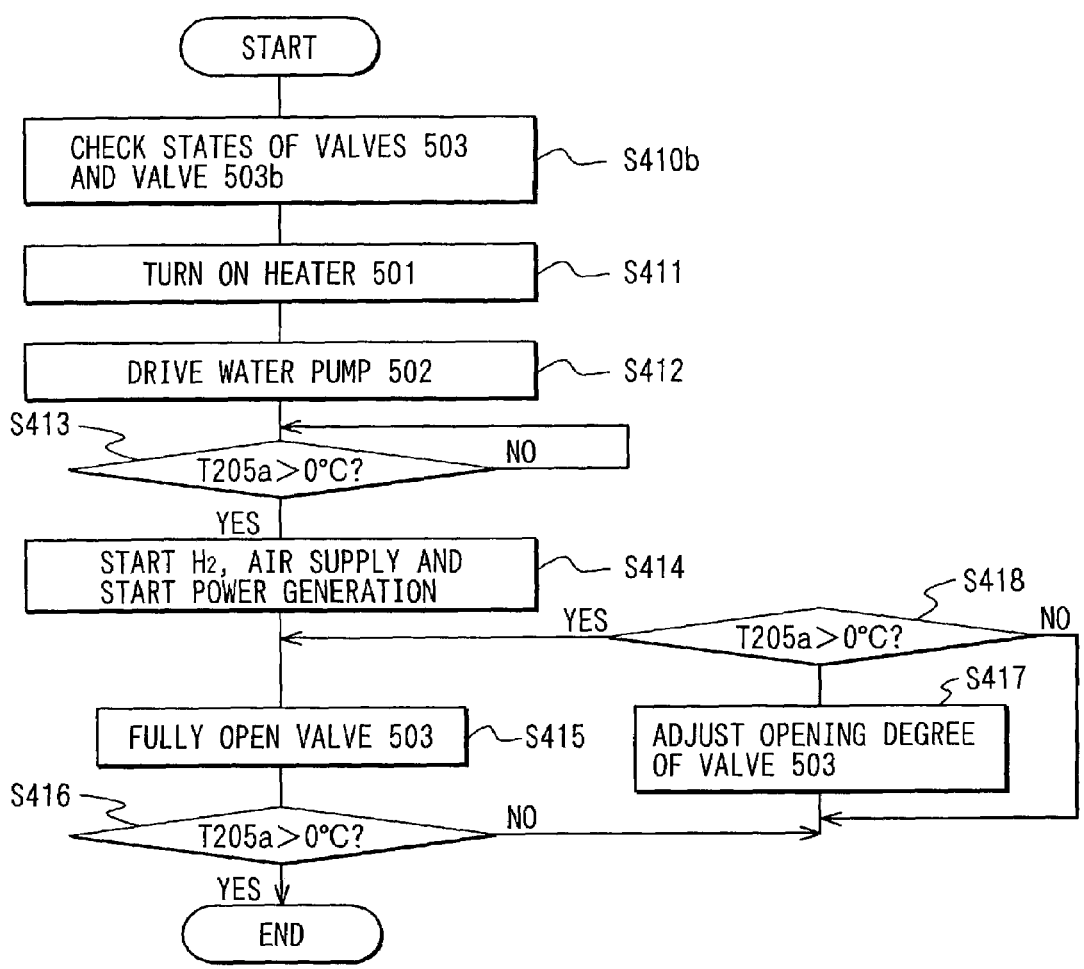
FIG. 59 is a flow diagram showing control operation of the fuel cell system according to the twenty-sixth embodiment.

In FIG. 59 of the twenty-sixth embodiment, steps similar to those in FIGS. 53 of the twenty-fourth embodiment are indicated by the same step numbers, and detail description thereof is omitted. As shown in FIG. 59, at step S410*b*, it is checked that the valve 503 is closed and the valve S503*b* is opened. Further, when the temperature of cooling water at the outlet 209, detected by the temperature sensor T205*a*, is higher than a predetermined temperature (e.g., 0° C.) at step S416, the initial control operation of the fuel cell system in FIG. 59 is ended.

In the twenty-sixth embodiment, the other parts are similar to those of the above-described twenty-fourth embodiment.

(Other Embodiments)

Although the present invention has been fully described in connection with the preferred embodiments thereof with reference to the accompanying drawings, it is to be noted that various changes and modifications will become apparent to those skilled in the art.

For example, in the above-described sixteenth and seventeenth embodiments, the supply amount of the fuel gas (hydrogen and air) can be controlled in accordance with the amount of the thermal medium (cooling water) circulated in each part of the fuel cell 10. For example, in the sixteenth embodiment of FIG. 30, the amount of supplied fuel gas can be controlled in accordance with an amount of thermal medium (cooling water) circulated into the area A of the fuel cell 10. Thus, when power generation is performed only in the area A, fuel gas does not flows into the areas B–D. Therefore, the amount of discharged fuel gas, without being used for power generation, can be reduced.

In the above-described first embodiment of the present invention, the first temperature sensor 33 indirectly detects the fuel cell temperature Tfc by detecting the temperature of the cooling water. However, without being limited to the manner in the first embodiment, the first temperature sensor 33 may be attached to the fuel cell 10 at a portion collectively heated during the partial warm-up operation, and may directly detect the fuel cell temperature Tfc.

In FIG. 18 of the above-described tenth embodiment, the mixture gas of hydrogen and air (oxygen) may be introduced to one of the hydrogen and oxygen electrodes of the fuel cell 10, without being limited to the gas supply structure of the tenth embodiment where the mixture gas is introduced to both the hydrogen and oxygen electrodes of the fuel cell 10.

In FIG. 1, the heater 32 may be provided in the bypass path 30 without being limited to the thermal medium circulation path 20 shown in FIG. 1. Further, the flow-path control valve 31 may be provided in the thermal medium circulation path 20 without being limited to the structure shown in FIG. 1. For example, when the flow-path control valve 31 is provided in the thermal medium circulation path 20 around the water outlet of the fuel cell 10, the amount of the thermal medium circulated into the bypass path 30 can be increased by reducing its open degree.

In FIG. 1, even when the bypass path 30 is not provided, a part of the fuel cell 10 can be collectively heated by reducing the amount of cooling water heated by the heater 32 during the partial warm-up operation. That is, cooling water heated by the heater 32 flows slowly in each cell 10*a* by reducing the amount of cooling water from the water pump 24, so that the part in each cell 10*a* is collectively heated. Accordingly, the same effect can be obtained as in the first embodiment where cooling water is circulated into the part of the fuel cell 10 through the bypass path 30 during the partial warm-up operation.

Such changes and modifications are to be understood as being within the scope of the present invention as defined by the appended claims.

What is claimed is:

1. A fuel cell system comprising:

a fuel cell stack including a plurality of fuel cells stacked in a stack direction, for generating electric power by introduction of a fuel gas, wherein:

each fuel cell has therein a plurality of thermal medium passages, each thermal medium passage being independent from each other thermal medium passage such that a thermal medium independently flows through each of the thermal medium passages;

the thermal medium passages include portions which are arranged independent of each other in a plurality of lines, parallel to each other in a direction approximately perpendicular to the stack direction;

a thermal medium passage of each fuel cell communicates with a thermal medium passage in an adjacent fuel cell in the stack direction;

a heating device for heating the thermal medium;

a thermal medium circulation device for circulating the thermal medium through the thermal medium passages;

a temperature detection device disposed at an outlet of each thermal medium passage for detecting a temperature of the thermal medium a controller for controlling the thermal medium circulation device based on the temperature detected by each of the temperature detection devices; and an opening/closing member which selectively opens and closes a respective thermal medium passage based on the temperature detected by each of the temperature detecting members such that the temperature of the thermal medium at the outlets of the thermal medium passages stays within a predetermined range; wherein when the controller determines that the temperature of the thermal medium detected by one of said temperature detection devices is lower than a predetermined temperature, the controller outputs a first operation signal to the thermal medium circulation device and the opening/closing member so as to circulate the thermal medium heated by the heating device into a part of the thermal medium passages; and when the controller determines that the temperature of the thermal medium detected by one of said temperature detection devices is higher than the predetermined temperature, the controller outputs a second operation signal to the thermal medium circulation device and the opening/closing member so as to circulate the thermal medium heated by the heating device into the fuel cell from the part of the thermal medium passages to all of the thermal medium passages.

2. The fuel cell system according to claim 1, wherein:

each of thermal medium passages extends on each surface of the cells to be approximately perpendicular to the stack direction on each of the plurality of lines; and each of thermal medium passages includes an inlet at a first end and the outlet at a second end.

3. The fuel cell system according to claim 1, wherein:

each of thermal medium passages has an inlet at a first end and the outlet at a second end;

the inlets of the thermal medium passages are connected to each other on each of the plurality of lines; and the outlets of the thermal medium passages are connected to each other on each of the plurality of lines.

4. The fuel cell system according to claim 3, wherein:

the inlets of the thermal medium passages communicate with one inlet passage through which the thermal medium is introduced into the inlets of the thermal medium passages; and the outlets of the thermal medium passages are separated from each other.

5. The fuel cell system according to claim 3, wherein:

the outlets of the thermal medium passages communicate with one outlet passage through which the thermal medium is discharged; and the inlets of the thermal medium passages are separated from each.

6. The fuel cell system according to claim 1, wherein:

the thermal medium passages have a plurality of inlets from which the thermal medium are introduced into the thermal medium passages, and the outlets are the same in number as the inlets, from which the thermal medium from the thermal medium passages is discharged; and one of the inlets and one of the outlets communicate with each other.

7. The fuel cell system according to claim 1, wherein:

the thermal medium circulation device includes a circulation pump for circulating the thermal medium into the fuel cell; and the thermal medium circulation device circulates the thermal medium into the fuel cell from one part of the thermal medium passages to all of the thermal medium passages using the opening-closing device and the circulation pump.

8. The fuel cell system according to claim 7, wherein the opening-closing device is a valve.

9. The fuel cell system according to claim 7, wherein the opening-closing device is a pump.

10. The fuel cell system according to claim 7, wherein the opening-closing device includes a plurality of valves;

each of the valves are provided in the fuel cell at the outlets of a respective thermal medium passage, such that one valve opens one part of the thermal medium passages, and the other valves gradually open the other parts of the thermal medium passages after the one part of the thermal medium passages is opened; and when the thermal medium circulates in the other parts of the thermal medium passages, the controller controls an opening degree of the one valve based on a detected temperature of a respective temperature detecting device.

11. The fuel cell system according to claim 7, wherein the fuel cell is disposed to generate electric power in one part of the fuel cell while the thermal medium circulates into the one part of the fuel cell, and the generated electrical power being larger than electric power required for driving electric loads.

12. The fuel cell system according to claim 1, wherein the thermal medium passages are provided in the fuel cell such that one part of the fuel cell is collectively heated using the thermal medium to generate electrical power in the one part, and the other part of the fuel cell is gradually heated after the one part is heated.

13. The fuel cell system according to claim 12, wherein the thermal medium passages are provided to heat the other part using the thermal medium and exhaust heat of the electrical power generated in the one part as heating sources, after the one part is heated.

14. A fuel cell system comprising:

a fuel cell stack including a plurality of fuel cells stacked in a stack direction, for generating electric power by a reaction of a fuel gas;

a circulation system for circulating a thermal medium to each of the fuel cells, wherein: each of the fuel cells has therein a plurality of thermal medium passages in communication with the circulation system through which the thermal medium flows;

the thermal medium passages are provided independent from each other thermal medium passage such that the thermal medium independently flows through each of the thermal medium passages;

the thermal medium passages each include a plurality of communication oaths provided in parallel in a plurality of lines in an arrangement direction approximately perpendicular to the stack direction;

each thermal medium passage has an inlet from which the thermal medium from the circulation passage system flows into the thermal medium passage, and each thermal medium passage has an outlet from which the thermal medium is discharged to the circulation system;

at least one of the inlets is independent from one of the outlets;

each of the thermal medium passages includes a supply path extending between the inlet and the communication path of each of the fuel cells, a return path penetrating extending between the communication path and the outlet of each of the fuel cells, and the plurality of communication paths through which the supply path communicates with the return path;

the communication paths are independently provided in the fuel cells in each of the thermal medium passages;

the supply path, the return path and the communication paths of each thermal medium passage are defined by the fuel cells;

a temperature detection device is disposed at each outlet of each thermal medium passage to detect a temperature of thermal medium flowing from a respective thermal medium passage; and an opening/closing member selectively opens and closes a respective thermal medium passage based on the temperature detected by each of the temperature detection devices such that the thermal medium at the outlets stays in a predetermined range.

15. The fuel cell system according to claim 14, further comprising:

a heater, disposed in the circulation system, for heating the thermal medium;

a circulation device for circulating the thermal medium in the circulation system; and a controller for controlling operation of the heater and the circulation device.

16. The fuel cell system according to claim 15, wherein:

the circulation system includes a plurality of inlet passages, each of the plurality of inlet passages being connected to a respective inlet of a respective thermal medium passage, and an outlet passage communicating with all the outlets of the thermal medium passages;

the circulation device includes a plurality of valves that are provided in the inlet passages, respectively; and the controller controls the valves based on a temperature of the thermal medium in the outlet passage.

17. The fuel cell system according to claim 15, wherein:

the circulation system includes a plurality of outlet passages, each of the plurality of outlet passages being connected to a respective outlet of a respective thermal medium passage, and an inlet passage communicating with all the inlets of the thermal medium passages;

the circulation device includes a plurality of valves that are provided in the outlet passages, respectively; and the controller controls the valves based on a temperature of the thermal medium in the outlet passages.

18. A fuel cell system comprising:

a fuel cell stack including a plurality of fuel cells stacked in a stack direction, for generating electric power by a reaction of a fuel gas, wherein:

the fuel cell stack has therein a plurality of thermal medium passages for passing through a thermal medium, each of the thermal medium passages including a plurality of communication oaths arranged in parallel with each other in a direction generally perpendicular to the stack direction;

each of the thermal medium passages has a supply path extending through each of the fuel cells, a return path extending through each of the fuel cells, and the plurality of communication paths extending between the supply path and the return path;

the communication paths are independently provided in each of the fuel cells;

the supply path, the return path and the communication paths of each thermal medium passages are defined by the fuel cells;

a temperature detection device is disposed at an outlet of each thermal medium passages to detect a temperature of thermal medium flowing from a respective thermal medium passages; and an opening/closing member selectively opens and closes each of the thermal medium passages based on the temperature detected by each of the temperature detection devices such that the thermal medium at the outlets stays in a predetermined range.

19. The fuel cell system according to claim 18, further comprising:

a heating device for heating the thermal medium;

a thermal medium circulation device for circulating the thermal medium through the thermal medium passages; and a controller for controlling the thermal medium circulation device based on the temperature detected by each of the temperature detection devices, wherein:

when the controller determines that the temperature of the thermal medium detected by at least one of the temperature detection devices is lower than a predetermined temperature, the controller outputs a first operation signal to the thermal medium circulation device so as to circulate the thermal medium heated by the heating device into a part of the thermal medium passages; and when the controller determines that the temperature of the thermal medium detected by at least one of the temperature detection devices is higher than the predetermined temperature, the controller outputs a second operation signal to the thermal medium circulation device so as to circulate the thermal medium heated by the heating device into the fuel cells from the part of the thermal medium passages to all of the thermal medium passages.

20. A fuel cell system comprising:

a fuel cell stack including a plurality of fuel cells stacked in a stack direction for generating electric power by introduction of a fuel gas;

a plurality of thermal medium passages defined by each of the plurality of fuel cells, the plurality of thermal medium passages each having a portion extending generally parallel to each other in a direction generally perpendicular to the stack direction;

a plurality of thermal medium inlets, each thermal medium inlet being in communication with an inlet of a respective thermal passage;

a plurality of thermal medium outlets, each thermal medium outlet being in communication with an outlet of the respective thermal passage; and a temperature detection device disposed at the outlet of each thermal medium passage to detect a temperature of thermal medium flowing from a respective thermal medium passage; wherein an opening/closing member selectively opens and closes each thermal medium passage based on the temperature detected by a respective temperature detection device such that the thermal medium at the outlets stays in a predetermined range.

21. The fuel cell system according to claim 1, wherein the opening/closing member comprises a plurality of valves which independently adjust an open degree of each thermal medium passage.

22. The fuel cell system according to claim 14, wherein the opening/closing member comprises a plurality of valves which independently adjust an open degree of each thermal medium passage.

23. The fuel cell system according to claim 18, wherein the opening/closing member comprises a plurality of valves which independently adjust an open degree of each thermal medium passage.

24. The fuel cell system according to claim 20, wherein the opening/closing member comprises a plurality of valves which independently adjust an open degree of each thermal medium passage.

* * * * *